United States Patent
Nam et al.

(10) Patent No.: US 12,465,644 B2
(45) Date of Patent: Nov. 11, 2025

(54) PHARMACEUTICAL COMPOSITION CONTAINING STABILIZED NUCLEIC ACID ADJUVANT

(71) Applicants: THE CATHOLIC UNIVERSITY OF KOREA INDUSTRY-ACADEMIC COOPERATION FOUNDATION, Seoul (KR); KOREA INSTITUTE OF SCIENCE AND TECHNOLOGY, Seoul (KR)

(72) Inventors: Jae Hwan Nam, Goyang-si (KR); Gyo Chang Keum, Seoul (KR); Hyo Jung Park, Seoul (KR); Eun Kyoung Bang, Seoul (KR); Hae Li Ko, Bucheon-si (KR)

(73) Assignee: SML BIOPHARM CO., LTD., Gwangmyeong-si (KR)

( * ) Notice: Subject to any disclaimer, the term of this patent is extended or adjusted under 35 U.S.C. 154(b) by 920 days.

(21) Appl. No.: 17/617,000

(22) PCT Filed: May 25, 2020

(86) PCT No.: PCT/KR2020/006952
§ 371 (c)(1),
(2) Date: Dec. 6, 2021

(87) PCT Pub. No.: WO2020/246750
PCT Pub. Date: Dec. 10, 2020

(65) Prior Publication Data
US 2022/0233700 A1    Jul. 28, 2022

(30) Foreign Application Priority Data
Jun. 7, 2019 (KR) .................. 10-2019-0067129

(51) Int. Cl.
| | |
|---|---|
| *C07D 471/04* | (2006.01) |
| *A61K 39/12* | (2006.01) |
| *A61K 39/145* | (2006.01) |
| *A61K 39/215* | (2006.01) |
| *A61K 39/39* | (2006.01) |
| *A61K 47/24* | (2006.01) |
| *A61P 31/14* | (2006.01) |
| *A61P 31/16* | (2006.01) |
| *C12N 7/00* | (2006.01) |
| *C12N 15/86* | (2006.01) |
| *A61K 39/00* | (2006.01) |

(52) U.S. Cl.
CPC .............. *A61K 47/24* (2013.01); *A61K 39/12* (2013.01); *A61K 39/145* (2013.01); *A61K 39/215* (2013.01); *A61K 39/39* (2013.01); *A61P 31/14* (2018.01); *A61P 31/16* (2018.01); *C12N 7/00* (2013.01); *C12N 15/86* (2013.01); *A61K 2039/55561* (2013.01); *C12N 2760/16134* (2013.01); *C12N 2760/16171* (2013.01); *C12N 2770/20034* (2013.01); *C12N 2770/20071* (2013.01); *C12N 2770/24134* (2013.01); *C12N 2770/24171* (2013.01); *C12N 2770/32034* (2013.01); *C12N 2770/32043* (2013.01); *C12N 2770/32071* (2013.01); *C12N 2770/32234* (2013.01); *C12N 2770/32243* (2013.01); *C12N 2770/32271* (2013.01); *C12N 2770/32343* (2013.01); *C12N 2770/32371* (2013.01); *C12N 2840/203* (2013.01)

(58) Field of Classification Search
CPC ...... A61K 47/24; A61K 39/12; A61K 39/145; A61K 39/215; A61K 39/39; A61P 31/14; A61P 31/16; C12N 7/00; C12N 15/86
See application file for complete search history.

(56) References Cited

U.S. PATENT DOCUMENTS

| | | | | |
|---|---|---|---|---|
| 2007/0280929 A1* | 12/2007 | Hoerr et al. | ........ | A61K 31/7088 |
| | | | | 424/130.1 |
| 2018/0044674 A1* | 2/2018 | Keum et al. | ......... | C12N 15/113 |

FOREIGN PATENT DOCUMENTS

| | | | | |
|---|---|---|---|---|
| JP | 5871212 B2 | 3/2016 | | |
| KR | 1020100108428 A | 10/2010 | | |
| KR | 1020110017146 A | 2/2011 | | |
| KR | 101824415 B1 | 2/2018 | | |
| KR | 1020190061114 A | 6/2019 | | |
| WO | WO03020927 A2 * | 3/2003 | ............. | C12N 15/09 |

* cited by examiner

*Primary Examiner* — Scarlett Y Goon
*Assistant Examiner* — Samantha Lynn Schachermeyer
(74) *Attorney, Agent, or Firm* — Rabin & Berdo, P.C.

(57) ABSTRACT

The present disclosure relates to a pharmaceutical composition comprising a nucleic acid molecule of an adjuvant, a metal complex stabilizing the nucleic acid molecule, and optionally an immunogen that may be a peptide or a protein, or a composition of stabilizing the nucleic acid molecule of the adjuvant comprising the metal complex. The metal complex interacts with the nucleic acid molecule of the adjuvant and/or the immunogen so as to stabilize such pharmaceutically active ingredients, and induces continuous effectiveness of the active ingredients without degradation.

18 Claims, 22 Drawing Sheets

Specification includes a Sequence Listing.

SEQUENCE LISTING

```
<160> NUMBER OF SEQ ID NOS: 56

<210> SEQ ID NO 1
<211> LENGTH: 754
<212> TYPE: DNA
<213> ORGANISM: Coxsackievirus B

<400> SEQUENCE: 1
ttaaaacagc ctgtgggttg atcccaccca cagggcctat tgggcgctag cactctggta     60
```

```
tcacggtacc tttgtgcgcc tgttttatat cccctccccc aactgtaact tagaagtaac    120
acactccgat caacagtcag cgtggcacac cagccatgtt ttgatcaagc acttctgtta    180
ccccggactg agtatcaata gactgctcac gcggttgaag gagaaagcgt tcgttatccg    240
gccaactact tcgaaaaacc cagtaacacc atagaggttg cagagtgttt cgctcagcac    300 tacccagtg tagaccaggc cgatgagtca ccgcattccc cacgggcgac cgtggcggtg     360
gctgcgttgg cggcctgcct atggggaaac ccataggacg ctctaataca gacatggtgc    420
gaagagtcta ttgagctagt tggtaatcct ccggcccctg aatgcggcta atcctaactg    480
cggacagcac accctcaaac cagagggcag tgtgtcgtaa cggcaactc tgcagcggaa     540 ccgactactt tgggtgtccg tgtttcattt tattcctata ctggctgctt atggtgacaa    600
ttgagagatt gttaccatat agctattgga ttggccatcc ggtgtctaat agagctatta    660
tatatctctt tgttggattt ataccactta gcttgagaga ggttaaaaca ttacaattca    720
ttgttaaatt gaatacaaca aaatggcagc tcaa                                754
```

<210> SEQ ID NO 2
<211> LENGTH: 574
<212> TYPE: DNA
<213> ORGANISM: Encephalomyocarditis virus

<400> SEQUENCE: 2

```
cccctctccc tccccccccc ctaacgttac tggccgaagc cgcttggaat aaggccggtg    60
tgcgtttgtc tatatgttat tttccaccat attgccgtct tttggcaatg tgagggcccg    120
gaaacctggc cctgtcttct tgacgagcat tcctaggggt ctttcccctc tcgccaaagg    180
aatgcaaggt ctgttgaatg tcgtgaagga agcagttcct ctggaagctt cttgaagaca    240
aacaacgtct gtagcgaccc tttgcaggca gcggaacccc ccacctggcg acaggtgcct    300
ctgcggccaa aagccacgtg tataagatac acctgcaaag gcggcacaac cccagtgcca    360
cgttgtgagt tggatagttg tggaaagagt caaatggctc tcctcaagcg tattcaacaa    420
ggggctgaag gatgcccaga aggtacccca ttgtatggga tctgatctgg ggcctcggtg    480
cacatgcttt acatgtgttt agtcgaggtt aaaaaacgtc taggcccccc gaaccacggg    540
gacgtggttt cctttgaaa acacgatga taat                                  574
```

<210> SEQ ID NO 3
<211> LENGTH: 195
<212> TYPE: DNA
<213> ORGANISM: Cricket paralysis virus

<400> SEQUENCE: 3

```
aaagcaaaaa tgtgatcttg cttgtaaata caattttgag aggttaataa attacaagta    60
gtgctatttt tgtatttagg ttagctattt agctttacgt tccaggatgc ctagtggcag    120
ccccacaata tccaggaagc cctctctgcg gttttcaga ttaggtagtc gaaaaaccta     180
agaaatttac ctgct                                                     195
```

<210> SEQ ID NO 4
<211> LENGTH: 103
<212> TYPE: DNA
<213> ORGANISM: Coxsackievirus B

<400> SEQUENCE: 4

```
taaattagag acaatttgat ctgatttgaa ttggcttaac cctactgtac taaccga agacaacggt gcagtagggg taaattctcc gcattcggtg cgg      103

<210> SEQ ID NO 5
<211> LENGTH: 123
<212> TYPE: DNA
<213> ORGANISM: Encephalomyocarditis virus

<400> SEQUENCE: 5
tagtgtagtc actggcacaa cgcgttaccc ggtaagccaa tcgggtatac acggtcgtca      60
tactgcagac agggttcttc tactttgcaa gatagtctag agtagtaaaa taaatagata      120
gag      123

<210> SEQ ID NO 6
<211> LENGTH: 18
<212> TYPE: DNA
<213> ORGANISM: Bacteriophage T7

<400> SEQUENCE: 6
taatacgact cactatag      18

<210> SEQ ID NO 7
<211> LENGTH: 220
<212> TYPE: DNA
<213> ORGANISM: Simian virus 40

<400> SEQUENCE: 7
agacatgata agatacattg atgagtttgg acaaaccaca acaagaatgc agtgaaaaaa      60
atgctttatt tgtgaaattt gtgatgctat tgctttattt gtaaccatta taagctgcaa      120
taaacaagtt aacaacaaca atgcattcat tttatgtttc aggttcaggg ggagatgtgg      180
gaggtttttt aaagcaagta aaacctctac aaatgtggta      220

<210> SEQ ID NO 8
<211> LENGTH: 4011
<212> TYPE: DNA
<213> ORGANISM: MIDDLE EAST RESPIRATORY SYNDROME CORONAV VIRUS

<400> SEQUENCE: 8
attcactctg tgttcctgct gatgttcctg ctgacaccaa cagagtccta tgtggatgtg      60
ggacctgact ctgtgaagtc tgcctgtatt gaggtggaca tccaacagac cttctttgac      120
aagacctggc caagaccaat tgatgtgagc aaggctgatg catcatcta cccacagggc      180 aggacctaca gcaacatcac catcacctac cagggactgt tccatacca gggagatcat      240 ggagatatgt atgtctactc tgctggtcat gccacaggca ccacaccaca gaaactgttt      300
gtggctaact acagccagga tgtgaagcag ttgccaatg ctttgtggt gaggattgga      360 gcagcagcca acagcacagg cacagtgatt atcagcccaa gcacctctgc caccatcagg      420
aagatttacc ctgcctttat gctgggctcc tctgtgggca acttctctga tggcaagatg      480
ggcaggttct tcaaccacac cctggtgctg ctgcctgatg gctgtggcac cctgctgagg      540
gctttctact gtatcttgga accaaggtct ggcaaccact gtcctgctgg caactcctac      600
acctcctttg ccacctacca cacacctgcc acagactgtt ctgatggcaa ctacaacagg      660
aatgcctccc tgaactcctt caaggaatac ttcaacctga ggaactgtac ctttatgtac      720
acctacaaca tcacagagga tgagattttg gagtggtttg gcatcaccca gacagcccag      780
ggagtgcatc tgttctcgag cagatatgtg gacctctatg gaggcaatat gttccagttt      840
gccacccctg ctgtctatga caccatcaaa tactacagca tcatcccaca cagcatcagg      900

```
agcatccagt ctgacaggaa ggcttgggct gccttctatg tctacaaact ccaaccactg    960
accttcctgc tggacttctc tgtggatggc tacatcagga gggctattga ctgtggcttc   1020
aatgacctga gccaacttca ctgttcctat gagtcctttg atgtggagtc tggagtctac   1080
tctgtgtcct cctttgaggc taagccatct ggctctgtgg tggaacaggc tgagggagtg   1140
gagtgtgact tcagcccact gctgtctggc acacctccac aggtctacaa cttcaagaga   1200
ctggtgttca ccaactgtaa ctacaacctg accaaactgc tgtccctgtt ctctgtgaat   1260
gacttcactt gtagccagat tagccctgct gccattgcca gcaactgtta ctcctccctg   1320
attctggact acttctccta cccactgagt atgaagtctg acctgtctgt gtcctctgct   1380
ggaccaatca gccagttcaa ctacaagcag tccttcagca acccaacttg tctgattctg   1440
gctacagtgc cacacaacct gaccaccatc accaagccac tgaaatactc ctacatcaac   1500
aagtgtagca gactgctgtc tgatgacagg acagaggtgc acaactagt gaatgccaac   1560 caatacagcc catgtgtgag cattgtgcca agcacagtgt gggaggatgg agactactac   1620
aggaagcaac ttagcccatt ggagggagga ggctggctgg tggcatctgg cagcacagtg   1680
gctatgacag aacaactcca aatgggcttt ggcatcacag tccaatatgg cacagacacc   1740
aactctgtgt gtccaaaatt ggagtttgcc aatgacacca agattgccag ccaacttggc   1800
aactgtgtgg aatactccct ctatggagtg tctggcaggg gagtgttcca gaactgtact   1860
gctgtgggag tgagacaaca gaggtttgtc tatgatgcct accagaacct ggtgggctac   1920
tactctgatg atggcaacta ctactgtctg agggcttgtg tgtctgtgcc tgtgtctgtg   1980
atttatgaca aggagaccaa gacccatgcc accctgtttg gctctgtggc ttgtgaacac   2040
atctccagca caatgagtca atacagcagg agcaccagga gtatgctgaa aaggagggac   2100
agcacatatg gaccactcca aacacctgtg ggctgtgtgc tgggactggt gaactcctcc   2160
ctgtttgtgg aggactgtaa actgccactg gacaatccc tgtgtgccct gcctgacaca   2220
ccaagcaccc tgacaccaag gtctgtgagg tctgtgcctg gagagatgag actggcaagc   2280
attgccttca accacccaat ccaggtggac caacttaact cctcctactt caaactgagc   2340
atcccaacca acttctcctt tggagtgacc caggaataca tccagaccac catccagaag   2400
gtgacagtgg actgtaagca atatgtgtgt aatggcttcc agaagtgtga caacttctg   2460 agggaatatg gacaattctg tagcaagata aaccaggctc ttcatggagc caacctgaga   2520
caggatgact ctgtgaggaa cctgtttgcc tctgtgaagt ccagccagtc cagcccaatc   2580
atccctggct ttgagggaga cttcaacctg accctgttgg aaccggtgag catcagcaca   2640
ggcagcaggt ctgccaggtc tgccattgag acctgctgt ttgacaaggt gaccattgct   2700
gaccctggct atatgcaggg ctatgatgac tgtatgcaac agggacctgc ctctgccagg   2760
gacctgattt gtgcccaata tgtggctggc tacaaggtgc tgcctccact gatggatgtg   2820
aatatggagg ctgcctacac ctcctccctg ctgggcagca ttgctggagt gggctggact   2880
gcaggactgt cctcctttgc tgccatccca tttgcccaga gcatcttcta cagactgaat   2940
ggagtgggca tcacccaaca ggtgctgtct gagaaccaga aactgattgc caacaagttc   3000
aaccaggctc tgggagctat gcagacaggc ttcaccacca ccaatgaggc tttccagaag   3060
gtccaggatg ctgtgaacaa caatgcccag gctctgagca aactggcatc tgaactgagc   3120 aacaccttg gagccatctc tgctagcatt ggagacatca tccagagact ggatgtgttg   3180
gaacaggatg cccagattga cagactgata aatggcagac tgaccaccct gaatgccttt   3240
```

-continued

```
gtggctcaac aacttgtgag gtctgagtct gctgccctgt ctgcccaact tgccaaggac    3300
aaggtgaatg agtgtgtgaa ggctcaaagc aagaggtctg gcttctgtgg acaaggcacc    3360
cacattgtgt cctttgtggt gaatgcccca atggactct actttatgca tgtgggctac     3420
tacccaagca accacattga ggtggtgtct gcctatggac tgtgtgatgc tgccaaccca    3480
accaactgta ttgcccctgt gaatggctac ttcatcaaga ccaacaacac caggattgtg    3540
gatgagtggt cctacacagg ctcctccttc tatgcccctg aaccaatcac ctccctgaac    3600
accaaatatg tggctccaca ggtgacctac cagaacatca gcaccaacct gcctcctcca    3660
ctgctgggca acagcacagg cattgacttc caggatgaac tggatgagtt cttcaagaat    3720
gtgagcacca gcatcccaaa cttttggctcc ctgacccaga taaacaccac cctgctggac    3780
ctgacctatg agatgctgtc cctccaacag gtggtgaagg ctctgaatga gtcctacatt    3840
gacctgaaag aactgggcaa ctacacctac tacaacaagt ggccatggta catctggctg    3900
ggcttcatcg ctggcctggt ggccctggcg ctgtgcgtgt tcttcatcct gtgctgcacc    3960
ggctgcggca ccaactgcat gggcaagctg aagtgcaaca ggtgctgcga c            4011
```

<210> SEQ ID NO 9
<211> LENGTH: 1691
<212> TYPE: DNA
<213> ORGANISM: Influenza virus

<400> SEQUENCE: 9

```
aaggccaacc tgctcgtgct gctgtgcgcc ctcgcggccg ccgacgccga caccatctgc    60
atcggctacc acgccaacaa cagcaccgac acggtcgaca ccgtgctgga gaagaacgtg    120
accgtcaccc actccgtgaa cctgctcgag gacagccaca cgggaagct gtgccggctg    180 aagggcatcg cgcccctcca gctggggaag tgcaacatcg ccggctggct gctcgggaac    240
ccggagtgcg accccctgct gcccgtgcgc tcctggagct acatcgtcga gacgcccaac    300
tccgagaacg gcatctgcta cccgggcgac ttcatcgact acgaggaact ccgggagcag    360
ctgagttccg tgagttcctt cgagcgcttc gagatcttcc ccaaggagag ttcctggccc    420
aaccacaaca caaacgggt gaccgccgcc tgcagccacg agggcaagtc cagcttctac    480
cggaacctgc tctggctgac cgagaaggag gggtcctacc ccaagctgaa gaacagctac    540
gtcaacaaga agggcaagga ggtgctcgtg ctgtggggga tccaccaccc gcccaactcc    600
aaggagcagc agaacctgta ccagaacgag aacgcgtacg tcagcgtggt gacgtccaac    660
tacaaccgcc ggttcacccc cgagatcgcc gagcgcccca ggtccgggga ccaggccggc    720
cgcatgaact actactggac cctcctgaag ccgggcgaca ccatcatctt cgaggccaac    780
gggaacctga tcgcccccgat gtacgcgttc gccctcagcc ggggcttcgg gagcggcatc    840
atcacgtcca cgccagcat gcacgagtgc aacaccaagt gccagacccc cctgggcgcc    900
atcaactcca gctgccccta ccagaacatc acccgtgtga catcggggga gtgcccaag    960 tacgtgcgct ccgccaagct ccggatggtc acgggcctgc gcaacaaccc cagcatccag    1020
tcccgggggc tgttcggcgc gatcgccggg ttcatcgagg cggctggac cgggatgatc    1080 gacggctggt acgggtacca ccaccagaac gagcagggca gcgggtacgc cgccgaccag    1140
aagtccaccc agaacgccat caacggcatc accaacaagt gaacacggtg atcgagaaga    1200
tgaacatcca gttcaccgcg gtcggcaagg agttcaacaa gctcgagaag cgcatggaga    1260
acctgaacaa gaaggtggac gacggggtcc tggacatctg gacctacaac gccgaactcc    1320
tggtgctgct cgagaacgag cggaccctgg acttccacga cagcaacgtc aagaacctgt    1380
```

```
acgagaaggt gaagtcccag ctcaagaaca acgccaagga gatcggcaac gggtgcttcg    1440
agttctacca caagtgcgac aacgagtgca tggagagcgt ccgcaacggc acgtacgact    1500
accccaagta ctccgaggag agcaagctga accgggagaa ggtggacggg gtgaagctgg    1560
agtccatggg catctaccag atcctcgcca tctacagcac cgtcgcctcc agcctggtgc    1620
tgctggtgtc cctcggcgcg atcagcttct ggatgtgcag caacgggtcc ctgcagtgcc    1680
gcatctgcat c                                                        1691

<210> SEQ ID NO 10
<211> LENGTH: 1694
<212> TYPE: DNA
<213> ORGANISM: Influenza virus

<400> SEQUENCE: 10
atgaaggcca acctgctcgt gctgctgtgc gccctcgcgg ccgccgacgc cgacaccatc      60
tgcatcggct accacgccaa caacagcacc gacacggtcg acaccgtgct ggagaagaac     120
gtgaccgtca cccactccgt gaacctgctc gaggacagcc acaacgggaa gctgtgccgg     180 ctgaaggca tcgcgcccct ccagctgggg aagtgcaaca tcgccggctg gctgctcggg     240
aacccggagt gcgaccccct gctgcccgtg cgctcctgga gctacatcgt cgagacgccc     300
aactccgaga acggcatctg ctaccccggc gacttcatcg actacgagga actccgggag     360
cagctgagtt ccgtgagttc cttcgagcgc ttcgagatct cccccaagga gagttcctgg     420
cccaaccaca caccaacgg ggtgaccgcc gcctgcagcc acgagggcaa gtccagcttc     480
taccggaacc tgctctggct gaccgagaag gaggggtcct accccaagct gaagaacagc     540
tacgtcaaca gaagggcaa ggaggtgctc gtgctgtggg ggatccacca cccgcccaac     600
tccaaggagc agcagaacct gtaccagaac gagaacgcgt acgtcagcgt ggtgacgtcc     660
aactacaacc gccggttcac ccccgagatc gccgagcgcc ccaaggtccg ggaccaggcc     720
ggccgcatga actactactg gaccctcctg aagccggggcg acaccatcat cttcgaggcc     780
aacgggaacc tgatcgcccc gatgtacgcg ttcgccctca gccggggctt cgggagcggc     840
atcatcacgt ccaacgccag catgcacgag tgcaacaccat agtgccagac cccctgggc     900 gccatcaact ccagcctgcc ctaccagaac atccacccgg tgaccatcgg ggagtgcccc     960
aagtacgtgc gctccgccaa gctccggatg gtcacgggcc tgcgcaacaa ccccagcatc    1020
cagtcccggg gctgttcgg cgcgatcgcc gggttcatcg agggcggctg gaccgggatg    1080
atcgacggct ggtacgggta ccaccaccag aacgagcagg gcagcgggta cgccgccgac    1140
cagaagtcca cccagaacgc catcaacggc atcaccaaca gtgaacacg tgatcgaga    1200 agatgaacat ccagttcacc gcggtcggca aggagttcaa caagctcgag aagcgcatgg    1260
agaacctgaa caagaaggtg gacgacgggt tcctggacat ctggacctac aacgccgaac    1320
tcctggtgct gctcgagaac gagcggaccc tggacttcca cgacagcaac gtcaagaacc    1380
tgtacgagaa ggtgaagtcc cagctcaaga caacgccaa ggagatcggc aacgggtgct    1440
tcgagttcta ccacaagtgc gacaacgagt gcatggagag cgtccgcaac ggcacgtacg    1500
actaccccaa gtactccgag agagcaagc tgaaccggga gaaggtggac ggggtgaagc    1560
tggagtccat gggcatctac cagatcctcg ccatctacag caccgtcgcc tccagcctgg    1620
tgctgctggt gtccctcggc gcgatcagct tctggatgtg cagcaacggg tccctgcagt    1680
gccgcatctg catc                                                      1694
```

<210> SEQ ID NO 11
<211> LENGTH: 1298
<212> TYPE: DNA
<213> ORGANISM: Japanese encephalitis virus

<400> SEQUENCE: 11

| | | | | | |
|---|---|---|---|---|---|
| ccagtggagc | cacttgggtg | gacttggtgc | tagaaggaga | cagctgcttg | acaatcatgg | 60 |
| caaacgacaa | accaacattg | gacgtccgca | tgatcaacat | cgaagctagc | caacttgctg | 120 |
| aggtcagaag | ttactgctat | catgcttcag | tcactgacat | ctcgacggtg | gctcggtgcc | 180 |
| ccacgactgg | agaagcccac | aacgagaagc | gagctgatag | tagctatgtg | tgcaaacaag | 240 |
| gcttcactga | tcgtgggtgg | ggcaacggat | gtggactttt | cgggaaggga | agtattgaca | 300 |
| catgtgcaaa | attctcctgc | accagcaaag | cgattggaag | aacaatccag | tcagaaaaca | 360 |
| tcaaatacga | agttggcatt | tttgtgcatg | gaaccaccac | ttcggaaaac | catgggaatt | 420 |
| attcagcgca | gtggggcg | tcccaggcgg | caaagtttac | agtaacacct | aatgctcctt | 480 |
| cgataaccct | caaacttggt | gactacgag | aagtcacact | ggactgtgag | ccaaggagtg | 540 |
| gactaaacac | tgaagcgttt | tacgtcatga | ccgtggggtc | aaagtcattt | ttggtccata | 600 |
| gggaatggtt | tcatgacctc | gctctccctt | ggacgccccc | ttcgagcaca | gcgtggagaa | 660 |
| acagagaact | cctcatggaa | tttgaagagg | cgcacgccac | aaaacagtcc | gttgttgctc | 720 |
| tgggtcaca | ggaaggaggc | ctccatcagg | cgttggcagg | agccatcgtg | tggagtact | 780 |
| caagctcagt | gaagttaaca | tcaggccacc | taaaatgcag | gctgaaaatg | acaaactgg | 840 |
| ctctgaaagg | cacaacctat | ggtatgtgca | cagaaaaatt | ctcgttcgcg | aaaaatccgg | 900 |
| cggacactgg | tcacggaaca | gttgtcattg | aactttcata | ctctgggagt | gatggcccct | 960 |
| gcaagattcc | gattgtctcc | gttgctagcc | tcaatgacat | gaccccgtc | gggcggctgg | 1020 |
| tgacggtgaa | ccccttcgtc | gcgacttcca | gcgccaactc | aaaggtgctg | gtcgagatgg | 1080 |
| aacccccctt | cggagactcc | tacatcgtag | ttggaagggg | agacaagcag | attaaccacc | 1140 |
| attggtacaa | ggctggaagc | acgctgggca | aagccttttc | aacgactttg | aagggagctc | 1200 |
| aaagactggc | agcgttgggc | gacacagcct | gggactttgg | ctctattgga | ggggtcttca | 1260 |
| actccatagg | gaaagctgtt | caccaagtgt | ttggttaa | | | 1298 |

<210> SEQ ID NO 12
<211> LENGTH: 1866
<212> TYPE: DNA
<213> ORGANISM: Varicella zoster

<400> SEQUENCE: 12

| | | | | | |
|---|---|---|---|---|---|
| gggacagtta | ataaacctgt | ggtgggggta | ttgatggggt | tcggaattat | cacgggaacg | 60 |
| ttgcgtataa | cgaatccggt | cagagcatcc | gtcttgcgat | acgatgattt | tcacatcgat | 120 |
| gaagacaaac | tggatacaaa | ctccgtatat | gagccttact | accattcaga | tcatgcggag | 180 |
| tcttcatggg | taaatcgggg | agagtcttcg | cgaaaagcgt | acgatcataa | ctcaccttat | 240 |
| atatggccac | gtaatgatta | tgatggattt | ttagagaacg | cacacgaaca | ccatggggtg | 300 |
| tataatcagg | gccgtggtat | cgatagcggg | gaacggttaa | tgcaacccac | acaaatgtct | 360 |
| gcacaggagg | atcttgggga | cgatacgggc | atccacgtta | tccctacgtt | aaacggcgat | 420 |
| gacagacata | aaattgtaaa | tgtggaccaa | cgtcaatacg | gtgacgtgtt | taaggagat | 480 |
| cttaatccaa | aaccccaagg | ccaaagactc | attgaggtgt | cagtgaaaga | aaatcacccg | 540 |
| tttactttac | gcgcaccgat | tcagcggatt | tatggagtcc | ggtacaccga | gacttggagc | 600 |

```
tttttgccgt cattaacctg tacgggagac gcagcgcccg ccatccagca tatatgttta    660
aaacatacaa catgctttca agacgtggtg gtggatgtgg attgcgcgga aaatactaaa    720
gaggatcagt tggccgaaat cagttaccgt tttcaaggta agaaggaagc ggaccaaccg    780
tggattgttg taaacacgag cacactgttt gatgaactcg aattagaccc ccccgagatt    840
gaaccgggtg tcttgaaagt acttcggaca gaaaaacaat acttgggtgt gtacatttgg    900
aacatgcgcg gctccgatgg tacgtctacc tacgccacgt ttttggtcac ctggaaaggg    960
gatgaaaaaa caagaaaccc tacgcccgca gtaactcctc aaccaagagg ggctgagttt   1020
catatgtgga attaccactc gcatgtattt tcagttggtg atacgtttag cttggcaatg   1080
catcttcagt ataagataca tgaagcgcca tttgatttgc tgttagagtg gttgtatgtc   1140
cccatcgatc ctacatgtca accaatgcgg ttatattcta cgtgtttgta tcatcccaac   1200
gcaccccaat gcctctctca tatgaattcc ggttgtacat ttacctcgcc acatttagcc   1260
cagcgtgttg caagcacagt gtatcaaaat tgtgaacatg cagataacta caccgcatat   1320
tgtctgggaa tatctcatat ggagcctagc tttggtctaa tcttacacga cgggggcacc   1380
acgttaaagt ttgtagatac acccgagagt ttgtcgggat tatacgtttt tgtggtgtat   1440
tttaacgggc atgttgaagc cgtagcatac actgttgtat ccacagtaga tcattttgta   1500
aacgcaattg aagagcgtgg atttccgcca acggccggtc agccaccggc gactactaaa   1560
cccaaggaaa ttaccccccgt aaaccccgga acgtcaccac ttctacgata tgccgcatgg   1620 accgagggc ttgcagcagt agtacttttta tgtctcgtaa tattttttaat ctgtacggct   1680 aaacgaatga gggttaaagc ctataggta gacaagtccc cgtataacca aagcatgtat   1740
tacgctggcc ttccagtgga cgatttcgag gactcggaat ctacggatac ggaagaagag   1800
tttggtaacg cgattggagg gagtcacggg ggttcgagtt acacggtgta tatagataag   1860
acccgg                                                              1866
```

<210> SEQ ID NO 13
<211> LENGTH: 666
<212> TYPE: DNA
<213> ORGANISM: Influenza virus

<400> SEQUENCE: 13

```
ggcctattcg gcgcaatagc aggtttcata gaaaatggtt gggagggaat gatagacggt     60
tggtacggtt tcaggcatca aaattctgag ggcacaggac aagcagcaga tcttaaaagc    120
actcaagcag ccatcgacca aatcaatggg aaattgaaca gggtaatcga aaagacgaac    180
gagaaattcc atcaaatcga aaaggaattc tcagaagtag aagggagaat tcaggacctc    240
gagaaatacg ttgaagacac taaaatagat ctctggtctt acaatgcgga gcttcttgtc    300
gctctggaga atcaacatac aattgacctg actgactcgg aaatgaacaa gctgtttgaa    360 aaacaagga ggcaactgag ggaaaatgct gaagacatgg gcaatggttg cttcaaaata    420
taccacaaat gtgacaacgc ttgcatagag tcaatcagaa atgggactta tgaccatgat    480
gtatacagag acgaagcatt aaacaaccgg tttcagatca aggtgttga actgaagtct    540 ggatacaaag actggattct gtggatttcc tttgccatat catgcttttt gctttgtgtt    600
gttttgctgg ggttcatcat gtgggcctgc cagagaggca acattaggtg caacatttgc    660
atttga                                                              666
```

<210> SEQ ID NO 14

-continued

<211> LENGTH: 672
<212> TYPE: DNA
<213> ORGANISM: Influenza virus

<400> SEQUENCE: 14

```
ggtttcttcg gagctattgc tggtttctta gaaggaggat gggaaggaat gattgcaggt      60
tggcacggat acacatccca tggagcacat ggagtagcag tggcagcaga ccttaagagt     120
acgcaagaag cctataaacaa gataacaaaa aatctcaatt ctttgagtga gctggaagta     180
aagaatcttc aaagactaag cggtgccatg gatgaactcc acaacgaaat actcgaactg     240
gatgagaaag tggatgatct cagagctgat acaataagct cgcaaataga gctcgcagtc     300
ttgctttcca acgaaggaat aataaacagt gaagatgagc atctcttggc gcttgaaaga     360
aaactgaaga aaatgctggg cccctctgct gtagagatag ggaatggatg cttcgaaacc     420
aaacacaagt gcaaccagac ctgcctagac agaatagctg ctggcacctt taatgcagga     480
gaattttctc ttcccacctt tgattcacta aatattactg ctgcatcttt aaatgatgat     540
ggattggata atcatactat actgctttac tactcaactg ctgcttccag tttggctgta     600
acattgatga tagctatctt tattgtttat atggtctcca gagacaatgt ttcttgctcc     660
atctgtctat ag                                                         672
```

<210> SEQ ID NO 15
<211> LENGTH: 1338
<212> TYPE: PRT
<213> ORGANISM: MIDDLE EAST RESPIRATORY SYNDROME CORONAV VIRUS

<400> SEQUENCE: 15

```
Met Ile His Ser Val Phe Leu Leu Met Phe Leu Leu Thr Pro Thr Glu
1               5                   10                  15

Ser Tyr Val Asp Val Gly Pro Asp Ser Val Lys Ser Ala Cys Ile Glu
            20                  25                  30

Val Asp Ile Gln Gln Thr Phe Phe Asp Lys Thr Trp Pro Arg Pro Ile
        35                  40                  45

Asp Val Ser Lys Ala Asp Gly Ile Ile Tyr Pro Gln Gly Arg Thr Tyr
    50                  55                  60

Ser Asn Ile Thr Ile Thr Tyr Gln Gly Leu Phe Pro Tyr Gln Gly Asp
65                  70                  75                  80

His Gly Asp Met Tyr Val Tyr Ser Ala Gly His Ala Thr Gly Thr Thr
                85                  90                  95

Pro Gln Lys Leu Phe Val Ala Asn Tyr Ser Gln Asp Val Lys Gln Phe
            100                 105                 110

Ala Asn Gly Phe Val Val Arg Ile Gly Ala Ala Ala Asn Ser Thr Gly
        115                 120                 125

Thr Val Ile Ile Ser Pro Ser Thr Ser Ala Thr Ile Arg Lys Ile Tyr
    130                 135                 140

Pro Ala Phe Met Leu Gly Ser Ser Val Gly Asn Phe Ser Asp Gly Lys
145                 150                 155                 160

Met Gly Arg Phe Phe Asn His Thr Leu Val Leu Leu Pro Asp Gly Cys
                165                 170                 175

Gly Thr Leu Leu Arg Ala Phe Tyr Cys Ile Leu Glu Pro Arg Ser Gly
            180                 185                 190

Asn His Cys Pro Ala Gly Asn Ser Tyr Thr Ser Phe Ala Thr Tyr His
        195                 200                 205

Thr Pro Ala Thr Asp Cys Ser Asp Gly Asn Tyr Asn Arg Asn Ala Ser
    210                 215                 220
```

-continued

```
Leu Asn Ser Phe Lys Glu Tyr Phe Asn Leu Arg Asn Cys Thr Phe Met
225                 230                 235                 240

Tyr Thr Tyr Asn Ile Thr Glu Asp Glu Ile Leu Glu Trp Phe Gly Ile
            245                 250                 255

Thr Gln Thr Ala Gln Gly Val His Leu Phe Ser Ser Arg Tyr Val Asp
        260                 265                 270

Leu Tyr Gly Gly Asn Met Phe Gln Phe Ala Thr Leu Pro Val Tyr Asp
    275                 280                 285

Thr Ile Lys Tyr Tyr Ser Ile Ile Pro His Ser Ile Arg Ser Ile Gln
290                 295                 300

Ser Asp Arg Lys Ala Trp Ala Ala Phe Tyr Val Tyr Lys Leu Gln Pro
305                 310                 315                 320

Leu Thr Phe Leu Leu Asp Phe Ser Val Asp Gly Tyr Ile Arg Arg Ala
            325                 330                 335

Ile Asp Cys Gly Phe Asn Asp Leu Ser Gln Leu His Cys Ser Tyr Glu
        340                 345                 350

Ser Phe Asp Val Glu Ser Gly Val Tyr Ser Val Ser Ser Phe Glu Ala
    355                 360                 365

Lys Pro Ser Gly Ser Val Val Glu Gln Ala Glu Gly Val Glu Cys Asp
370                 375                 380

Phe Ser Pro Leu Leu Ser Gly Thr Pro Pro Gln Val Tyr Asn Phe Lys
385                 390                 395                 400

Arg Leu Val Phe Thr Asn Cys Asn Tyr Asn Leu Thr Lys Leu Leu Ser
            405                 410                 415

Leu Phe Ser Val Asn Asp Phe Thr Cys Ser Gln Ile Ser Pro Ala Ala
        420                 425                 430

Ile Ala Ser Asn Cys Tyr Ser Ser Leu Ile Leu Asp Tyr Phe Ser Tyr
    435                 440                 445

Pro Leu Ser Met Lys Ser Asp Leu Ser Val Ser Ser Ala Gly Pro Ile
450                 455                 460

Ser Gln Phe Asn Tyr Lys Gln Ser Phe Ser Asn Pro Thr Cys Leu Ile
465                 470                 475                 480

Leu Ala Thr Val Pro His Asn Leu Thr Thr Ile Thr Lys Pro Leu Lys
            485                 490                 495

Tyr Ser Tyr Ile Asn Lys Cys Ser Arg Leu Leu Ser Asp Asp Arg Thr
        500                 505                 510

Glu Val Pro Gln Leu Val Asn Ala Asn Gln Tyr Ser Pro Cys Val Ser
    515                 520                 525

Ile Val Pro Ser Thr Val Trp Glu Asp Gly Asp Tyr Tyr Arg Lys Gln
530                 535                 540

Leu Ser Pro Leu Glu Gly Gly Gly Trp Leu Val Ala Ser Gly Ser Thr
545                 550                 555                 560

Val Ala Met Thr Glu Gln Leu Gln Met Gly Phe Gly Ile Thr Val Gln
            565                 570                 575

Tyr Gly Thr Asp Thr Asn Ser Val Cys Pro Lys Leu Glu Phe Ala Asn
        580                 585                 590

Asp Thr Lys Ile Ala Ser Gln Leu Gly Asn Cys Val Glu Tyr Ser Leu
    595                 600                 605

Tyr Gly Val Ser Gly Arg Gly Val Phe Gln Asn Cys Thr Ala Val Gly
610                 615                 620

Val Arg Gln Gln Arg Phe Val Tyr Asp Ala Tyr Gln Asn Leu Val Gly
625                 630                 635                 640
```

```
Tyr Tyr Ser Asp Asp Gly Asn Tyr Tyr Cys Leu Arg Ala Cys Val Ser
                645                 650                 655

Val Pro Val Ser Val Ile Tyr Asp Lys Glu Thr Lys Thr His Ala Thr
            660                 665                 670

Leu Phe Gly Ser Val Ala Cys Glu His Ile Ser Ser Thr Met Ser Gln
        675                 680                 685

Tyr Ser Arg Ser Thr Arg Ser Met Leu Lys Arg Arg Asp Ser Thr Tyr
    690                 695                 700

Gly Pro Leu Gln Thr Pro Val Gly Cys Val Leu Gly Leu Val Asn Ser
705                 710                 715                 720

Ser Leu Phe Val Glu Asp Cys Lys Leu Pro Leu Gly Gln Ser Leu Cys
                725                 730                 735

Ala Leu Pro Asp Thr Pro Ser Thr Leu Thr Pro Arg Ser Val Arg Ser
            740                 745                 750

Val Pro Gly Glu Met Arg Leu Ala Ser Ile Ala Phe Asn His Pro Ile
        755                 760                 765

Gln Val Asp Gln Leu Asn Ser Ser Tyr Phe Lys Leu Ser Ile Pro Thr
    770                 775                 780

Asn Phe Ser Phe Gly Val Thr Gln Glu Tyr Ile Gln Thr Thr Ile Gln
785                 790                 795                 800

Lys Val Thr Val Asp Cys Lys Gln Tyr Val Cys Asn Gly Phe Gln Lys
                805                 810                 815

Cys Glu Gln Leu Leu Arg Glu Tyr Gly Gln Phe Cys Ser Lys Ile Asn
            820                 825                 830

Gln Ala Leu His Gly Ala Asn Leu Arg Gln Asp Asp Ser Val Arg Asn
        835                 840                 845

Leu Phe Ala Ser Val Lys Ser Ser Gln Ser Ser Pro Ile Ile Pro Gly
    850                 855                 860

Phe Gly Gly Asp Phe Asn Leu Thr Leu Leu Glu Pro Val Ser Ile Ser
865                 870                 875                 880

Thr Gly Ser Arg Ser Ala Arg Ser Ala Ile Glu Asp Leu Leu Phe Asp
                885                 890                 895

Lys Val Thr Ile Ala Asp Pro Gly Tyr Met Gln Gly Tyr Asp Asp Cys
            900                 905                 910

Met Gln Gln Gly Pro Ala Ser Ala Arg Asp Leu Ile Cys Ala Gln Tyr
        915                 920                 925

Val Ala Gly Tyr Lys Val Leu Pro Pro Leu Met Asp Val Asn Met Glu
    930                 935                 940

Ala Ala Tyr Thr Ser Ser Leu Leu Gly Ser Ile Ala Gly Val Gly Trp
945                 950                 955                 960

Thr Ala Gly Leu Ser Ser Phe Ala Ala Ile Pro Phe Ala Gln Ser Ile
                965                 970                 975

Phe Tyr Arg Leu Asn Gly Val Gly Ile Thr Gln Gln Val Leu Ser Glu
            980                 985                 990

Asn Gln Lys Leu Ile Ala Asn Lys Phe Asn Gln Ala Leu Gly Ala Met
        995                 1000                1005

Gln Thr Gly Phe Thr Thr Thr Asn Glu Ala Phe Gln Lys Val Gln
    1010                1015                1020

Asp Ala Val Asn Asn Asn Ala Gln Ala Leu Ser Lys Leu Ala Ser
    1025                1030                1035

Glu Leu Ser Asn Thr Phe Gly Ala Ile Ser Ala Ser Ile Gly Asp
    1040                1045                1050

Ile Ile Gln Arg Leu Asp Val Leu Glu Gln Asp Ala Gln Ile Asp
```

```
            1055                1060                1065
Arg Leu Ile Asn Gly Arg Leu Thr Thr Leu Asn Ala Phe Val Ala
    1070                1075                1080

Gln Gln Leu Val Arg Ser Glu Ser Ala Ala Leu Ser Ala Gln Leu
    1085                1090                1095

Ala Lys Asp Lys Val Asn Glu Cys Val Lys Ala Gln Ser Lys Arg
    1100                1105                1110

Ser Gly Phe Cys Gly Gln Gly Thr His Ile Val Ser Phe Val Val
    1115                1120                1125

Asn Ala Pro Asn Gly Leu Tyr Phe Met His Val Gly Tyr Tyr Pro
    1130                1135                1140

Ser Asn His Ile Glu Val Val Ser Ala Tyr Gly Leu Cys Asp Ala
    1145                1150                1155

Ala Asn Pro Thr Asn Cys Ile Ala Pro Val Asn Gly Tyr Phe Ile
    1160                1165                1170

Lys Thr Asn Asn Thr Arg Ile Val Asp Glu Trp Ser Tyr Thr Gly
    1175                1180                1185

Ser Ser Phe Tyr Ala Pro Glu Pro Ile Thr Ser Leu Asn Thr Lys
    1190                1195                1200

Tyr Val Ala Pro Gln Val Thr Tyr Gln Asn Ile Ser Thr Asn Leu
    1205                1210                1215

Pro Pro Pro Leu Leu Gly Asn Ser Thr Gly Ile Asp Phe Gln Asp
    1220                1225                1230

Glu Leu Asp Glu Phe Phe Lys Asn Val Ser Thr Ser Ile Pro Asn
    1235                1240                1245

Phe Gly Ser Leu Thr Gln Ile Asn Thr Thr Leu Leu Asp Leu Thr
    1250                1255                1260

Tyr Glu Met Leu Ser Leu Gln Gln Val Val Lys Ala Leu Asn Glu
    1265                1270                1275

Ser Tyr Ile Asp Leu Lys Glu Leu Gly Asn Tyr Thr Tyr Tyr Asn
    1280                1285                1290

Lys Trp Pro Trp Tyr Ile Trp Leu Gly Phe Ile Ala Gly Leu Val
    1295                1300                1305

Ala Leu Ala Leu Cys Val Phe Phe Ile Leu Cys Cys Thr Gly Cys
    1310                1315                1320

Gly Thr Asn Cys Met Gly Lys Leu Lys Cys Asn Arg Cys Cys Asp
    1325                1330                1335

<210> SEQ ID NO 16
<211> LENGTH: 565
<212> TYPE: PRT
<213> ORGANISM: Influenza virus

<400> SEQUENCE: 16

Met Lys Ala Asn Leu Leu Val Leu Leu Cys Ala Leu Ala Ala Asp
1               5                   10                  15

Ala Asp Thr Ile Cys Ile Gly Tyr His Ala Asn Asn Ser Thr Asp Thr
                20                  25                  30

Val Asp Thr Val Leu Glu Lys Asn Val Thr Val Thr His Ser Val Asn
            35                  40                  45

Leu Leu Glu Asp Ser His Asn Gly Lys Leu Cys Arg Leu Lys Gly Ile
        50                  55                  60

Ala Pro Leu Gln Leu Gly Lys Cys Asn Ile Ala Gly Trp Leu Leu Gly
65                  70                  75                  80
```

```
Asn Pro Glu Cys Asp Pro Leu Leu Pro Val Arg Ser Trp Ser Tyr Ile
                85                  90                  95
Val Glu Thr Pro Asn Ser Glu Asn Gly Ile Cys Tyr Pro Gly Asp Phe
            100                 105                 110
Ile Asp Tyr Glu Glu Leu Arg Glu Gln Leu Ser Ser Val Ser Ser Phe
        115                 120                 125
Glu Arg Phe Glu Ile Phe Pro Lys Glu Ser Ser Trp Pro Asn His Asn
    130                 135                 140
Thr Asn Gly Val Thr Ala Ala Cys Ser His Glu Gly Lys Ser Ser Phe
145                 150                 155                 160
Tyr Arg Asn Leu Leu Trp Leu Thr Glu Lys Glu Gly Ser Tyr Pro Lys
                165                 170                 175
Leu Lys Asn Ser Tyr Val Asn Lys Lys Gly Lys Glu Val Leu Val Leu
            180                 185                 190
Trp Gly Ile His His Pro Pro Asn Ser Lys Glu Gln Gln Asn Leu Tyr
        195                 200                 205
Gln Asn Glu Asn Ala Tyr Val Ser Val Val Thr Ser Asn Tyr Asn Arg
    210                 215                 220
Arg Phe Thr Pro Glu Ile Ala Glu Arg Pro Lys Val Arg Asp Gln Ala
225                 230                 235                 240
Gly Arg Met Asn Tyr Tyr Trp Thr Leu Leu Lys Pro Gly Asp Thr Ile
                245                 250                 255
Ile Phe Glu Ala Asn Gly Asn Leu Ile Ala Pro Met Tyr Ala Phe Ala
            260                 265                 270
Leu Ser Arg Gly Phe Gly Ser Gly Ile Ile Thr Ser Asn Ala Ser Met
        275                 280                 285
His Glu Cys Asn Thr Lys Cys Gln Thr Pro Leu Gly Ala Ile Asn Ser
    290                 295                 300
Ser Leu Pro Tyr Gln Asn Ile His Pro Val Thr Ile Gly Glu Cys Pro
305                 310                 315                 320
Lys Tyr Val Arg Ser Ala Lys Leu Arg Met Val Thr Gly Leu Arg Asn
                325                 330                 335
Asn Pro Ser Ile Gln Ser Arg Gly Leu Phe Gly Ala Ile Ala Gly Phe
            340                 345                 350
Ile Glu Gly Gly Trp Thr Gly Met Ile Asp Gly Trp Tyr Gly Tyr His
        355                 360                 365
His Gln Asn Glu Gln Gly Ser Gly Tyr Ala Ala Asp Gln Lys Ser Thr
    370                 375                 380
Gln Asn Ala Ile Asn Gly Ile Thr Asn Lys Val Asn Thr Val Ile Glu
385                 390                 395                 400
Lys Met Asn Ile Gln Phe Thr Ala Val Gly Lys Glu Phe Asn Lys Leu
                405                 410                 415
Glu Lys Arg Met Glu Asn Leu Asn Lys Lys Val Asp Asp Gly Phe Leu
            420                 425                 430
Asp Ile Trp Thr Tyr Asn Ala Glu Leu Leu Val Leu Leu Glu Asn Glu
        435                 440                 445
Arg Thr Leu Asp Phe His Asp Ser Asn Val Lys Asn Leu Tyr Glu Lys
    450                 455                 460
Val Lys Ser Gln Leu Lys Asn Asn Ala Lys Glu Ile Gly Asn Gly Cys
465                 470                 475                 480
Phe Glu Phe Tyr His Lys Cys Asp Asn Glu Cys Met Glu Ser Val Arg
                485                 490                 495
Asn Gly Thr Tyr Asp Tyr Pro Lys Tyr Ser Glu Glu Ser Lys Leu Asn
```

```
              500             505             510
Arg Glu Lys Val Asp Gly Val Lys Leu Glu Ser Met Gly Ile Tyr Gln
        515                 520                 525

Ile Leu Ala Ile Tyr Ser Thr Val Ala Ser Ser Leu Val Leu Leu Val
        530                 535                 540

Ser Leu Gly Ala Ile Ser Phe Trp Met Cys Ser Asn Gly Ser Leu Gln
545                 550                 555                 560

Cys Arg Ile Cys Ile
            565

<210> SEQ ID NO 17
<211> LENGTH: 6
<212> TYPE: DNA
<213> ORGANISM: Artificial Sequence
<220> FEATURE:
<223> OTHER INFORMATION: Restriction endonuclease (AngI)

<400> SEQUENCE: 17 atcgat                                                            6

<210> SEQ ID NO 18
<211> LENGTH: 6
<212> TYPE: DNA
<213> ORGANISM: Artificial Sequence
<220> FEATURE:
<223> OTHER INFORMATION: Restriction endonuclease (AatI)

<400> SEQUENCE: 18 aggcct                                                            6

<210> SEQ ID NO 19
<211> LENGTH: 6
<212> TYPE: DNA
<213> ORGANISM: Artificial Sequence
<220> FEATURE:
<223> OTHER INFORMATION: Restriction endonuclease (AbaI)

<400> SEQUENCE: 19 tgatca                                                            6

<210> SEQ ID NO 20
<211> LENGTH: 6
<212> TYPE: DNA
<213> ORGANISM: Artificial Sequence
<220> FEATURE:
<223> OTHER INFORMATION: Restriction endonuclease (BamHI)

<400> SEQUENCE: 20 ggatcc                                                            6

<210> SEQ ID NO 21
<211> LENGTH: 6
<212> TYPE: DNA
<213> ORGANISM: Artificial Sequence
<220> FEATURE:
<223> OTHER INFORMATION: Restriction endonuclease (BbvI)
<220> FEATURE:
<221> NAME/KEY: misc_feature
<222> LOCATION: (6)..(6)
<223> OTHER INFORMATION: n is (N)8 and N is  A or C or G or T

<400> SEQUENCE: 21 gcagcn                                                            6
```

```
<210> SEQ ID NO 22
<211> LENGTH: 9
<212> TYPE: DNA
<213> ORGANISM: Artificial Sequence
<220> FEATURE:
<223> OTHER INFORMATION: Restriction endonuclease (BcgI)
<220> FEATURE:
<221> NAME/KEY: misc_feature
<222> LOCATION: (1)..(1)
<223> OTHER INFORMATION: n is (N)10 and N is A or C or G or T
<220> FEATURE:
<221> NAME/KEY: misc_feature
<222> LOCATION: (5)..(5)
<223> OTHER INFORMATION: n is (N)6 and N is A or C or G or T
<220> FEATURE:
<221> NAME/KEY: misc_feature
<222> LOCATION: (9)..(9)
<223> OTHER INFORMATION: n is (N)12 and N is A or C or G or T

<400> SEQUENCE: 22 ncgantgcn                                                                 9

<210> SEQ ID NO 23
<211> LENGTH: 9
<212> TYPE: DNA
<213> ORGANISM: Artificial Sequence
<220> FEATURE:
<223> OTHER INFORMATION: Restriction endonuclease (BplI)
<220> FEATURE:
<221> NAME/KEY: misc_feature
<222> LOCATION: (1)..(1)
<223> OTHER INFORMATION: n is (N)8 and N is A or C or G or T
<220> FEATURE:
<221> NAME/KEY: misc_feature
<222> LOCATION: (5)..(5)
<223> OTHER INFORMATION: n is (N)5 and N is A or C or G or T
<220> FEATURE:
<221> NAME/KEY: misc_feature
<222> LOCATION: (9)..(9)
<223> OTHER INFORMATION: n is (N)13 and N is A or C or G or T

<400> SEQUENCE: 23 ngagnctcn                                                                 9

<210> SEQ ID NO 24
<211> LENGTH: 6
<212> TYPE: DNA
<213> ORGANISM: Artificial Sequence
<220> FEATURE:
<223> OTHER INFORMATION: Restriction endonuclease (BsmAI)
<220> FEATURE:
<221> NAME/KEY: misc_feature
<222> LOCATION: (6)..(6)
<223> OTHER INFORMATION: n is A or C or G or T

<400> SEQUENCE: 24 gtctcn                                                                    6

<210> SEQ ID NO 25
<211> LENGTH: 6
<212> TYPE: DNA
<213> ORGANISM: Artificial Sequence
<220> FEATURE:
<223> OTHER INFORMATION: Restriction endonuclease (BsrI)
<220> FEATURE:
<221> NAME/KEY: misc_feature
<222> LOCATION: (6)..(6)
<223> OTHER INFORMATION: n is A or C or G or T

<400> SEQUENCE: 25 actggn                                                                    6
```

```
<210> SEQ ID NO 26
<211> LENGTH: 6
<212> TYPE: DNA
<213> ORGANISM: Artificial Sequence
<220> FEATURE:
<223> OTHER INFORMATION: Restriction endonuclease (ClaI)

<400> SEQUENCE: 26 atcgat                                                                       6

<210> SEQ ID NO 27
<211> LENGTH: 7
<212> TYPE: DNA
<213> ORGANISM: Artificial Sequence
<220> FEATURE:
<223> OTHER INFORMATION: Restriction endonuclease (EarI)
<220> FEATURE:
<221> NAME/KEY: misc_feature
<222> LOCATION: (7)..(7)
<223> OTHER INFORMATION: n is A or C or G or T

<400> SEQUENCE: 27 ctcttcn                                                                      7

<210> SEQ ID NO 28
<211> LENGTH: 7
<212> TYPE: DNA
<213> ORGANISM: Artificial Sequence
<220> FEATURE:
<223> OTHER INFORMATION: Restriction endonuclease (Eco57I)
<220> FEATURE:
<221> NAME/KEY: misc_feature
<222> LOCATION: (7)..(7)
<223> OTHER INFORMATION: n is (N)16 and N is A or C or G or T

<400> SEQUENCE: 28 ctgaagn                                                                      7

<210> SEQ ID NO 29
<211> LENGTH: 6
<212> TYPE: DNA
<213> ORGANISM: Artificial Sequence
<220> FEATURE:
<223> OTHER INFORMATION: Restriction endonuclease (EcoRI)

<400> SEQUENCE: 29 gaattc                                                                       6

<210> SEQ ID NO 30
<211> LENGTH: 5
<212> TYPE: DNA
<213> ORGANISM: Artificial Sequence
<220> FEATURE:
<223> OTHER INFORMATION: Restriction endonuclease (EcoRII)
<220> FEATURE:
<221> NAME/KEY: misc_feature
<222> LOCATION: (3)..(3)
<223> OTHER INFORMATION: w is A or T

<400> SEQUENCE: 30 ccwgg                                                                        5

<210> SEQ ID NO 31
<211> LENGTH: 6
<212> TYPE: DNA
<213> ORGANISM: Artificial Sequence
<220> FEATURE:
<223> OTHER INFORMATION: Restriction endonuclease (EcoRV)
```

```
<400> SEQUENCE: 31 gatatc                                                               6

<210> SEQ ID NO 32
<211> LENGTH: 6
<212> TYPE: DNA
<213> ORGANISM: Artificial Sequence
<220> FEATURE:
<223> OTHER INFORMATION: Restriction endonuclease (FokI)
<220> FEATURE:
<221> NAME/KEY: misc_feature
<222> LOCATION: (6)..(6)
<223> OTHER INFORMATION: n is (N)9 and N is A or C or G or T

<400> SEQUENCE: 32 ggatgn                                                               6

<210> SEQ ID NO 33
<211> LENGTH: 4
<212> TYPE: DNA
<213> ORGANISM: Artificial Sequence
<220> FEATURE:
<223> OTHER INFORMATION: Restriction endonuclease (HaeIII)

<400> SEQUENCE: 33 ggcc                                                                 4

<210> SEQ ID NO 34
<211> LENGTH: 6
<212> TYPE: DNA
<213> ORGANISM: Artificial Sequence
<220> FEATURE:
<223> OTHER INFORMATION: Restriction endonuclease (HindIII)

<400> SEQUENCE: 34 aagctt                                                               6

<210> SEQ ID NO 35
<211> LENGTH: 4
<212> TYPE: DNA
<213> ORGANISM: Artificial Sequence
<220> FEATURE:
<223> OTHER INFORMATION: Restriction endonuclease (HpaIII)

<400> SEQUENCE: 35 ccgg                                                                 4

<210> SEQ ID NO 36
<211> LENGTH: 6
<212> TYPE: DNA
<213> ORGANISM: Artificial Sequence
<220> FEATURE:
<223> OTHER INFORMATION: Restriction endonuclease (HphI)
<220> FEATURE:
<221> NAME/KEY: misc_feature
<222> LOCATION: (6)..(6)
<223> OTHER INFORMATION: n is (N)8 and N is A or C or G or T

<400> SEQUENCE: 36 ggtgan                                                               6

<210> SEQ ID NO 37
<211> LENGTH: 6
<212> TYPE: DNA
<213> ORGANISM: Artificial Sequence
<220> FEATURE:
```

```
<223> OTHER INFORMATION: Restriction endonuclease (KpnI)

<400> SEQUENCE: 37 ggtacc                                                                  6

<210> SEQ ID NO 38
<211> LENGTH: 4
<212> TYPE: DNA
<213> ORGANISM: Artificial Sequence
<220> FEATURE:
<223> OTHER INFORMATION: Restriction endonuclease (MboI)

<400> SEQUENCE: 38 gatc                                                                    4

<210> SEQ ID NO 39
<211> LENGTH: 6
<212> TYPE: DNA
<213> ORGANISM: Artificial Sequence
<220> FEATURE:
<223> OTHER INFORMATION: Restriction endonuclease (MluI)

<400> SEQUENCE: 39 acgcgt                                                                  6

<210> SEQ ID NO 40
<211> LENGTH: 6
<212> TYPE: DNA
<213> ORGANISM: Artificial Sequence
<220> FEATURE:
<223> OTHER INFORMATION: Restriction endonuclease (NaeI)

<400> SEQUENCE: 40 gccggc                                                                  6

<210> SEQ ID NO 41
<211> LENGTH: 6
<212> TYPE: DNA
<213> ORGANISM: Artificial Sequence
<220> FEATURE:
<223> OTHER INFORMATION: Restriction endonuclease (NdeII)

<400> SEQUENCE: 41 gatatg                                                                  6

<210> SEQ ID NO 42
<211> LENGTH: 6
<212> TYPE: DNA
<213> ORGANISM: Artificial Sequence
<220> FEATURE:
<223> OTHER INFORMATION: Restriction endonuclease (NgoMIV)

<400> SEQUENCE: 42 gccggc                                                                  6

<210> SEQ ID NO 43
<211> LENGTH: 4
<212> TYPE: DNA
<213> ORGANISM: Artificial Sequence
<220> FEATURE:
<223> OTHER INFORMATION: Restriction endonuclease (NlaIII)

<400> SEQUENCE: 43 catg                                                                    4
```

```
<210> SEQ ID NO 44
<211> LENGTH: 8
<212> TYPE: DNA
<213> ORGANISM: Artificial Sequence
<220> FEATURE:
<223> OTHER INFORMATION: Restriction endonuclease (NotI)

<400> SEQUENCE: 44 gcggccgc                                                                    8

<210> SEQ ID NO 45
<211> LENGTH: 8
<212> TYPE: DNA
<213> ORGANISM: Artificial Sequence
<220> FEATURE:
<223> OTHER INFORMATION: Restriction endonuclease (PacI)

<400> SEQUENCE: 45 ttaattaa                                                                    8

<210> SEQ ID NO 46
<211> LENGTH: 6
<212> TYPE: DNA
<213> ORGANISM: Artificial Sequence
<220> FEATURE:
<223> OTHER INFORMATION: Restriction endonuclease (PstI)

<400> SEQUENCE: 46 ctgcag                                                                      6

<210> SEQ ID NO 47
<211> LENGTH: 6
<212> TYPE: DNA
<213> ORGANISM: Artificial Sequence
<220> FEATURE:
<223> OTHER INFORMATION: Restriction endonuclease (SacI)

<400> SEQUENCE: 47 gagctc                                                                      6

<210> SEQ ID NO 48
<211> LENGTH: 6
<212> TYPE: DNA
<213> ORGANISM: Artificial Sequence
<220> FEATURE:
<223> OTHER INFORMATION: Restriction endonuclease (SacII)

<400> SEQUENCE: 48 ccgcgg                                                                      6

<210> SEQ ID NO 49
<211> LENGTH: 6
<212> TYPE: DNA
<213> ORGANISM: Artificial Sequence
<220> FEATURE:
<223> OTHER INFORMATION: Restriction endonuclease (SalI)

<400> SEQUENCE: 49 gtcgac                                                                      6

<210> SEQ ID NO 50
<211> LENGTH: 6
<212> TYPE: DNA
<213> ORGANISM: Artificial Sequence
<220> FEATURE:
<223> OTHER INFORMATION: Restriction endonuclease (SfaNI)
<220> FEATURE:
```

```
<221> NAME/KEY: misc_feature
<222> LOCATION: (6)..(6)
<223> OTHER INFORMATION: n is (N)5 and N is A or C or G or T

<400> SEQUENCE: 50 gcatcn                                                                     6

<210> SEQ ID NO 51
<211> LENGTH: 6
<212> TYPE: DNA
<213> ORGANISM: Artificial Sequence
<220> FEATURE:
<223> OTHER INFORMATION: Restriction endonuclease (SmaI)

<400> SEQUENCE: 51 cccggg                                                                     6

<210> SEQ ID NO 52
<211> LENGTH: 4
<212> TYPE: DNA
<213> ORGANISM: Artificial Sequence
<220> FEATURE:
<223> OTHER INFORMATION: Restriction endonuclease (TaqI)

<400> SEQUENCE: 52 tcga                                                                       4

<210> SEQ ID NO 53
<211> LENGTH: 6
<212> TYPE: DNA
<213> ORGANISM: Artificial Sequence
<220> FEATURE:
<223> OTHER INFORMATION: Restriction endonuclease (XbaI)

<400> SEQUENCE: 53 tctaga                                                                     6

<210> SEQ ID NO 54
<211> LENGTH: 6
<212> TYPE: DNA
<213> ORGANISM: Artificial Sequence
<220> FEATURE:
<223> OTHER INFORMATION: Restriction endonuclease (XhoI)

<400> SEQUENCE: 54 ctcgag                                                                     6

<210> SEQ ID NO 55
<211> LENGTH: 6
<212> TYPE: DNA
<213> ORGANISM: Artificial Sequence
<220> FEATURE:
<223> OTHER INFORMATION: Start codon of ECE

<400> SEQUENCE: 55 cctgct                                                                     6

<210> SEQ ID NO 56
<211> LENGTH: 12
<212> TYPE: DNA
```

```
<213> ORGANISM: Artificial Sequence
<220> FEATURE:
<223> OTHER INFORMATION: Recognition sequence for enhancing expression
      of GOI

<400> SEQUENCE: 56
atggcagctc aa                                                          12
```

PHARMACEUTICAL COMPOSITION CONTAINING STABILIZED NUCLEIC ACID ADJUVANT

The present patent application is supported by Korean Government Ministry of Health and Welfare (Project Identification No.: H1 15C2955), Korean Government Ministry of Science and ICT (Project Identification No: 2014R1A6A3A0405719) and Korean Instituted of Science and Technology (Project Identification No.: KIST project 2E29221).

SEQUENCE LISTING

This application contains a Sequence Listing submitted via EFS-Web and hereby incorporated by reference in its entirety. The Sequence Listing is named SEQCRF-NEIT-101NP.txt, created on Nov. 23, 2021, and 46,254 bytes in size.

TECHNICAL FIELD

The present patent application claims a priority right of Korean Patent Application No. 10-2019-0067129 filed on Jun. 7, 2019.

The present disclosure relates to a composition, and more particularly, to a composition that can improve a stability of nucleic acid adjuvant.

BACKGROUND ART

Immune system means a biological structure or a mechanism that detects and removes pathogens or cancer cells within an organism and thereby, protecting the organisms from various diseases. The immune system may be divided into innate immune system (inherent immune system, natural immune system) and adaptive immune system (acquired immune system).

The innate immune system is a cell or mechanism that defends a host from infection in a non-specific manner and is an immune system that responds immediately without memorizing specific pathogens. All kinds of eukaryotes have the innate immune system, and plants, fungi and insect have only the innate immune system. On the other hand, the adaptive immune system is an immune system specific to an antigen or a pathogen. In order to induce a specific immune response in the adaptive immune system, a host should recognize nonself antigens through antigen presentation process. In the adaptive immune system, a specific immune response against a specific antigen or a specific antigen-infected cell is possible. In addition, since the memory cells constituting the adaptive immune system are capable of evoking pre-implemented immune response, when the same pathogen enters the body multiple times, the memory cells can eliminate the pathogens rapidly.

In addition, the immune system can be divided into humoral immunity and cell-mediated immunity. In the humoral immunity (antibody immunity), B lymphocytes derived from bone marrow recognizes an antigen and then differentiates, secretes an antibody composed of a glycoprotein called immunoglobulin (Ig). In the humoral immunity, an immune response in which the infected pathogen is eliminated by the secreted antibody. On the other hand, the cell-mediated immunity (CMI) is an immune response in which T lymphocyte derived from the thymus recognizes antigens, and secretes lymphokines or directly kills the infected cell.

Vaccine antigens inoculating a whole pathogen or a part thereof for inducing an immune response against the pathogens have been used for the prevention or treatment of various diseases. It is desirable that various immune responses that may be induced by the vaccine antigens are elicited. Instead of the initially developed attenuated vaccine or inactivated killed vaccine, a subunit vaccine with a clear structure and composition has been mainly developed in recent years. Since the subunit vaccine has low immunogenicity compared to the existing vaccines, the subunit vaccine uses an adjuvant for increasing the immune response. Antibodies acts as primary defense actors against most pathogenic bacterial or viral infections, and thus, in many cases, only antibodies induced by the vaccine antigens are sufficient to prevent the infections. However, since the cell-mediated immune response plays an important role in prevention or treatment of infectious diseases for which a vaccine has not been developed so far, using the adjuvant inducing the cell-mediated immune response can increase the likelihood of vaccine development success.

Currently, the adjuvants used in human vaccines includes 1) alum which is a metal salt such as aluminum hydroxide, aluminum phosphate and aluminum sulfate, 2) M59 of oil in water emulsion based on squalene, and the likes. However, while those adjuvants show excellent humoral immune response activity, their cell-mediated immune response is very low. Therefore, those adjuvants can only be utilized in case infection protections are possible only with antibodies, and there is a limitation in that they are not suitable for use in vaccines requiring the cell-mediated immune response.

On the other hand, Microorganism as the typical pathogens have pathogen-associated molecular patterns (PAMPs) composed of glycoproteins such as lipopolysaccharides (LPS), β-1,3-glucan and peptidoglycans in cell walls thereof. Such PAMPs are recognized by specific proteins constituting the host's immune system, such as pattern recognition proteins (PRRs) or pattern recognition proteins (PRPs). Each of PRPs recognizes the appropriate PAMPs present on the pathogen surface and forms a complex, and induces a series of immune responses such as phagocytosis, a nodule formation, encapsulation, proteinase cascade activation and synthesis of antibacterial peptides.

Toll-like receptors (TLRs) are representative PRRs, and TLR agonist has been developed as vaccine adjuvant because they have strong activity for the immunocytes. For example, LPS, an endotoxin, shows strong immune activity by acting TLR4 of the immunocytes.

Unlike the genomic DNA of higher organisms such as humans, the cytosine of the CpG motif is not methylated in bacterial DNA. Therefore, the immunocytes of higher organisms can recognize bacterial DNA in which the cytosine of the CpG motif is not methylated as nonself antigen, and the receptor that recognizes the cytosine is TLR9. TLR9 agonist can enhance various immune responses. As a TLR9 agonist, an oligonucleotide including the CpG motif has been developed as an adjuvant. However, LPS and CpG motif used as TLR agonists have a problem in terms of safety because they have very strong toxicity and side effects such as causing an inflammatory response in vivo.

The host's TLR7/8 recognizes the RNA of a virus that infects the host from the outside and induces various inflammatory cytokines including interferon alpha/beta. Such immune response activates the hosts' immunity as well as the antiviral signaling mechanism, and can be utilized as vaccine adjuvant. However, since RNA is degraded too quickly by RNase in the human body, its activity in the human body needs to be maintained for a certain period of time in order to act as an adjuvant, and a nucleic acid stabilizer that prevents RNA degradation in the human body is required.

DISCLOSURE

Technical Problem

An object of the present disclosure is to provide a composition that stabilize a pharmaceutically active ingredient and improve an activity of the pharmaceutically active ingredient.

Technical Solution

In one aspect, the present disclosure provides a pharmaceutical composition including a nucleic acid molecule of an adjuvant; and a metal complex stabilizing the nucleic acid molecule and having the following structure of Formula 1 or a pharmaceutically acceptable salt thereof:

[Formula 1]

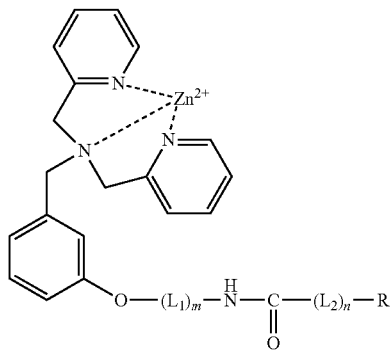

wherein each of $L_1$ and $L_2$ is independently a $C_1$-$C_{20}$ aliphatic bridging group; each of m and n is independently 0 or 1; R is a $C_1$-$C_{20}$ alkyl group or

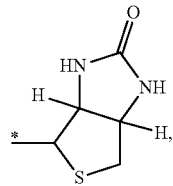

wherein asterisk indicate a linking site.

The pharmaceutical composition may further include an immunogen that is at least one of a peptide and a protein, and the immunogen may include an antigen that is at least one of a viral antigen and a pathogenic antigen.

For example, the nucleic acid molecule may include at least one IRES (Internal ribosome entry site) element of an expression control sequence.

The IRES element may include a viral IRES element.

For example, the viral IRES element may be derived from a virus selected from Picornaviridae family virus, Togaviridae family virus, Dicistoviridae family virus, Flaviridae family virus, Retroviridae family virus, Herpseviridae family virus and combination thereof.

More concretely, the viral IRES element may be derived from a virus selected form a coxsackie virus, a cricket paralysis virus, an encephalomyocarditis virus and combination thereof.

Alternatively, the nucleic acid molecule may further include a coding region operatively linked to the at least one IRES element.

For example, the pharmaceutical composition may further include an immunogen that is at least one of a peptide and a protein, and wherein the coding region includes a nucleic acid sequence encoding the immunogen.

In another aspect, the nucleic acid molecule may further include multiple adenosines or thymidines inserted to an upstream of the at least one IRES element.

For example, the multiple adenosines or thymidines may include 20 to 400 adenosines or thymidines.

The metal complex may include any one of a metal complex having the following structure of Formula 2:

[Formula 2]

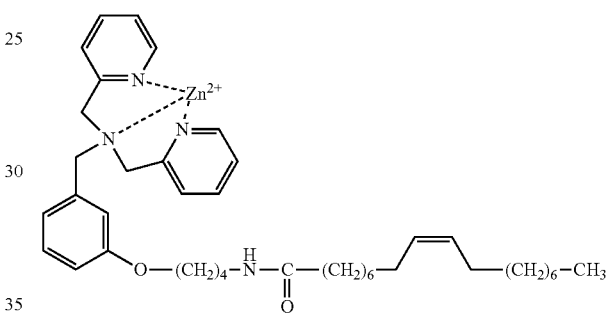

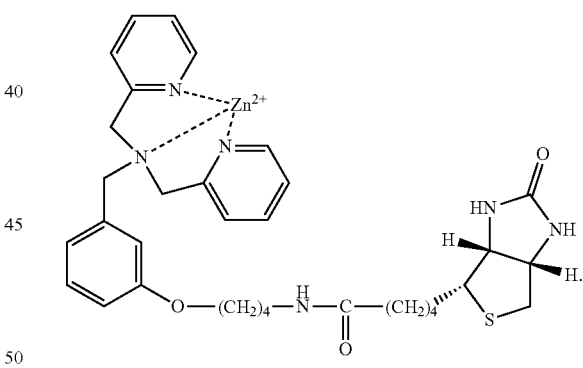

In another aspect, the present disclosure provides a composition for stabilizing the nucleic acid molecule of an adjuvant, the composition including the metal complex having the structure of Formula 1 or a pharmaceutically acceptable salt thereof, or use of the metal complex having the structure of Formula 1 or a pharmaceutically acceptable thereof for stabilizing the nucleic acid molecule of an adjuvant.

Advantageous Effects

The present disclosure provides a pharmaceutical composition or a composition for stabilizing a nucleic acid molecule including a metal complex having a predetermined structure for stabilizing the nucleic acid molecule of an adjuvant. The metal complex can stabilize the nucleic acid molecule as the adjuvant and improve the activity of the adjuvant. The composition according to the present disclosure can be utilized as a vaccine or a treatment medicine for prevention or treatment of various diseases such as infectious diseases.

Figure 3:
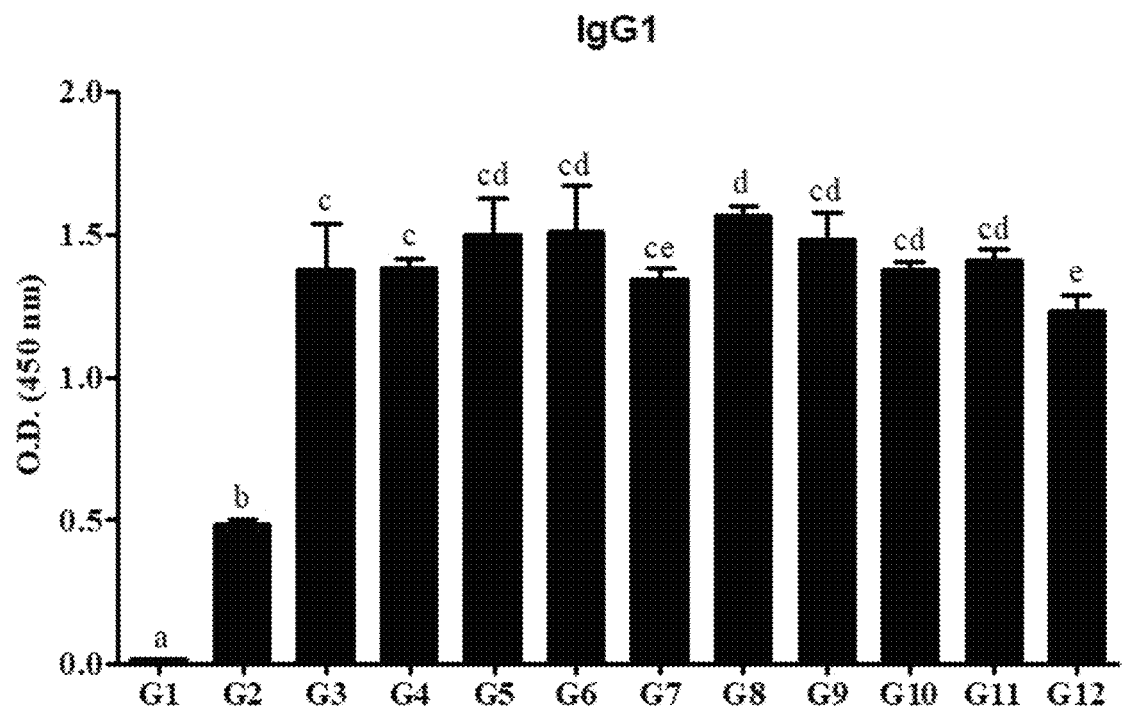
Figure 4:
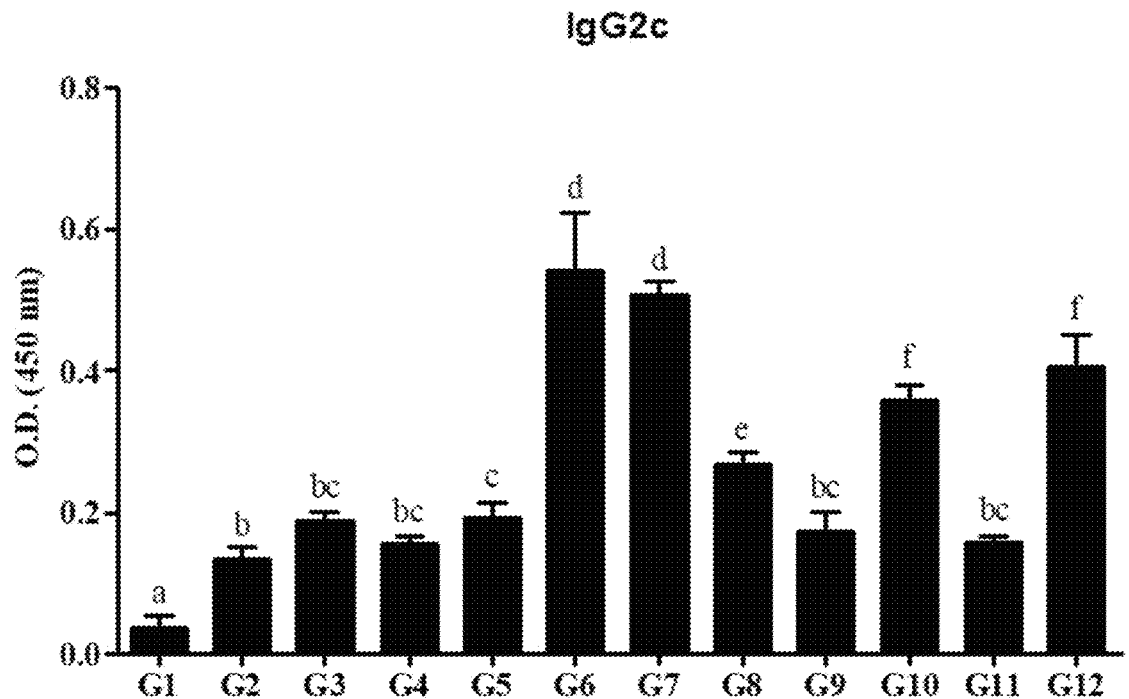

Each of FIGS. 3 and 4 is a graph showing an assay result of measuring quantity of specific immunoglobulin in mice sera using ELISA after immunizing mice with a nucleic acid molecule synthesized in accordance with an exemplary Example of the present disclosure.

Figure 5:
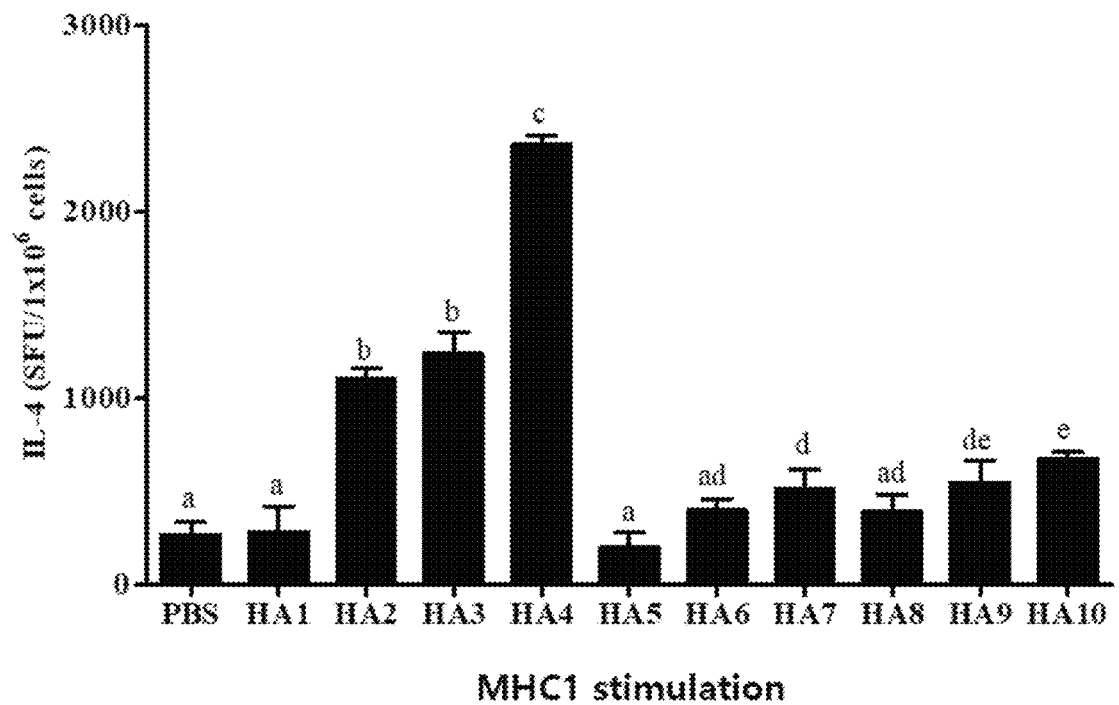

FIG. 5 is a graph showing an assay result of measuring the number of cells producing IL-4, a cytokine that promotes differentiation of $Th_1$ cells in mice splenocytes, using ELISPOT after immunizing mice with a nucleic acid molecule synthesized in accordance with an exemplary Example of the present disclosure.

Figure 6:
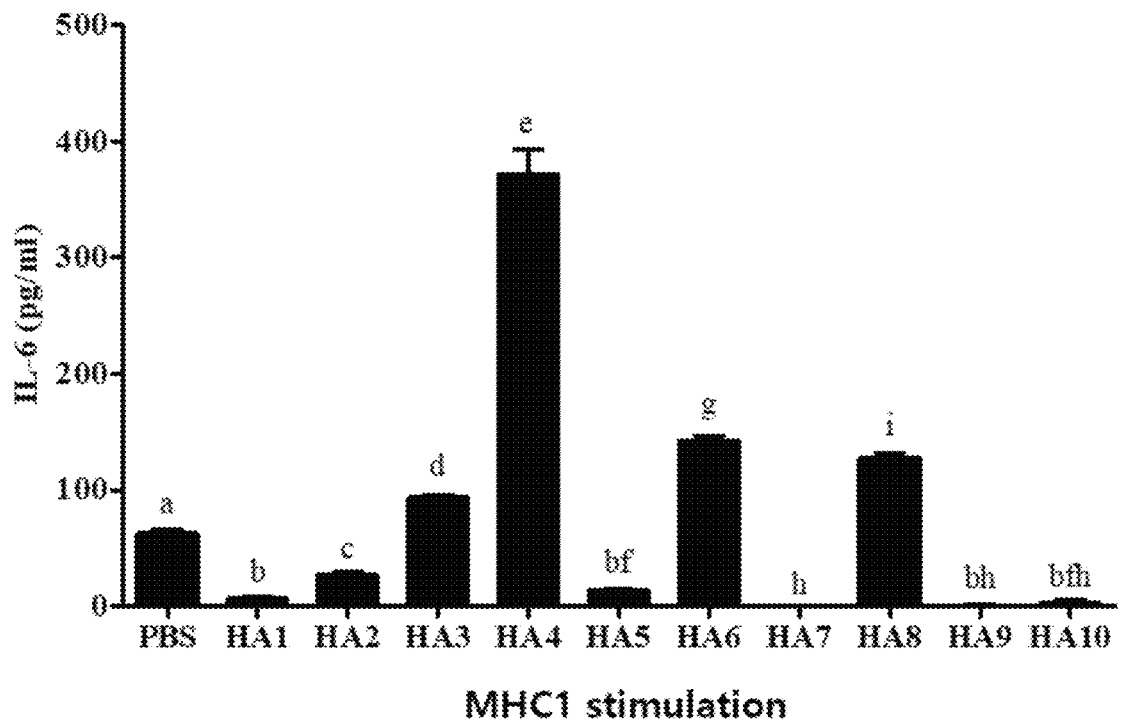
Figure 7:
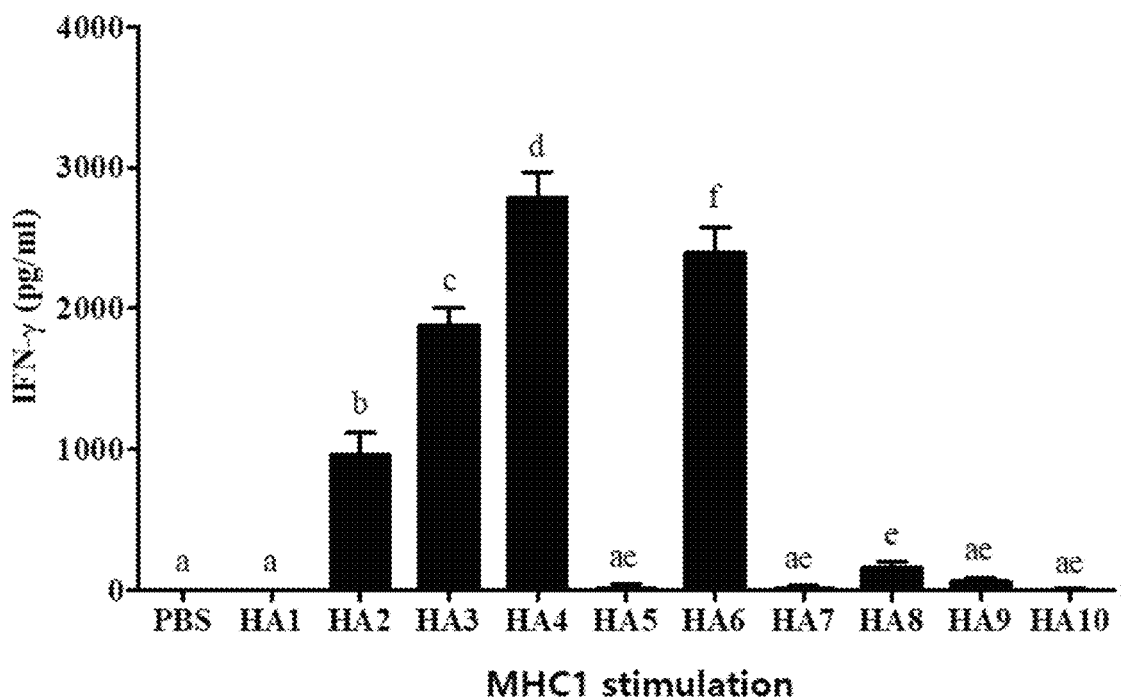

Each of FIGS. 6 and 7 is a graph showing an assay result of measuring quantity of IL-6 or IFN-γ, a cytokine that promotes differentiation of Th1 cells in immunized mice splenocytes, using ELISA after immunizing mice with a nucleic acid molecule synthesized in accordance with an exemplary Example of the present disclosure.

Figure 8:
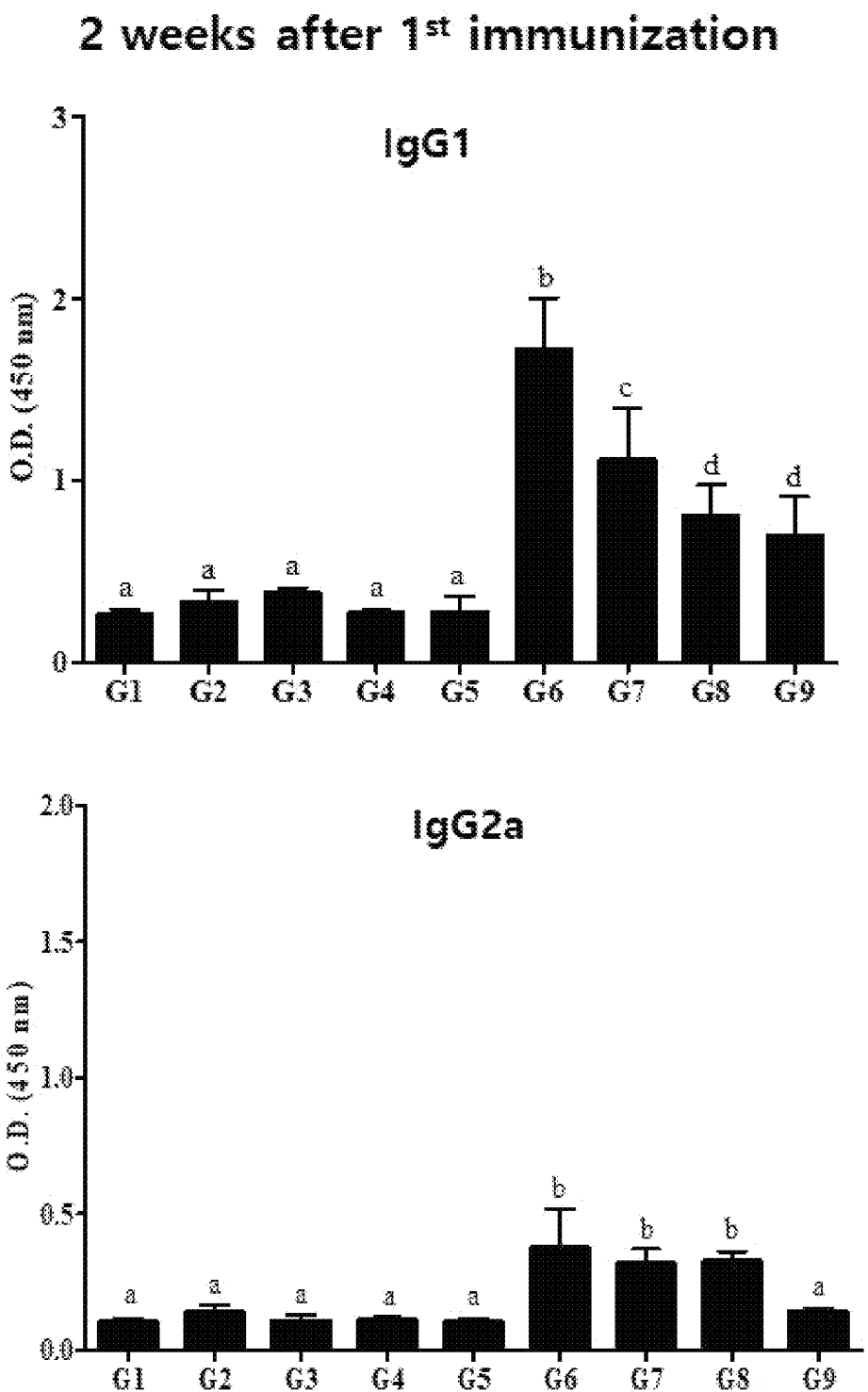
Figure 9:
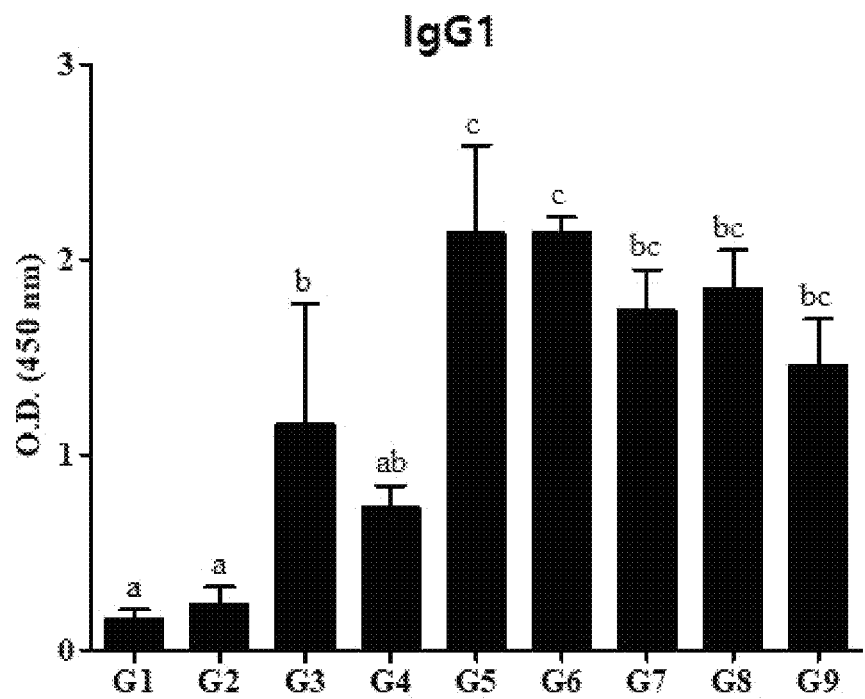
Figure 9:
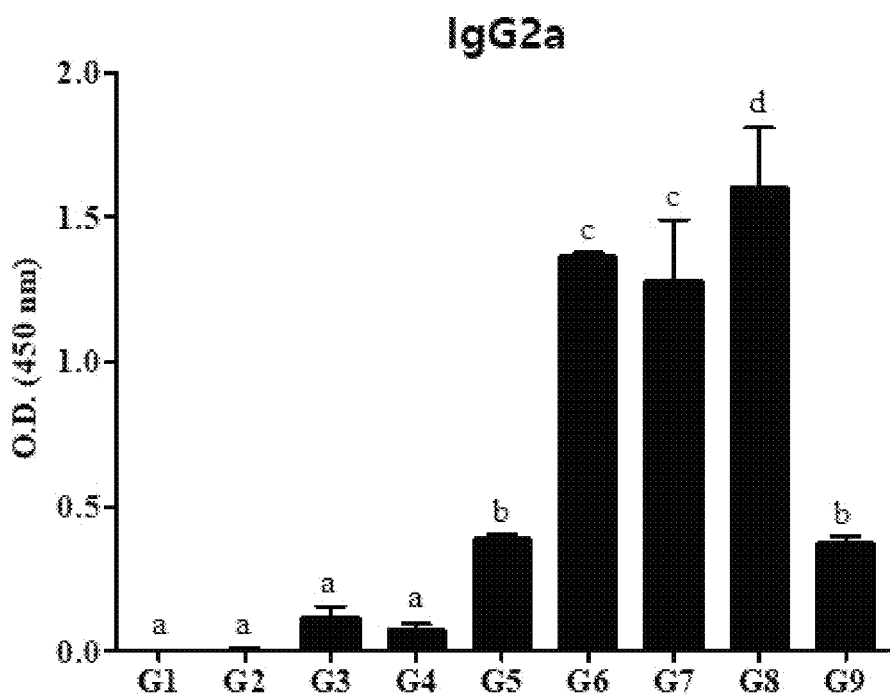

Each of FIGS. 8 and 9 is a graph showing an assay result of measuring quantity of specific immunoglobulin in mice sera using ELISA after immunizing mice with a composition including a nucleic acid molecule of an adjuvant and a metal complex in accordance with an exemplary Example of the present disclosure.

Figure 10:
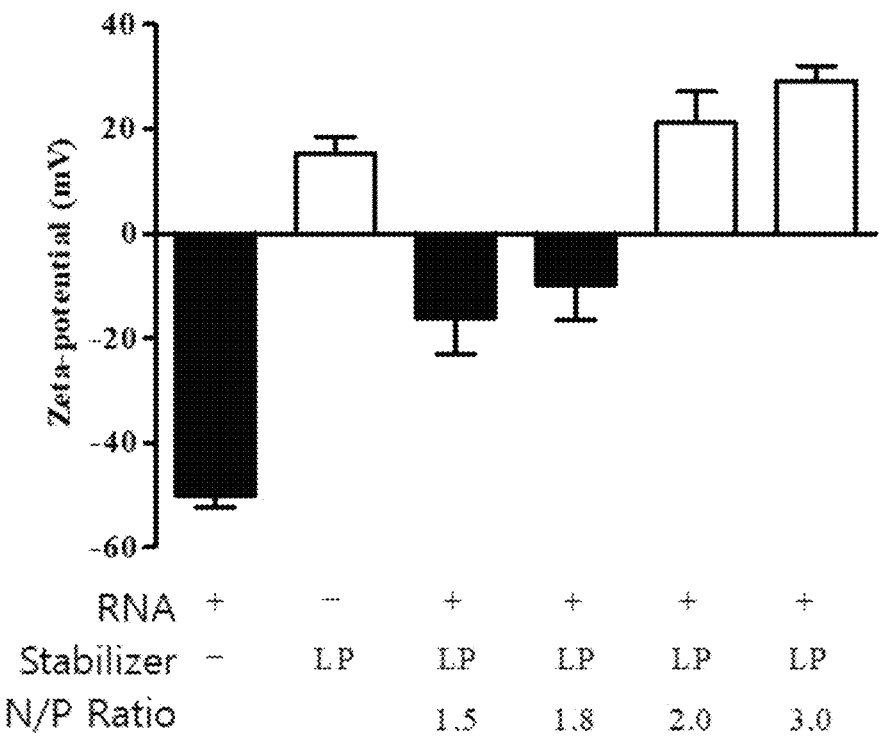
Figure 10:
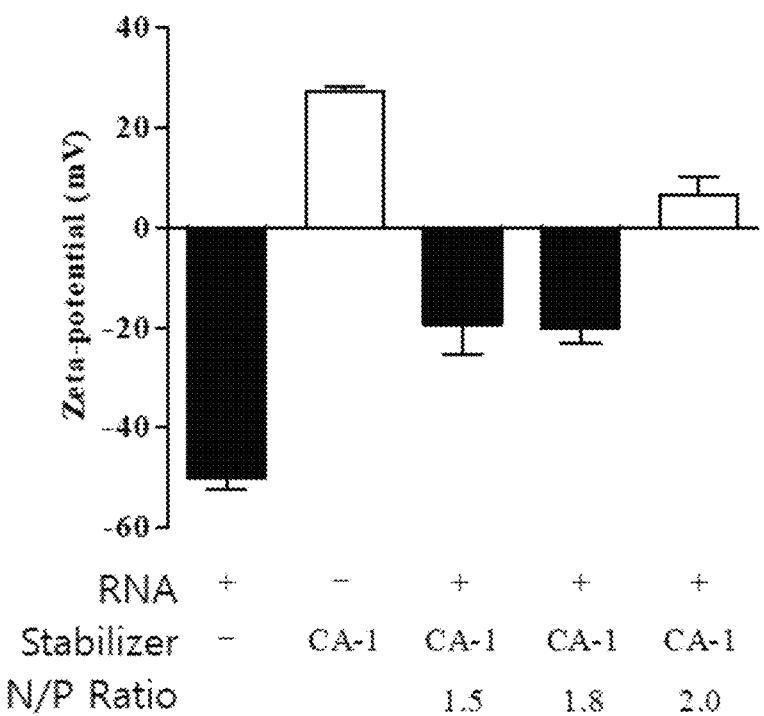
Figure 11:
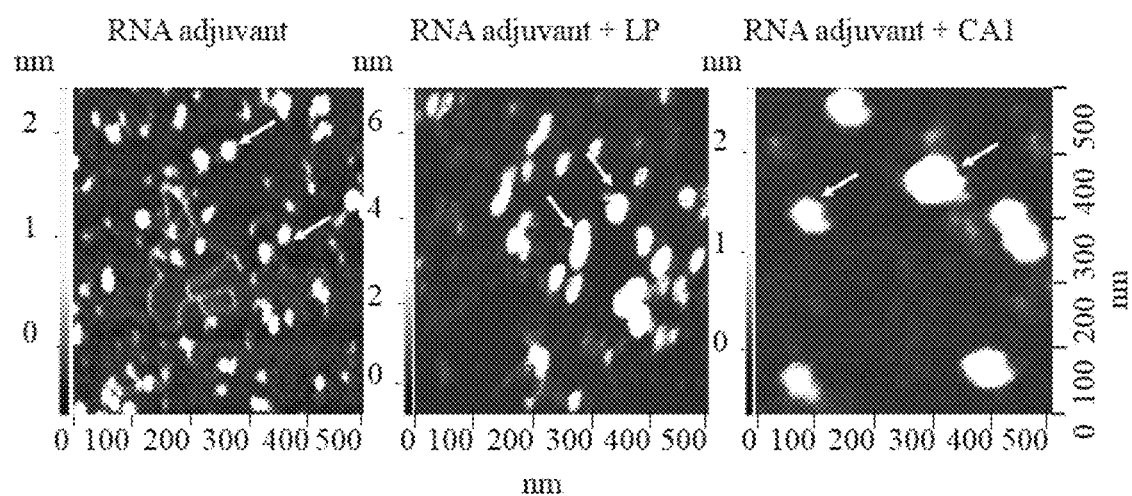

Each of FIGS. 10 and 11 is a graph showing an assay result of measuring zeta potential and an atomic force microscopy (AFM) image of the composition including a nucleic acid molecule of an adjuvant and a metal complex in accordance with an exemplary Example of the present disclosure.

Figure 12:
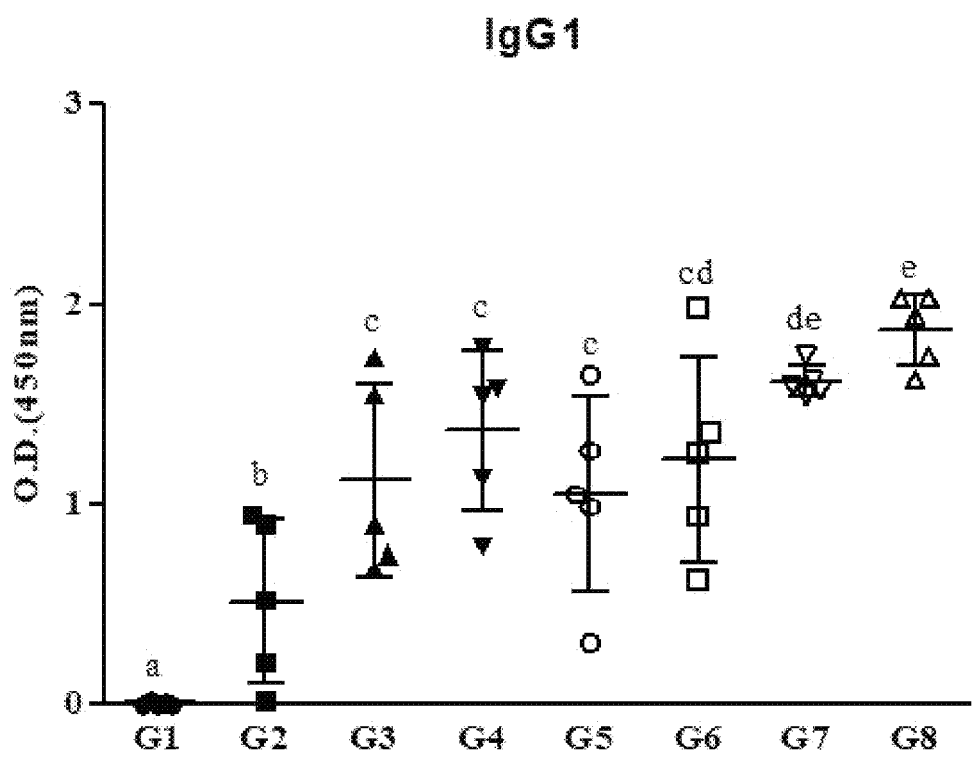
Figure 12:
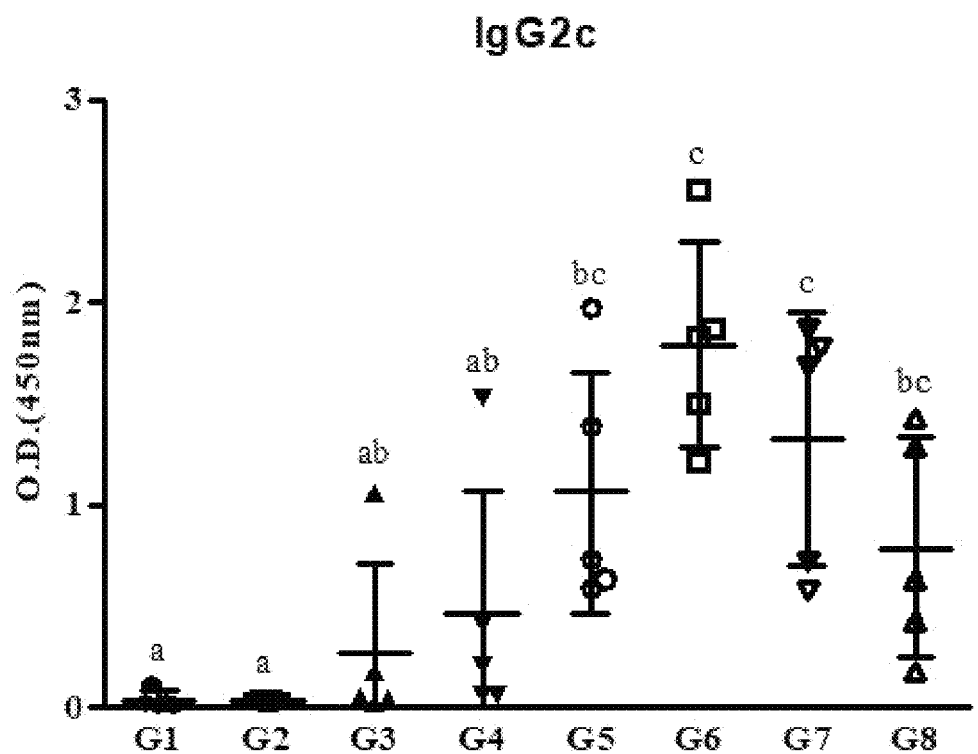

FIG. 12 is a graph showing an assay result of measuring quantity of specific immunoglobulin in mice sera using ELISA after immunizing mice with a composition including a nucleic acid molecule of an adjuvant and a metal complex in accordance with an exemplary Example of the present disclosure.

Figure 13:
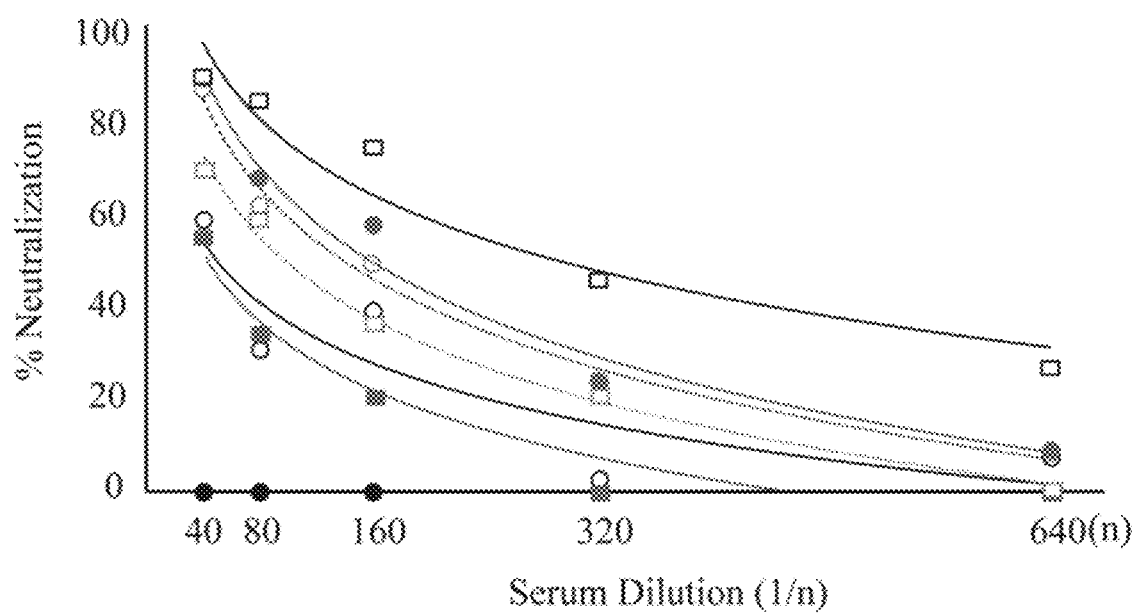

FIG. 13 is a graph showing an assay result of measuring neutralizing antibody titer in mice sera after immunizing mice with a composition including a nucleic acid molecule of an adjuvant and a metal complex in accordance with an exemplary Example of the present disclosure.

Figure 14:
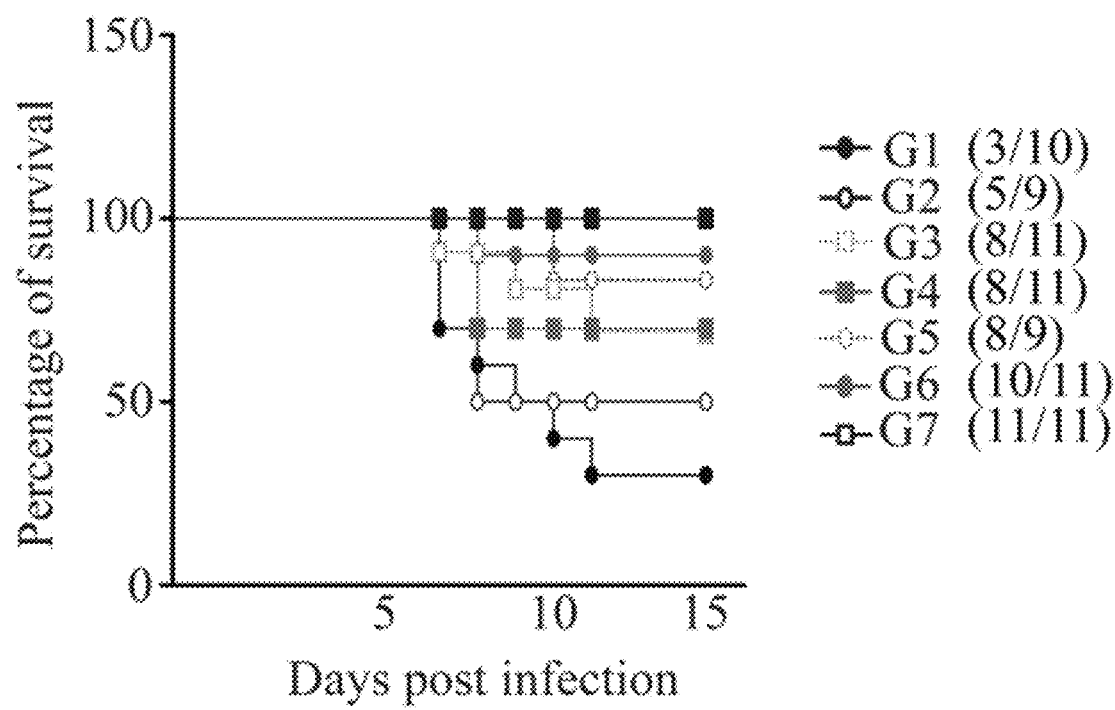

FIG. 14 is a graph showing an assay result of measuring survival rate after challenging viruses into immunized mice in accordance with an exemplary Example of the present disclosure.

Figure 15:
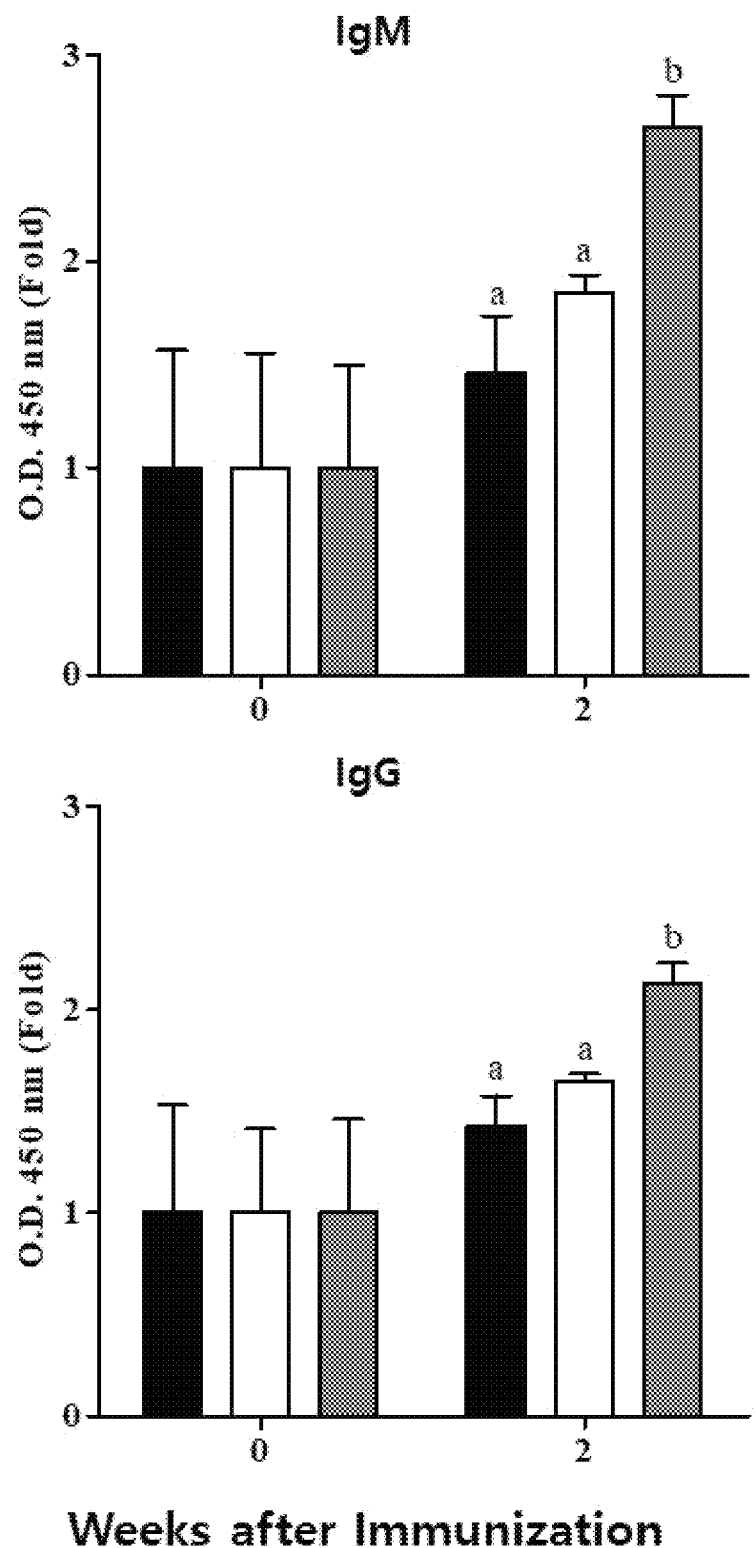
Figure 16:
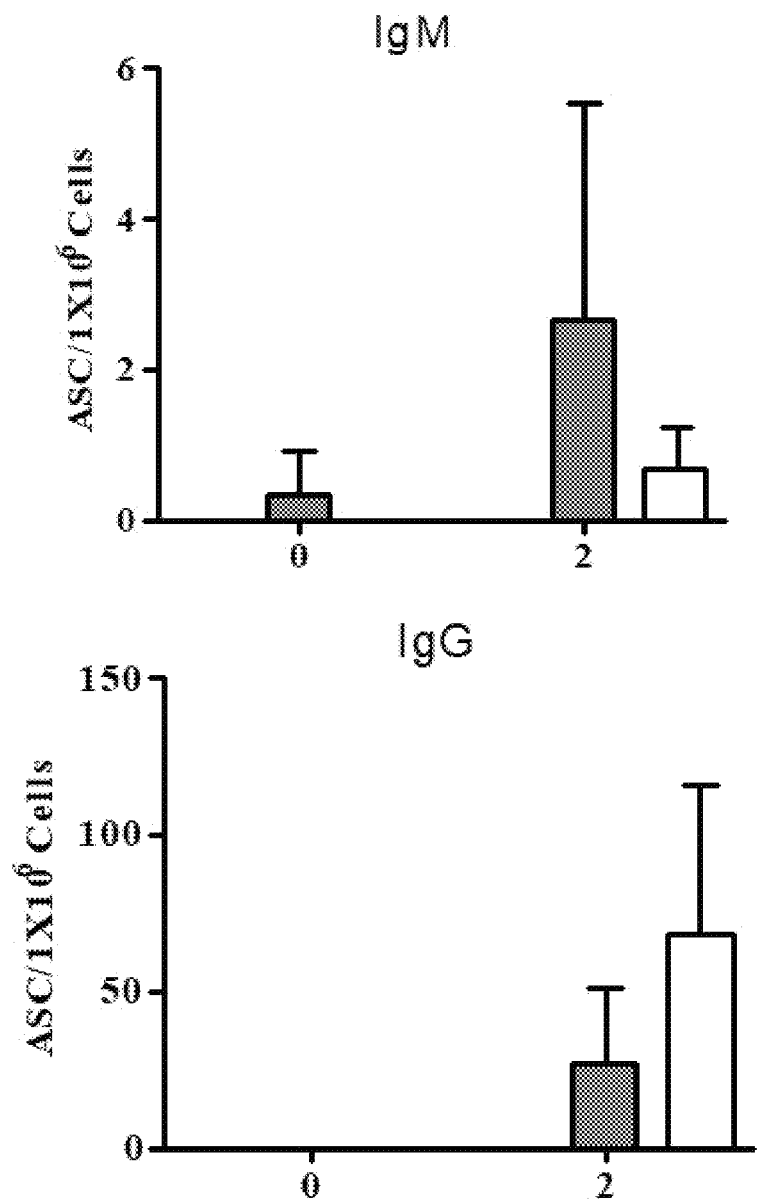

Each of FIGS. 15 and 16 is a graph showing an assay result of measuring quantity of specific immunoglobulin in apes sera using ELISA and of measuring the number of splenocytes secreting the specific immunoglobulin using ELISPOT after immunizing apes with a composition including a nucleic acid molecule of an adjuvant and a metal complex in accordance with an exemplary Example of the present disclosure.

Figure 17:
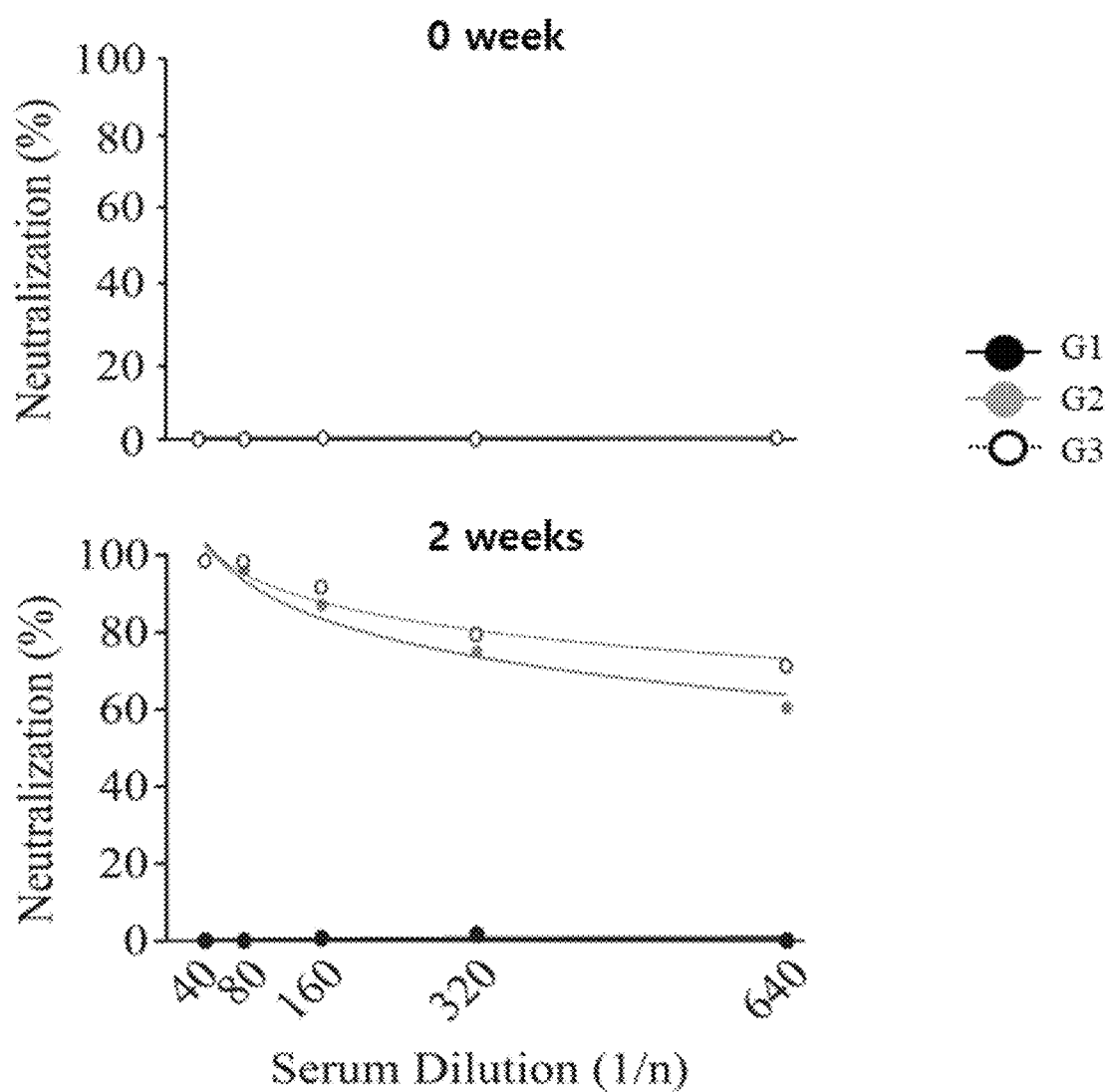

FIG. 17 is a graph showing an assay result of measuring neutralizing antibody titer in apes sera by immunization days after immunizing apes with a composition including a nucleic acid molecule of an adjuvant and a metal complex in accordance with an exemplary Example of the present disclosure.

Figure 18:
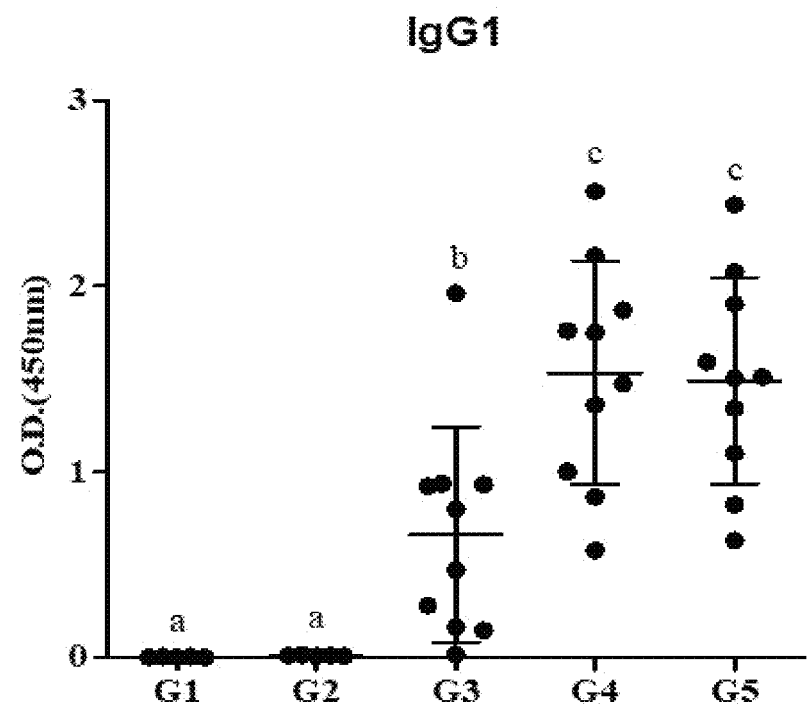
Figure 18:
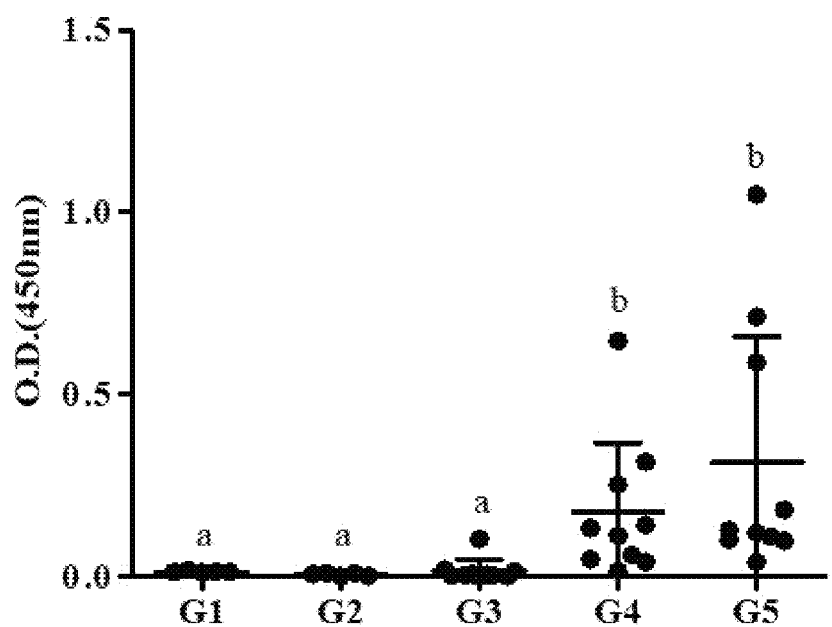
Figure 19:
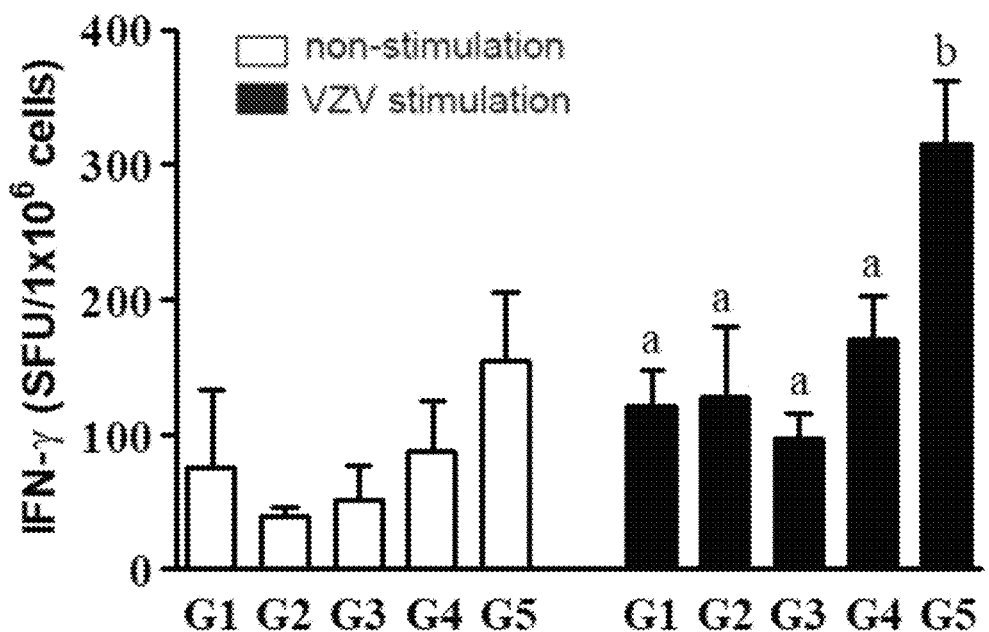
Figure 19:
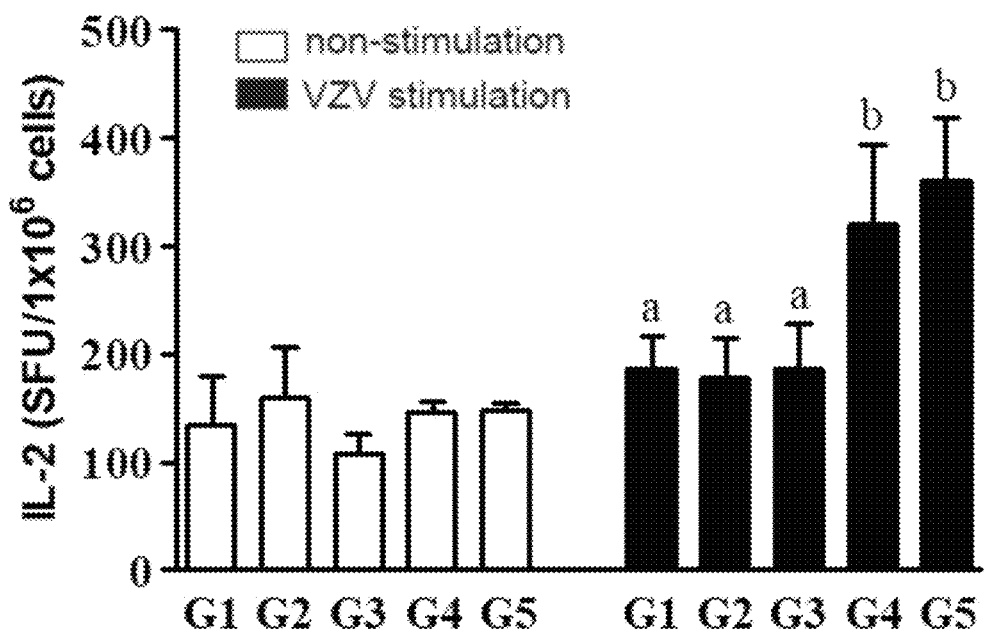

Each of FIGS. 18 and 19 is a graph showing an assay result of measuring quantity of specific immunoglobulin in apes sera using ELISA and of measuring the number of splenocytes secreting the specific cytokine that promotes differentiation of $Th_1$ cells using ELISPOT after immunizing mice with a composition including a nucleic acid molecule of an adjuvant and a metal complex in accordance with an exemplary Example of the present disclosure.

Figure 20:
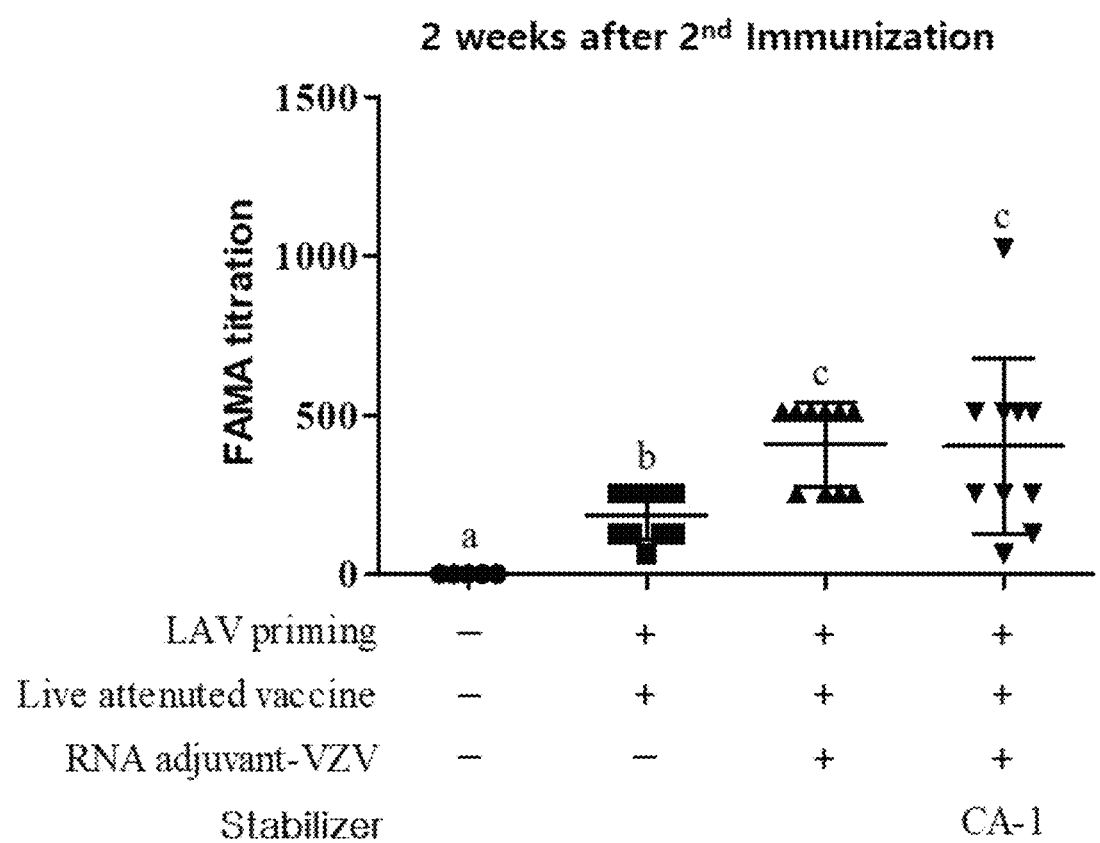

FIG. 20 is a graph showing an assay result of measuring neutralizing antibody titer in guinea pigs sera using FAMA (Fluorescent antibody to membrane antigen) technology after immunizing guinea pigs with a composition in accordance with an exemplary Example of the present disclosure.

Figure 21:
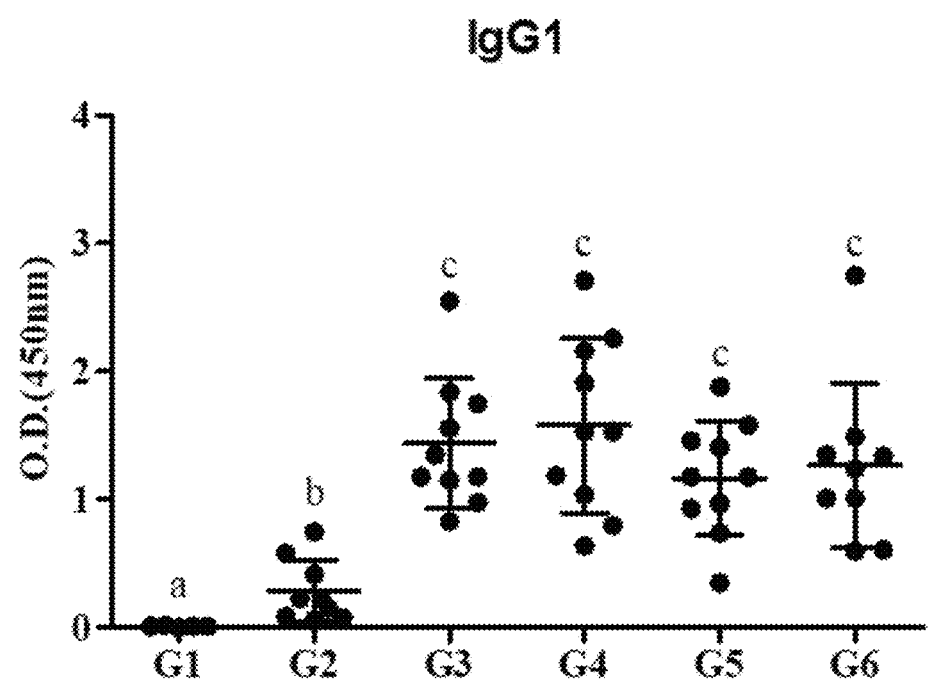
Figure 21:
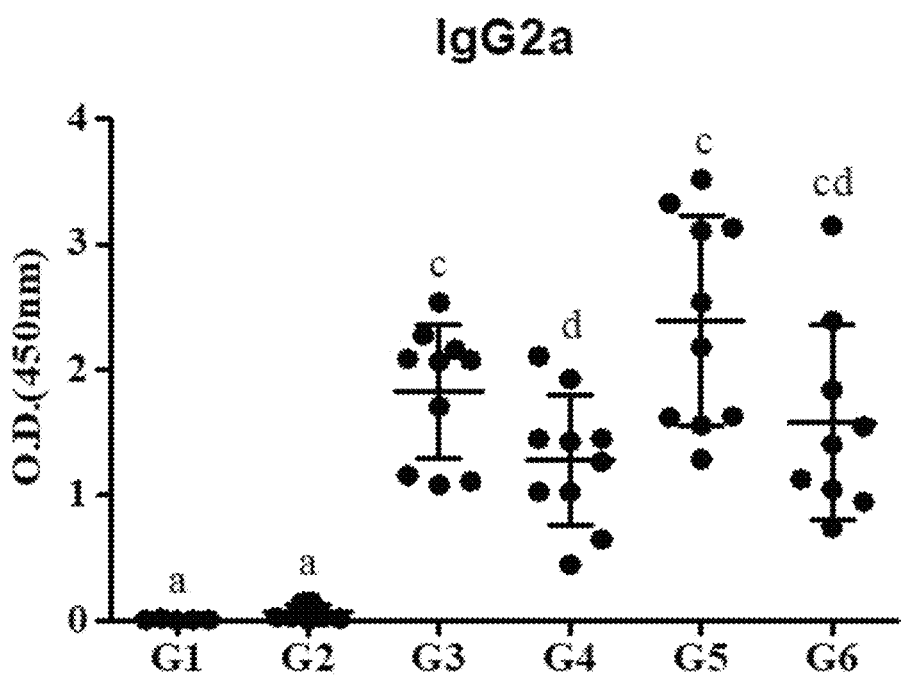
Figure 22:
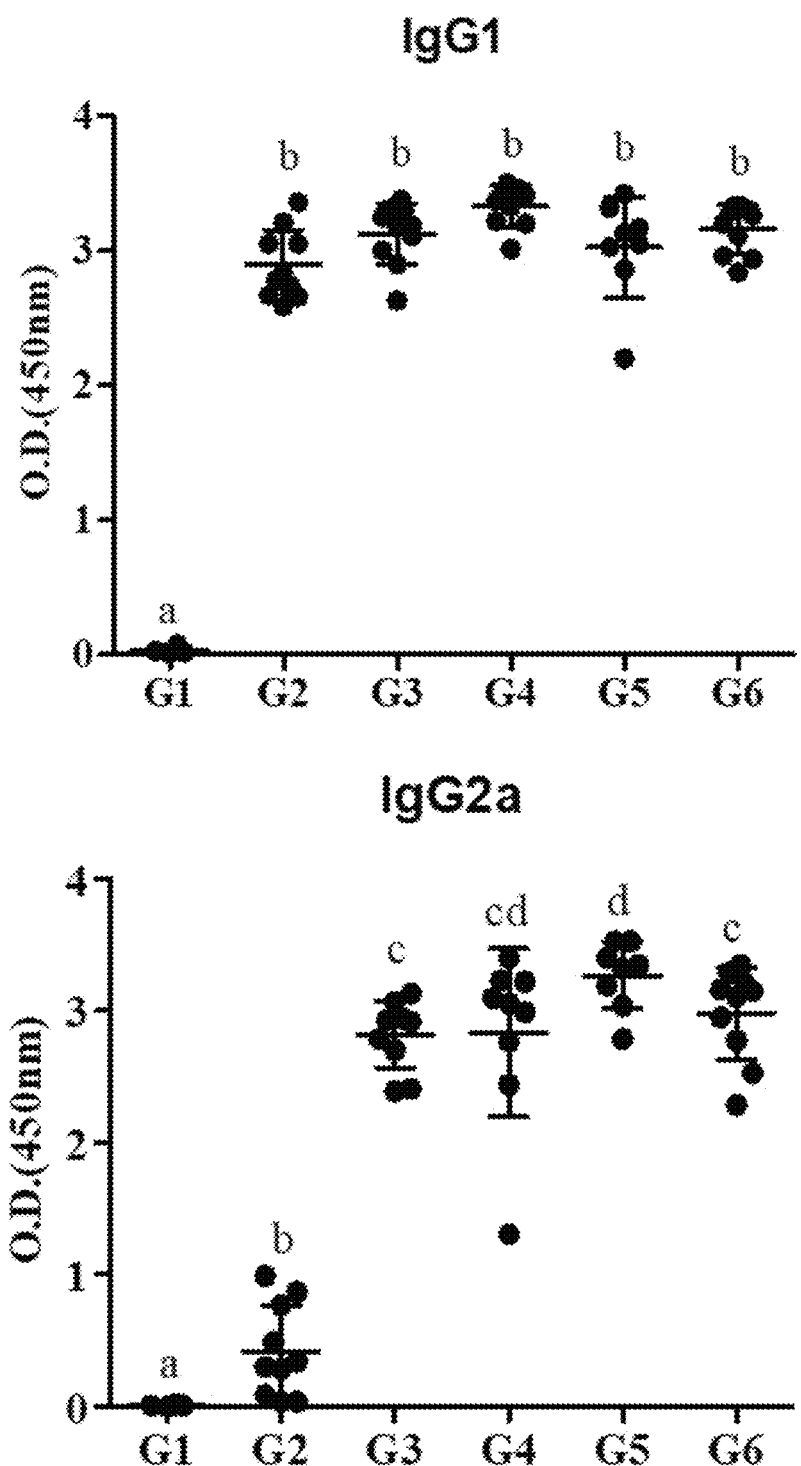

Each of FIGS. 21 and 22 is a graph showing an assay result of measuring quantity of specific immunoglobulin in mice sera using ELISA after immunizing mice with a nucleic acid molecule of an adjuvant and a metal complex in accordance with an exemplary Example of the present disclosure.

Figure 23:
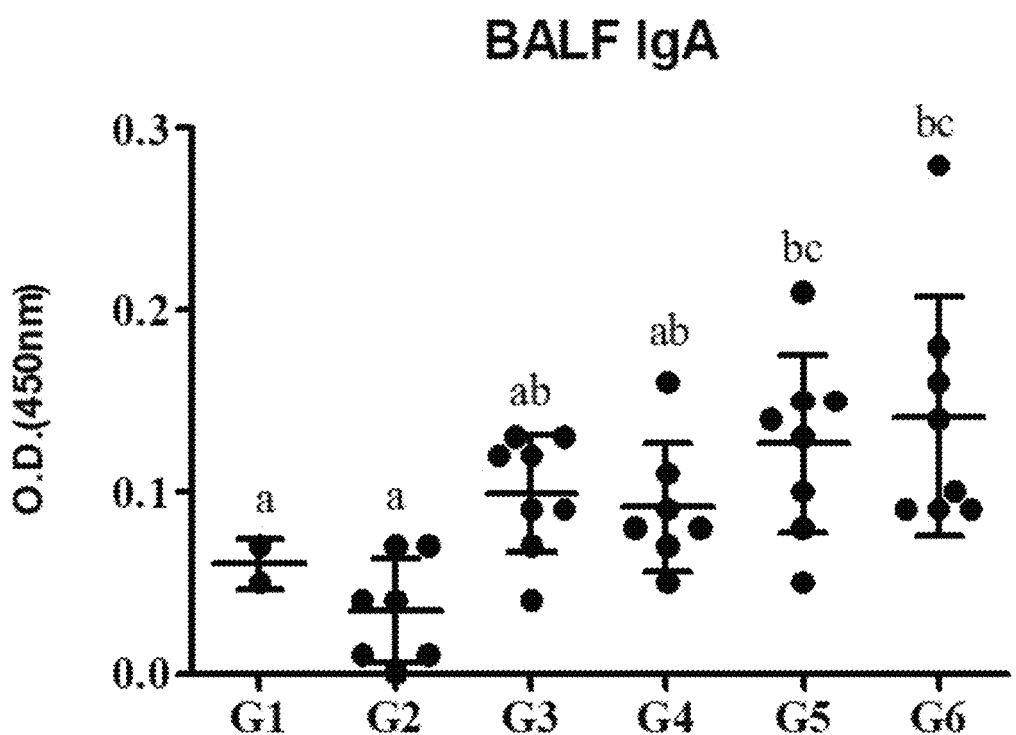

FIG. 23 is a graph showing an assay result of measuring quantity of IgA in bronchoalveolar lavage fluid (BALF) of the immunized mice using ELISA after immunizing mice with a composition in accordance with an exemplary Example of the present disclosure.

Figure 24:
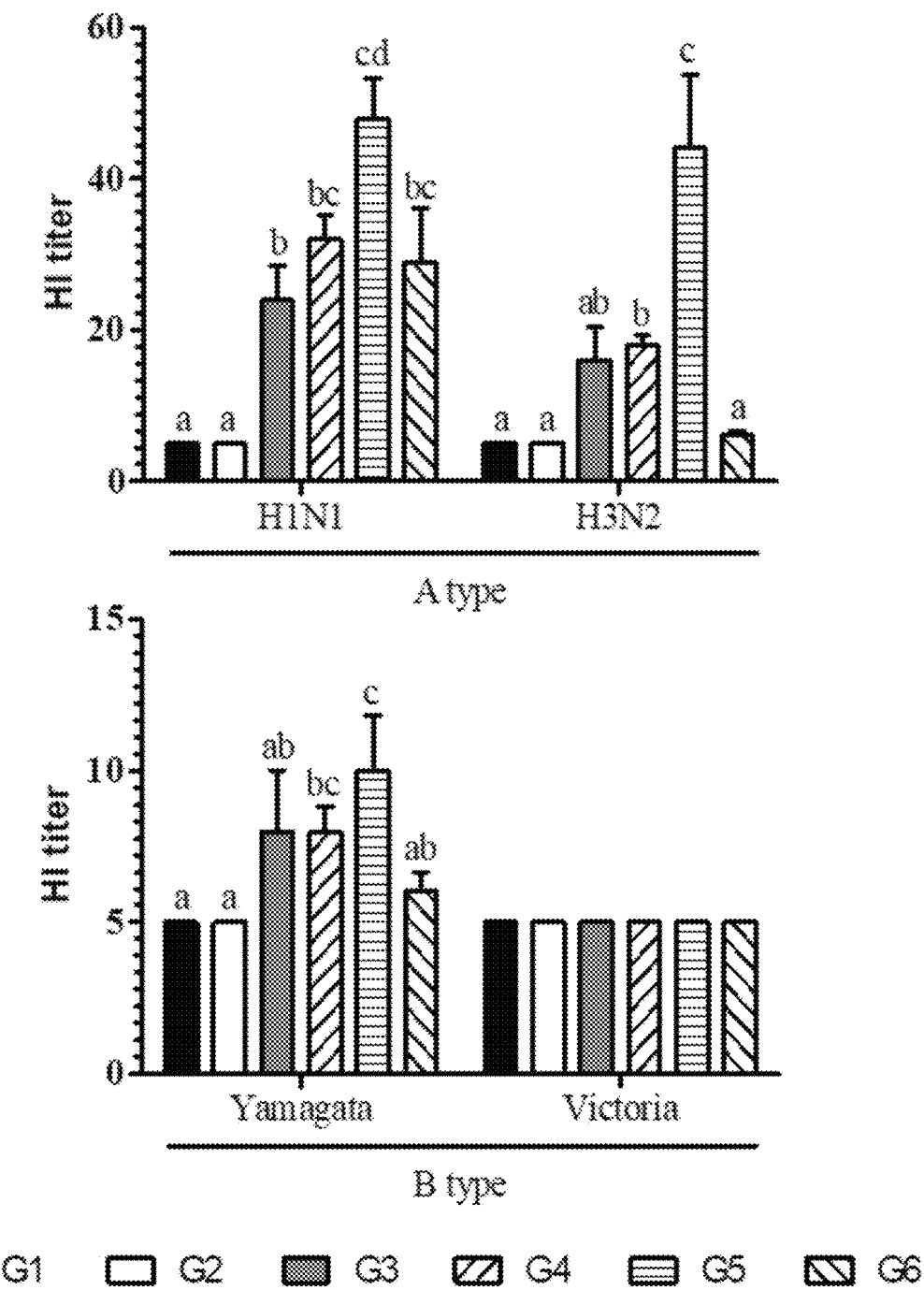
Figure 25:
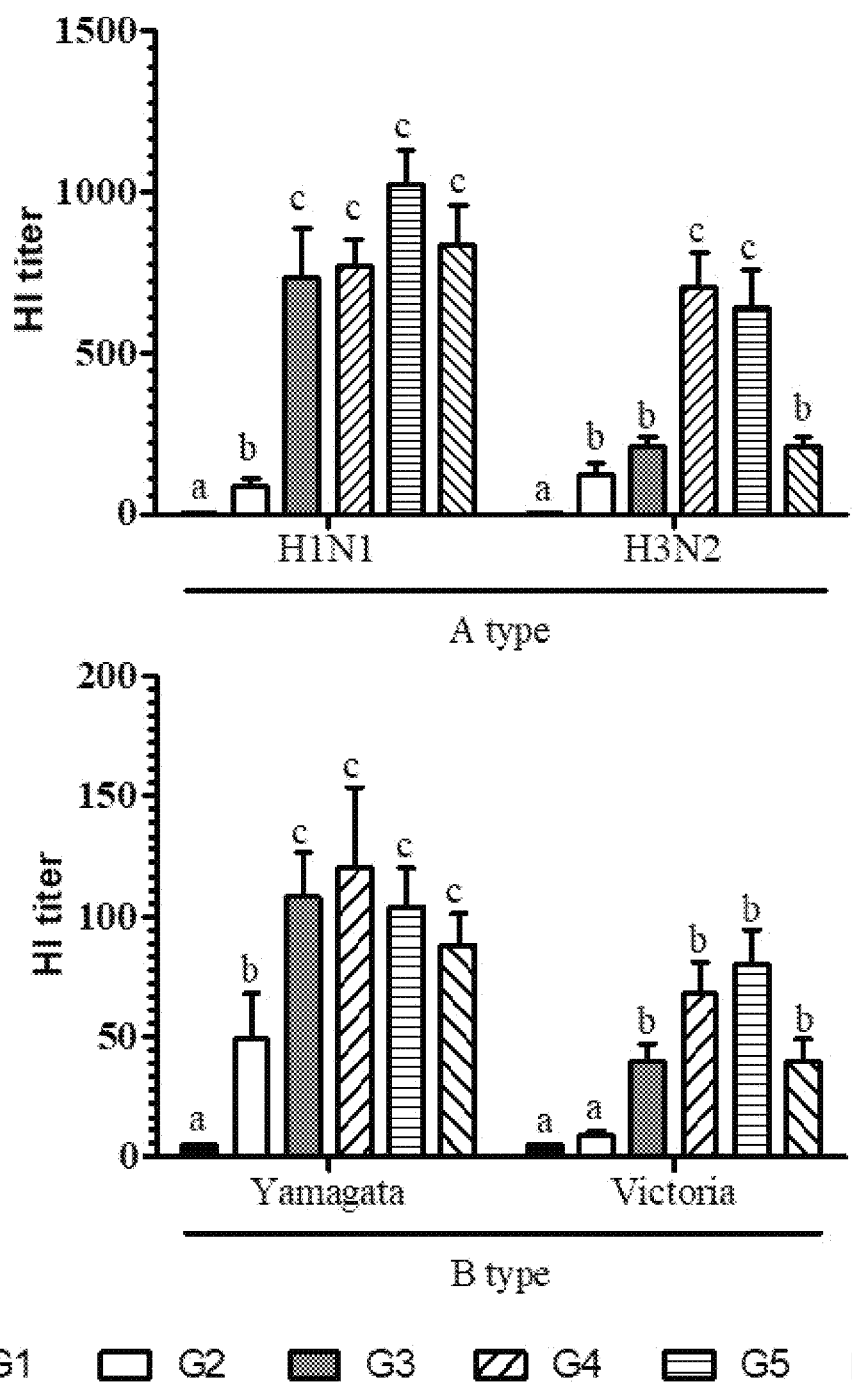

Each of FIGS. 24 and 25 is a graph showing an assay result of measuring hemagglutination inhibition (HI) titer by immunization days after immunizing mice with a composition in accordance with an exemplary Example of the present disclosure.

Figure 26:
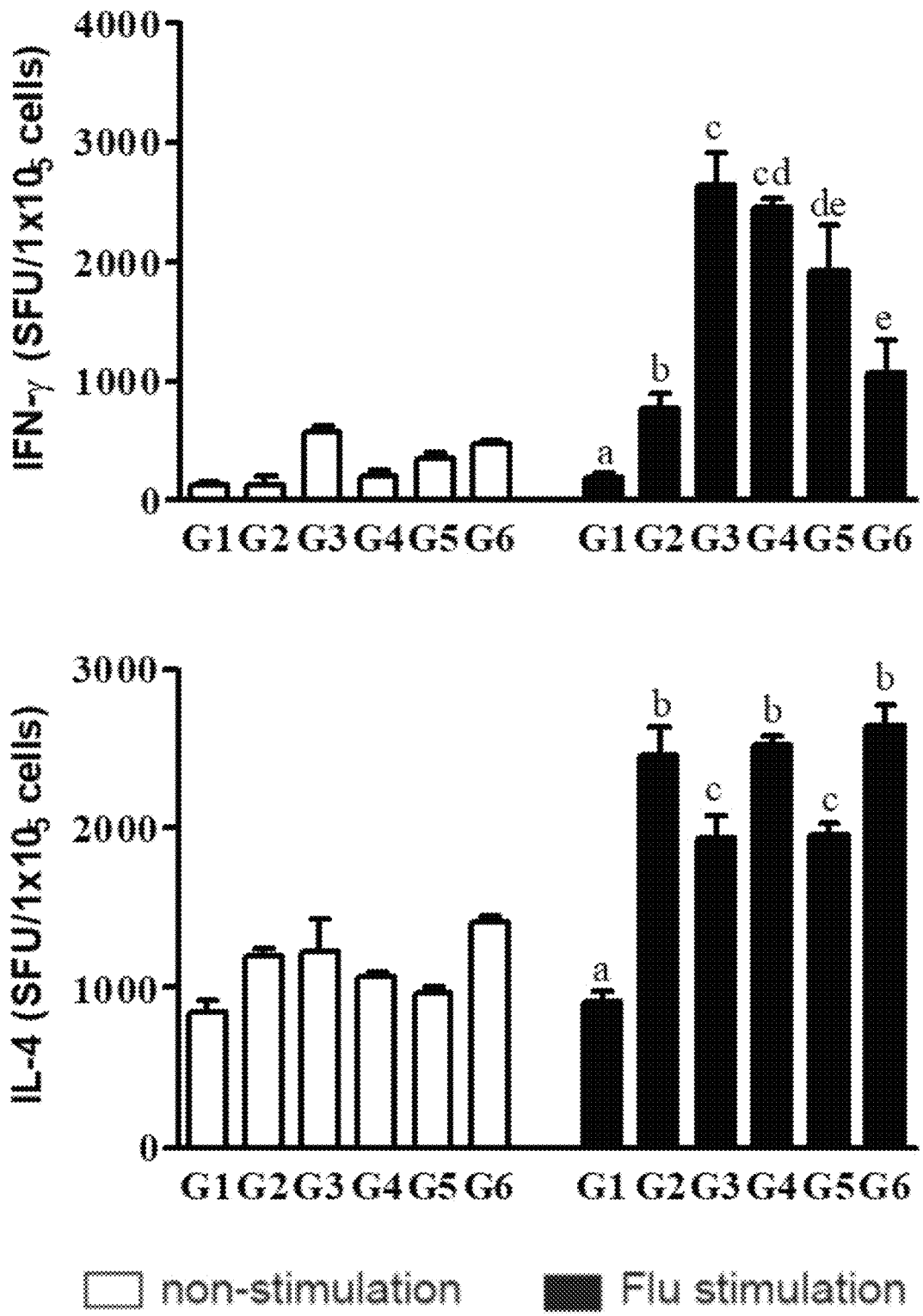

FIG. 26 is a graph showing an assay result of measuring the number of mice splenocytes secreting IFN-γ or IL-4 using ELISPOT after immunizing mice with a composition in accordance with an exemplary Example of the present disclosure.

Figure 27:
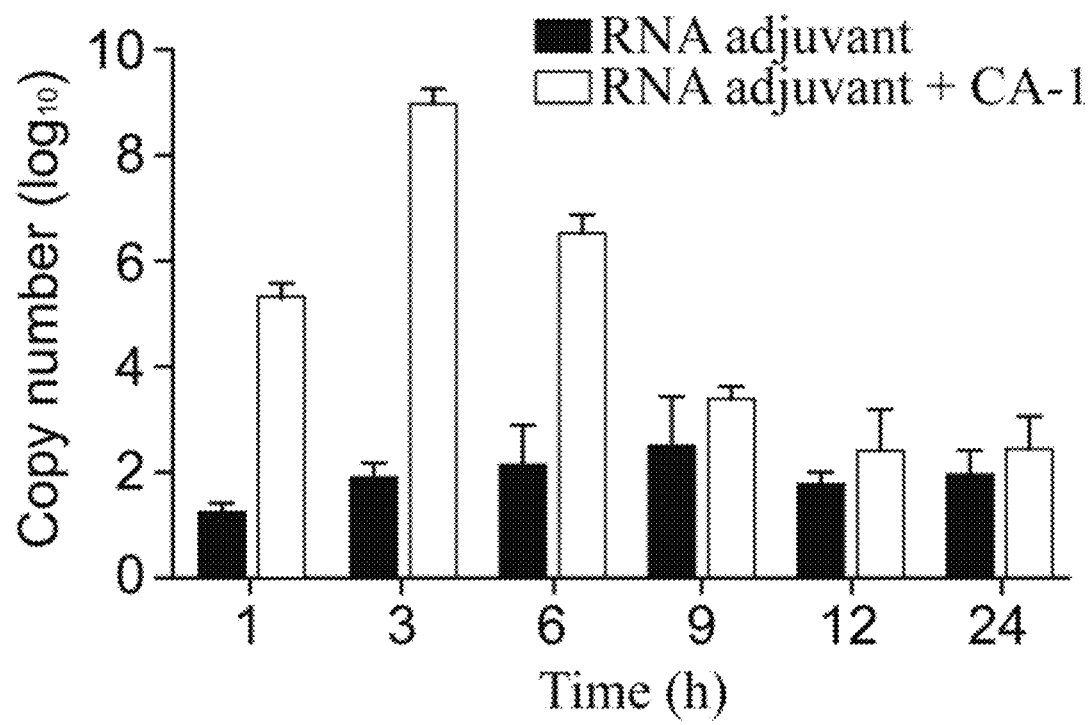

FIG. 27 is a graph showing an assay result of measuring quantity of RNA through PCR after immunizing mice with a composition including a nucleic acid stabilizer in accordance with an exemplary Example of the present disclosure.

Figure 28:
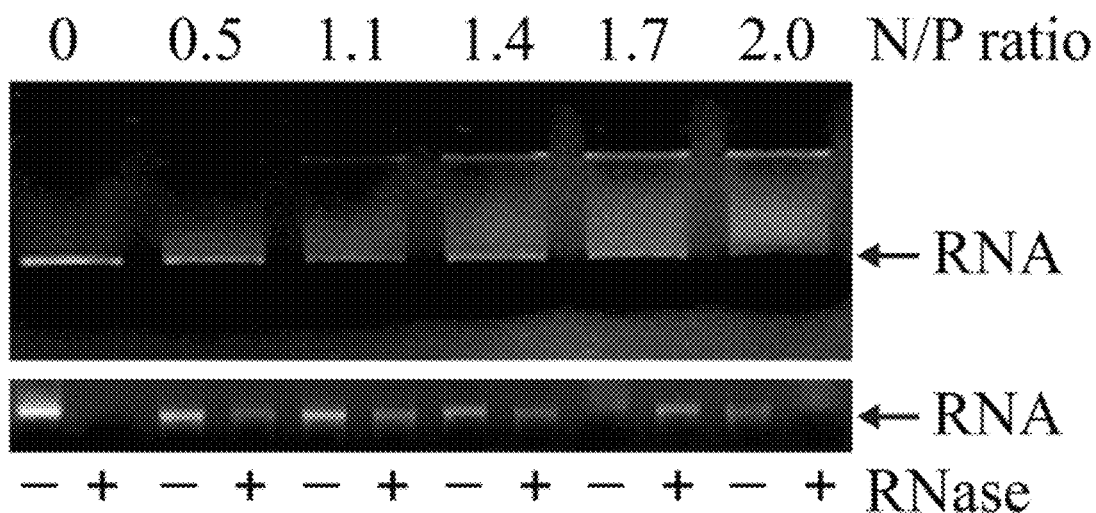

FIG. 28 is an image showing gel electrophoresis assay results in which a different level of a nucleic acid stabilizer is introduced into a composition in accordance with an exemplary Example of the present disclosure. FIG. 28 shows a nucleic acid molecule and the stabilizer forms a complex and the stabilizer prevents the nucleic acid molecule from degrading by RNase.

MODE FOR INVENTION

The present disclosure will be described in detail referencing to the accompanying drawing if necessary.

Definitions

As used herein, the term "polynucleotide" or "nucleic acid molecule" are used inter-changeably, refers to polymers of any lengths of nucleotides, and includes comprehensibly DNA (i.e. cDNA) and RAN molecules. "Nucleotide", which is a subunit of nucleic acid molecules, may comprise a deoxyribonucleotide, a ribonucleotide, a modified nucleotide or a modified base, analogs thereof, and/or any substrates that can be incorporated into polynucleotides by DNA or RNA polymerase or synthetic reactions. Polynucleotide may comprise modified nucleotides, analogues having modified bases and/or polysaccharides such as methylated nucleotides and analogues thereof (Scheit, Nucleotide Analogs, John Wiley, New York, 1980; Uhlman and Peyman, Chemical Reviews, 90:543-584, 1990).

Some variations in nucleotides do not result in variations of peptides or proteins. Such nucleic acid variants may include any nucleic acid molecules having codons encoding functionally equivalent or identical amino acids (e.g., codons encoding arginine or serine is six by codon degeneracy) or encoding biologically equivalent amino acids. On the other hand, other variations in nucleotides may induce changes in peptides or proteins. In spite of variations causing changes of amino acids of proteins, it is possible to obtain variant proteins that show substantially the same activities as the proteins of the present disclosure.

A person having ordinary skill in the art will appreciate that peptides and nucleic acids herein is not limited to the peptides and the nucleic acids described in the Sequence Listing. Rather, it is intended that peptides or the proteins as well as the nucleic acid molecules encoding the peptides or the proteins of the present disclosure may comprise any amino acid sequences or nucleotide sequences that has substantially the same biological functions, for example, a nucleic acid vaccine and/or an adjuvant. For example, biologically functional equivalents that may be included in the recombinant protein of the present disclosure may be a peptide having a mutation in the amino acid sequence but exhibiting biological activity equivalent to that of the recombinant protein of the present disclosure.

As used herein, the term "vector" means a construct or a vehicle that can be transfected or delivered into the host cells, and enables one or more genes of interest (or target genes of target sequences) to be expressed within the cells. For example, the vector may include viral vectors, DNA or RNA expression vectors, plasmid, cosmid, or phage vectors, DNA or RAN expression vectors linked to CCA (cationic condensing agents), DNA or RNA expression vectors packaged with liposomes, specific eukaryotic cells such as producer cells and the likes.

As used herein, the term "expression control/regulation element" may mean nucleic acid sequences regulating or controlling transcriptional processes of the nucleic acid molecules and/or translational processes of the transcribed nucleic acid molecules. In this case, the term may be used interchangeably with the term "translation control/regulation element". As used herein, the term "transcription control/regulation element" means that nucleic acid sequences regulating or controlling the transcriptional process of the nucleic acid molecules. For example, the transcription control element comprises promoters such as a constitutive promoter or an inducible promoter, enhancers, and the likes. Also, the term "translation control/regulation element" may be used for the nucleic acid sequences regulating or controlling the translations process from the transcribed nucleic acid to a protein or a peptide. Each of the expression control sequence/element, the transcription control sequence/element and the translation control sequence/element is operatively linked to the target sequences to be expressed, for example, sequences to be transcribed or translated.

As used herein, the term "operatively linked" means a functional linkage between expression control sequences (e.g., promoters, signal sequences, or ribosome binding sites, transcription terminal sequences and the like) and other nucleic acid sequences so that the control sequence may regulate transcriptions and/or translations of the other nucleic acid sequences.

As used herein, the term "pharmaceutically effective amount" or "therapeutically effective amount" means an amount of sufficiently accomplishing efficacy or activation of an active ingredient, a peptide or fragments thereof and/or nucleic acids encoding the peptide or fragments thereof.

A pharmaceutical composition of the present disclosure includes a nucleic acid molecule of an adjuvant, a metal complex stabilizing the nucleic acid, and optionally an immunogen. The nucleic acid as an adjuvant is not limited to particular nucleic acid molecule. As an example, the nucleic acid molecule includes at least one expression control sequence having Internal Ribosomal Entry Site (IRES) element so as to express at least one gene of interest (GOI) or target sequences.

Figure 1:
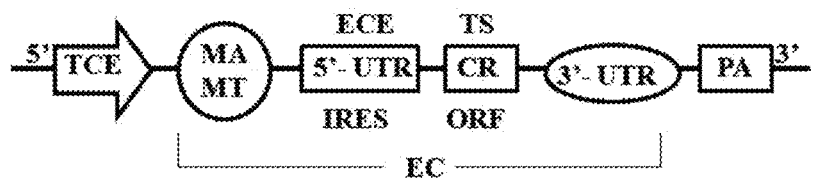
FIG. 1 is a schematic diagram showing a nucleic acid molecule of an adjuvant in accordance with one aspect of the present disclosure. The nucleic acid molecule has a single expression cassette.

FIG. 1 is a schematic diagram showing components of a polynucleotide or a nucleic acid molecule that includes single expression cassette "EC" or expression unit in accordance with an exemplary aspect of the present disclosure. As illustrated in FIG. 1, the nucleic acid molecule in accordance with an exemplary aspect comprises an expression control element "ECE" including a nucleotide sequence of IRES activity, for example, viral IRES activity. In one exemplary aspect, the "ECE: may comprise may include a 5' untranslated region (5'-UTR) having the viral IRES activity.

The nucleic acid molecule may include a coding region "CR" linked operatively to the expression control element "ECE" and comprising an open reading frame (ORF) or target sequence "TS" of GOI encoding a peptide or a protein The coding region "CR" may be located downstream, i.e. at 3' end of the expression control element "ECE", for example 5'-UTR having the IRES activity. As an example, the coding region "CR" may comprise target sequence "TS" encoding the peptide of the protein. The target sequence "TS" may comprises, nucleotides sequences encoding peptides or proteins with regard to immunogens, reporter peptides or proteins, pharmaceuticals and the likes.

The nucleic acid molecule may be DNA or RNA. In an exemplary aspect, the nucleic acid molecule in accordance with the present disclosure has an RNA platform type. In this case, the coding region "CR" may comprise transcript sequences of the GOI.

The expression control element "ECE" comprises nucleotide sequences having the IRES activity linked operatively to the coding region "CR" that can be inserted into the nucleic acid molecule as ORF from of GOI. As described above, the expression control element "ECE" may have 5'-UTR structure comprising nucleotides having the IRES activity. 5'-UTR is a region to which translation initiation complex bind in the course of translational processes of the peptide or the proteins to be expressed in the coding region "CR", and IRES is cis-acting nucleotide sequences inducing translation of the coding region "CR" by forming secondary and tertiary structure with the translation initiation complex. In one exemplary embodiment, the expression control element "ECE" may comprise a viral IRES element.

As an example, the expression control sequence "ECS" may have 5' UTR structure comprising viral IRES element. In an exemplary embodiment, the viral IRES element may be derived from a virus of Picornaviridae family, Togaviridae family, Dicistroviridae family, Flaviridae family, Retroviridae family and Herpesviridae family.

An IRES element has a unique secondary or tertiary structure and can be divided into four classes based on the molecular folding structure of the RNA and the mode of action of translation, such as that involving canonical eukaryotic initiation factors (eIFs) or specific stimulatory IRES trans-acting factors. Class I IRESs require most translational initiation factors, with the exception of eIF4E, recruit 40S ribosome complex as in the canonical scanning model, and are found in Picornaviridae family such as coxsackie B3 virus (CVB3). Class II IRESs initiate translation directly at start codons without any scanning at the 5' end of RNA sequences and they require most eIFs, as in the case in class I IRESs, and are found in some Picornaviridae family such as encephalomyocarditis virus (EMCV). Class III IRESs also initiate translation directly at start codons by recognizing RNA fold structures such as pseudoknots without scanning but require fewer eIFs that do class I and II IRESs and are found in Flaviridae family such as the Japanese encephalitis virus (JEV). Class IV IRESs have a simple translational mode that does not require any eIFs. It involves only the elongation factor 2 (eIF2) to stabilize translation intermediates and has some complicated RNA folding structure. In contrast with other IRESs, which are generally located in the 5'-UTR of RNA sequences, class IV IRESs are found in intergenic regions (IGRs) of Dicistroviridae family such as the cricket paralysis virus (CrPV).

For example, the viral IRES element belonged to Picornaviridae may be derived from at least one of Enterovirus genus, Cardiovirus genus, Apthovirus genus, Hepatovirus genus and Teschovirus genus. As an example, the viral IRES element belonged to Enterovirus genus may be derived from anyone of Enterovirus A to Enterovirus J types and/or anyone of Rhinovirus A to Rhinovirus C types.

In another exemplary aspect, the viral IRES element to belong to Picornaviridae family may have a nucleotide sequence having IRES activity derived from at least one of 1) Enterovirus genus such as poliovirus (PV), Rhinovirus (RV), Coxsackie virus, for example, coxsackie B virus (CVB) such as coxsackie B3 virus (CVB3) and/or enterovirus 71 (EV71); 2) Cardiovirus genus such as Encephalomyocarditis virus (EMCV) and/or Theiler murine encephalomyelitis virus (TMEV); 3) Apthovirus genus such as Foot-and-mouth disease virus (FMDV); 4) Hepatovirus genus such as Hepatitis A virus (HAV); and/or 5) Teschovirus genus such as porcine teschovirus (PTV), for example, PTV-1.

In an alternative aspect, the viral IRES element belonged to Togaviridae family may be derived from Alphavirus genus such as Sindbis virus (SV). Also, the viral IRES element belonged to Dicistroviridae family may be derived from Cripavirus genus such as Plautia stail intestine virus (PSIV), Cricket paralysis virus (CrPV), Triatoma virus and/or Rhopalosiphum padi virus (RXPD).

In another exemplary aspect, the viral IRES element belonged to Flaviridae family may be derived from 1) Hepacivirus genus such as hepatitis C virus (HCV); 2) Flavivirus genus such as Japanese encephalitis virus (JEV); and/or 3) Pestivirus genus such as classical swine fever virus (CSFV) and/or bovine viral diarrhea virus (BVDV).

In still another exemplary aspect, the viral IRES element belonged to Retroviridae family may be derived from 1) Gammaretrovirus genus such as friend murine leukemia virus (FMLV) and/or moloney murine leukemia virus (MMLV); and/or 2) Alpharetrovirus genus such as rous sarcoma virus (RSV). In addition, the viral IRES element belonged to Herpesviridae family may be derived from Mardivirus such as Marek's disease virus (MDV). However, the viral IRES element is not limited to the above virus.

As an example, the viral IRES element of the expression control element "ECE" may be derived from Picornaviridae family and/or Dicistroviridae family. In this case, the viral IRES element derived from Picornaviridae family may be a nucleotide sequence having the IRES activity derived from Enterovirus genus, Cardiovirus genus and/or Apthovirus genus, preferably from Enterovirus genus.

Also, the viral IRES element may be a nucleotide sequence having the IRES activity derived from Enterovirus genus, e.g., Coxsackie virus such as CVB3 and/or Cardiovirus genus, e.g. EMCV. In addition, the viral IRES element belonged to Dicistroviridae family may be a nucleotide sequence having the IRES activity derived from Cripavirus genus such as PSIV and/or CrPV, preferably CrPV.

In an exemplary aspect, the expression control element "ECE" may have a viral IRES element selected from, but is not limited to, a group consisting of CVB3, EMCV, CrPV and combination thereof.

In addition, other nucleic acid sequences that can enhance expression efficiency of the coding region "CR", which can be operatively linked to the expression control element "ECE" as ORF form, can be inserted into the nucleic acid molecule in accordance with the present disclosure. As an example, multiple adenosines "MA" or multiple thymidines "MT" may be located adjacently to, preferably upstream (5' end) of, the expression control element "ECE". In one exemplary aspect, 20 to 400, preferably 30 to 300, more preferably 30 to 200, and most preferably 30 to 100 adenosines or thymidines may be inserted to the upstream of the expression control element "ECE" having the IRES element.

In one exemplary aspect, the nucleic acid molecule including the viral IRES as the expression control element "ECE" may be act as an adjuvant. In this case, the nucleic acid molecule may comprise multiple-cloning site at least one of the upstream and/or the downstream of the expression control element "ECE".

In an alternative aspect, the coding region "CR" of the nucleic acid molecule may comprise nucleotides of ORFs of GOI that can be expressed to proteins or peptides. The coding region "CR" may be linked operatively to the expression control element "ECE". For example, the coding region "CR" may be located, but is not limited to, a downstream (3'-end) of the expression control sequence "ECE".

In one exemplary aspect, the coding region "CR" may comprise ORFs encoding antigens, antibodies, pharmaceuticals, fragments thereof, variants thereof and/or derives thereof. For example, the coding region "CR" may comprise nucleotides of ORFs encoding antigens or fragment thereof such as epitopes thereof in case the coding region "CR" encodes an immunogenic peptides or proteins. As an example, the coding region "CR" may comprise nucleotides encoding an immunogen that may be included in the composition in accordance with the present disclosure.

In one exemplary aspect, the coding region "CR" may comprise ORFs encoding antigens, fragment thereof, variants or derivatives thereof. For example, the antigens can be expressed from the coding region "CR" may comprise tumor antigens, animal antigens, vegetation antigens, viral antigens, bacterial antigens, fugal antigens, protozoan antigens, autoimmune antigens and/or allergic antigens. Preferably, the antigens may have secreted forms of surface antigens of tumor cells, viral pathogens, bacterial pathogens, fungal antigens and/or protozoan antigens.

The pathogenic antigens that may be expressed from the coding region "CR" may be originated from pathogenic organisms inducing immune responses by mammalian individuals, particularly by humans. As an example, the pathogenic antigens may be originated from bacterial, viral or protozoan (multi-cellular) pathogenic organisms. In one exemplary aspect, the pathogenic antigens may be surface antigens located on the surface of organisms such as viruses, bacteria or protozoa, for example, for example, proteins (or fragment of proteins such as external parts of the surface antigens).

In one exemplary aspect, the pathogenic antigens may be expressed form the coding region "CR" is peptide or protein antigens originated from infectious-diseases associated pathogens.

For example, with regard to the pathogenic antigens, the antigens expressed from the coding region "CR" in the nucleic acid molecule of the present disclosure may be antigens originated from pathogens selected from Influenza virus, Respiratory syncytial virus (RSV), Herpes simplex virus (HSV), Human papillomavirus (HPV), Human immunodeficiency virus (HIV), *Plasmodium* genus, Staphylococcus aureus, Dengue viruses, Chlamydia trachomatis, Cytomegalovirus (CMV), Hepatitis B Virus (HBV), Mycobacterium tuberculosis, Rabies virus, Yellow fever virus, Middle East respiratory syndrome coronavirus (MERS-CoV) and/or Zika virus.

That is, in one exemplary aspect, the peptides or the proteins expressed from the coding region "CR" may be peptides or proteins such as immunogens (including antigens and antibodies) that can induce immune response in vivo. In other words, the coding region "CR" may comprise ORFs encoding immunogenic peptides or proteins such as antigens or antibodies. In this case, the nucleic acid molecule in accordance with the present disclosure may function as genetic vaccines. In addition, the nucleotide sequences that may be inserted into the coding region "CR" may be designed or modified to have optimized nucleotide sequences by the type of vectors and/or host cells used to express the nucleic acid molecule of the present disclosure.

In accordance with one exemplary aspect, the nucleic acid molecule of the present disclosure may have an RNA platform. In this case, the nucleic acid molecule of the present disclosure may be utilized as RNA vaccines or RNA adjuvants that can be injected into an individual or a subject when the coding region "CR" comprises ORFs encoding peptides and/or proteins such as pathogenic antigens that can induce immune responses in the individual.

In another exemplary aspect, the coding region "CR" may comprise ORFs encoding therapeutic peptides and/or proteins with regard to curing or treating diseases. In this case, the nucleic acid molecule in accordance with the present disclosure may be utilized as adjuvants that can reinforce the immune response related with gene medicines and/or treating diseases. In an exemplary aspect, the therapeutic peptide or the protein with regard to treating diseases may comprise therapeutic peptides or proteins used for treating metabolic or endocrine disorders; therapeutic peptides or proteins used for treating blood disorders, circulatory system disorders, respiratory system disorders, cancer or tumor disorders, infections disorders or immune-deficiency; therapeutic peptides or proteins used for treating hormone replacement therapies; therapeutic peptides or proteins used for differentiating reversely somatic cells into omni- or pluri-potent stem cells; therapeutic peptides or proteins selected from adjuvant or immune-stimulatory proteins; and/or antibodies.

In one exemplary aspect, the coding region "CR" may comprise ORFs corresponding to the pharmaceutically active ingredient in the pharmaceutical composition, i.e. encoding the pharmaceutically active ingredients or fragments thereof. For example, the coding region "CR" may comprise ORFs encoding antigens or antibodies or fragments thereof when the pharmaceutically active ingredients comprise peptides or proteins such as the antigens or the antibodies.

There is no limitation in the length of the ORFs in the coding region "CR", and the expression efficiency depending on the ORF length is not considered in developing a nucleic acid molecule in accordance with the present disclosure, a recombinant vector, and nucleic acid vaccines for preventing or treating diseases using the molecule. Codon usage is not considered in developing human vaccines or gene therapies because codon usage basis in human has not affected on common peptides/proteins expression significantly.

However, it may be preferable that start codon have Kozak sequence and nucleotides adjacent to termination codon may be optimized. If necessary, the third codon among GOI or its transcript mRNA codon to be expressed may be changed "G/C" without changing amino acid so that mRNA may have improved stability.

The nucleic acid molecule may comprise at least one Cloning Site, preferably Multiple Cloning Site (MCS) for inserting the coding region "CR" therein. The at least one Cloning Site may comprise at least one restriction endonuclease recognition site and/or sequences cut by the at least one restriction endonuclease. The restriction endonuclease may comprise artificially engineered restriction endonuclease (e.g. zinc finger nuclease or restriction endonuclease based on DNA binding site of TAL effector or PNA-based PNAzymes) as well as naturally-occurring endonuclease found in bacterial or archaebacteria.

For example, the naturally-occurring restriction endonuclease may be classified into 1) Type I endonuclease (cuts sites spaced apart from recognition site and requires ATP, S-adenosyl-L-methionine and $Mg^{2+}$), 2) Type II endonuclease (cuts specific sites within or spaced apart from recognition site and most requires $Mg^{2+}$), 3) Type III endonuclease (cuts specific site spaced apart from recognition site and requires only ATP without hydrolysis of ATP), 4) Type IV endonuclease (targets modified sites such as methylation, hydroxyl methylation or glucosyl-hydroxyl methylation), and 5) Type V endonuclease (e.g. CRISPR cas9-mRNA complex).

For example, the following restriction endonuclease recognition site and/or cutting site may be used: 5'-ATCGAT-3'(Ang I, (SEQ ID NO: 17)), 5'-AGGCCT-3'(Aat I, (SEQ ID NO: 18), 5'-TGATCA-3'(Aba I, (SEQ ID NO: 19)), 5'-GGATCC-3'(BamH I, SEQ ID NO: 20), 5'-GCAGC(N)$_8$-3'(Bbv I, (SEQ ID NO: 21)), 5'-(N)$_{10}$CGA(N)$_6$TGC(N)$_{12}$-3'(Bcg I, (SEQ ID NO: 22)), 5'-(N)$_8$GAG(N)$_5$CTC(N)$_{13}$-3' (Bpl I, (SEQ ID NO: 23), 5'-GTCTC(N)-3'(BsmA I; Alw26 I, (SEQ ID NO: 24)), 5'-ACTGGN-3'(Bsr I, (SEQ ID NO: 25)), 5'-ATCGAT-3'(Cla I, (SEQ ID NO: 26)), 5'-CTCTTCN-3'(Ear I, (SEQ ID NO: 27)), 5'-CTGAAG(N)$_{16}$-3'(Eco57 I, (SEQ ID NO: 28)), 5'-GAATTC-3'(EcoR I, (SEQ ID NO: 29)), 5'-CCWGG-3'(EcoR II; W is A or T, (SEQ ID NO: 30)), 5'-GATATC-3'(EcoRV, (SEQ ID NO: 31), 5'-GGATG(N)$_9$-3'(Fok I, (SEQ ID NO: 32)), 5'-GGCC-3'(HaeIII, (SEQ ID NO: 33)), 5'-AAGCTT-3'(HindIII, (SEQ ID NO: 34)), 5'-CCGG-3'(HpaIII, (SEQ ID NO: 35)), 5'-GGTGA(N)$_8$-3'(Hph I, (SEQ ID NO: 36)), 5'-GGTACC-3'(Kpn I, (SEQ ID NO: 37)), 5'-GATC-3'(Mbo I, (SEQ ID NO: 38)), 5'-ACGCGT-3'(Mlu I, (SEQ ID NO: 39)), 5'-GCCGGC-3'(Nae I, (SEQ ID NO: 40)), 5'-GATATG-3' (Nde II, (SEQ ID NO: 41)), 5'-GCCGGC-3'(NgoMIV, (SEQ ID NO: 42)), 5'-CATG-3'(NlaIII, (SEQ ID NO: 43)), 5'-GCGGCCGC-3'(Not I, (SEQ ID NO: 44)), 5'-TTAAT- TAA-3' (Pac I, (SEQ ID NO: 45)), 5'-CTGCAG-3'(Pst I, (SEQ ID NO: 46)), 5'-GAGCTC-3'(Sac I, (SEQ ID NO: 47)), 5'-CCGCGG-3'(Sac II, (SEQ ID NO: 48)), 5'-GTCGAC-3'(Sal I, (SEQ ID NO: 49)), 5'-GCATC(N)5-3'(SfaN I, (SEQ ID NO: 50)), 5'-CCCGGG-3'(Sma I, (SEQ ID NO: 51)), 5'-TCGA-3'(Taq I, (SEQ ID NO: 52)), 5'-TCTAGA-3'(Xba I, (SEQ ID NO: 53)), 5'-CTCGAG-3' (Xho I, SEQ ID NO: 54)) and combination thereof.

Besides, the nucleic acid molecule of the present disclosure may comprise optionally 3'-UTR so as to enhance expression efficiency of the ORF in the coding region "CR" in case the expression control element "ECE" has 5'-UTR including the IRES nucleotide sequences. In this case, the coding region "CR" may be located between 5'-UTR and 3'-UTR. 3'-UTR may enhance translation efficiency of GOI or its transcript together with 5'-UTR and has a significant role in stabilizing transcript mRNA in cells.

In one exemplary aspect, 3'-UTR may be derived from viral sources as 5'-UTR including IRES elements. In this case, 3'-UTR may be derived from identical or different viruses from 5'-UTR having the IRES element. In one exemplary aspect, a viral 3'-UTR may be derived from Picornaviridae family, Togaviridae family, Dicistroviridae family Flaviridae family, Retroviridae family and/or Herpesviridae family.

As an example, the viral 3'-UTR belong to of Picornaviridae family may be derived from, but is not limited to, 1) Enterovirus genus (e.g. PV, RV, Coxsackie virus such as CVB3, and/or EV71); 2) Cardiovirus genus (e.g. EMCV and/or TMEV); 3) Apthovirus genus (e.g. FMDV); 4) Hepatovirus genus (e.g. HAV); and/or 5) Teschovirus genus (e.g. PTV such as PTV-1).

The viral 3'-UTR belonged to Togaviridae family may comprise, but is not limited to, a 3'-UTR derived from Alphavirus genus (e.g. SV), and viral 3'-UTR belonged to Dicistroviridae family may comprise, but is not limited to, a 3'-UTR derived Cripavirus genus (e.g. PSIV, CrPV, Triatoma virus and/or RXID). In an alternative aspect, the viral 3'-UTR belonged to Flaviridae family may comprise, but is not limited to, a 3'-UTR derived from Hepacivirus genus (e.g. HCV), Flavivirus genus (e.g. JEV) and/or Pestivirus genus (e.g. CSFV and/or BVDV). In another exemplary aspect, the viral 3'-UTR belonged to Retroviridae family may comprise, but is not limited to, a 3'-UTR derived from Alpharetrovirus genus (e.g. RSV), and the viral 3' UTR belonged to Herpesviridae family may comprise, but is not limited to, a 3'-UTR derived from Mardivirus genus (e.g. MDV).

Besides, the nucleic acid molecule may further include a transcription control element "TCE" located adjacently to the expression control element "ECE" for promoting transcription of thereof. As an example, the transcription control element "TCE" may be located upstream (5' end) of the expression control element "ECE". Such transcription control sequence "TCE" is not limited to specific elements. The transcription control element "TCE: may include enhancers or promoters. Enhancer sequences are nucleic acid sequences which are located at various sites with regard to the promoter and increase transcription activity compared to a transcription activity by the promoter without the enhancer sequences. The promoter, one of the transcription control element "TCE", may be linked operatively to the coding region "CR".

It is possible to direct amplification and/or expression of the target sequence "TS" composed of ORFs using both natural promoter sequences and a plurality of foreign promoters. For example, when the nucleic acid molecule of the present disclosure is used as an adjuvant, the transcription control element "TCE" may include promoters derived from the genome of mammalian cells, promoters derived from mammalian viruses and/or promoters derived from bacteriophages.

For example, the transcription control element "TCE" may include, but is not limited to, CMP virus promoters, adenovirus later promoters, vaccinia virus 7.5K promoters, SV40 promoters, HSV tK promoters, $T_7$ promoters, $T_3$ promoters, SM6 promoters, RSV promoters, EF1 alpha promoters, metallothionein promoters, beta-actin promoters, promoters of human IL-2 gene, promoters of human IFN gene, promoters of human IL-4 gene, promoters of human lymphotoxin gene, promoters of human GM-CSF gene, tumor cell specific promoters (e.g., TERT promoter, PSA promoter, PSMA promoter, CEA promoter, E2F promoter and AFP promoter), tissue specific promoters (e.g., albumin promoter).

The transcription control element "TCE" such as promoters, for example, derived from bacteriophage may be located upstream of the expression control element "ECE" for transcribing linearized DNA to RNA. The transcription signal element "TCE" may be any promoters that can transcribe the linearized DNA into mRNA and may comprise $T_7$ bacteriophage promoter, $T_3$ bacteriophage promoter and SP6 bacteriophage promoter. In this case, the transcription control element "TCE" may be located adjacently to the expression control element "ECE".

In addition to the above-described expression control element "ECE", the coding region "CR", the 3'-UTR and the transcription control element "TCE", the nucleic acid molecule may further other nucleotides that can induce the expression of the target sequence "TS" as the ORFs constituting the coding region "CR". In one exemplary aspect, the nucleic acid molecule may have Kozak sequence/element inserted between the expression control element "ECE" (e.g. 5'-UTR having IRES element) and the start codon of the coding region "CR". In an alternative aspect, nucleotides as start codon (e.g. CCTGCT (SEQ ID NO: 55)) and/or another recognition sequence (e.g. ATGGCAGCTCAA (SEQ ID NO: 56)) for enhancing expression of GOI may be inserted downstream of the expression control element "ECE".

Also, a polyadenylation signal sequence and/or polyadenosine sequence "PA" may be inserted downstream of the coding region "CR", or 3'-UTR in case of using 3' UTR" so as to stabilize the transcribed nucleic acid molecule and further enhance translation efficiency of ORFs in the coding region "CR". For example, the polyadenosine sequence "PA" may comprise about 25 to about 400, preferably about 30 to about 400, more preferably about 50 to about 250, and most preferably about 60 to about 250 adenosines when the nucleic acid molecule of the present disclosure comprise RNA transcript nucleotides.

In still another exemplary aspect, polyadenylation signal sequences may be located downstream of the coding region "CR" in case the nucleic acid molecule of the present disclosure includes DNA platform nucleotides. The polyadenylation signal sequence may have common structure of 5'-NNUANA-3' motif (wherein N is any base or nucleotide of adenine/adenosine, cytosine/cytidine, thymine/thymidine, guanine/guanidine and uracil/uridine). For example, the polyadenylation signal sequence may common structures such as 5'-AAUAAA'-3' or 5'-AUUAAA-3'. As an example, the polyadenylation signal sequence may be derived from, but is not limited to, SV40, human growth factor (hGH), bovine growth factor (BGH) and/or rabbit beta-globin (rbGlob).

Figure 2:
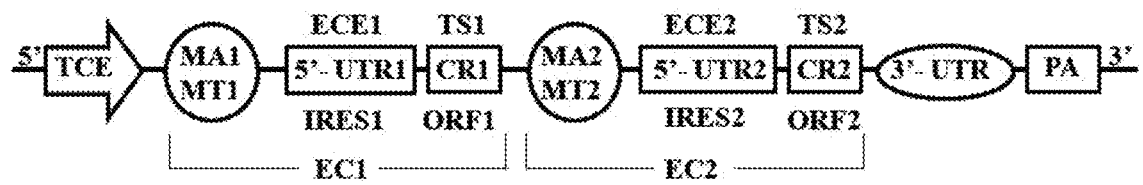
FIG. 2 is a schematic diagram showing a nucleic acid molecule of an adjuvant in accordance with another aspect of the present disclosure. The nucleic acid molecule has plural expression cassettes.

In FIG. 1, the nucleic acid molecule including single expression control element and single coding region is illustrated. In a different aspect, a nucleic acid molecule of the present disclosure may comprises multiple expression control elements having IRES elements and multiple coding regions encoding peptides or proteins that can be expressed by at least one of multiple expression control elements. FIG. 2 is a schematic diagram showing a nucleic acid molecule including multiple expression control elements and multiple coding regions.

As illustrated in FIG. 2, the nucleic acid molecule according to another aspect of the present disclosure includes two expression cassettes "EC1" and "EC2". The first expression cassette "EC1" includes a first expression control element "ECE11" (e.g. 5'-UTR1) having an IRES element. Optionally, the first expression cassette "EC1" includes a first coding region "CR1" linked operatively to the first expression control element "ECE1" and comprising a first ORF "ORF1" as a first target sequence "TS1". The second expression cassette "EC2" comprises a second expression control element "ECE2" (e.g. 5'-UTR2) having an IRES element, and optionally a second coding region "CR2" linked operatively to the second expression control element "ECE2" and comprising a second ORF "ORF2" as a second target sequence "T52". In one exemplary aspect, the second expression control element "ECE2" may be located downstream of the first expression control element "ECS1", the first coding region "CR1" may be located between the first expression control element "ECE1" and the second expression control element "ECE2", and the second coding region "CR2" may be located downstream of the second expression control element "ECE2".

In one exemplary aspect, each the first expression control element "ECE1" and the second expression control element "ECE2" may be a viral IRES element, for example, a viral 5'-UTR having the IRES elements as described above with reference with FIG. 1. The first expression control element "ECE1" and the second expression control element "ECE2" may have viral IRES elements derived from identical source. Alternatively, the first expression control element "ECE1" and the second expression control element "ECE2" may have viral IRES elements derived from different sources.

In an alternative aspect, the nucleic acid molecule may further comprise multiple adenosines or multiple thymidines inserted adjacently to, for example, upstream (5' end) of at least one of the multiple expression control elements "ECE1" and "ECE2".

As an example, in FIG. 2, multiple adenosines or multiple thymidines "MA1/MT1" are inserted upstream of the first expression control elements "ECE1" that is located adjacently to the transcription control element "TCE", and anther multiple adenosines or multiple thymidines "MA2/MT2" are inserted upstream of the second expression control element "ECE2". However, multiple adenosines or multiple thymidines, each of which enhances respective ORF in the coding regions "CR1" and "CR2", may be inserted adjacently to, preferably upstream of, at least one of the first and second expression control elements "ECE1" and "ECE2".

In one exemplary aspect, the at least one of the first and second expression control elements "ECE1" and "ECE2" may comprise viral IRES elements "IRES1" and "IRES2". Concretely, the first and/or second expression control elements "ECE1" and "ECE2" may comprises a viral IRES element derived from Picornaviridae family, Togaviridae family, Dicistroviridae family, Flaviridae family, Retroviridae family and/or Herpesviridae family.

For example, the first and/or second expression control elements "ECE1" and/or "ECE2" including the viral IRES nucleotides may comprise a viral IRES element derived from Picornaviridae family and/or Dicistroviridae family. As an example, at least one of the first and second expression control elements "ECE1" and "ECE2" including a viral IRES element belonged to Picornaviridae family may comprise a viral IRES element derived from Enterovirus genus, Cardiovirus genus and/or Apthovirus genus, particularly preferably, a viral IRES element derived from Enterovirus genus. For example, at least one of the first and second expression control elements "ECE1" and "ECE2" including a viral IRES element belonged to Picornaviridae family may comprise a viral IRES element derived from Enterovirus genus (e.g. Coxsackie virus such as CVB3) and/or a viral IRES element derived from Cardiovirus genus (e.g. EMCV).

Also, at least one of the first and second expression control elements "ECE1" and "ECE2" including a viral IRES element belonged to Dicistroviridae family may comprise a viral IRES element derived from Cripavirus genus (e.g. PSIV and/or CrPV).

In addition, the coding region may comprise a first coding region "CR1" located between the first and second expression control elements "ECE1" and "ECS2", and a second coding region "CR2" located downstream of the second expression control element "ECE2". Each of the first and second coding regions "CR1" and "CR"2 may comprise ORF of GOI or its transcript encoding peptides or proteins. As an example, each of the first and second coding regions "CR1" and "CR2" may comprise ORFs encoding immunogens such as antigens/antibodies and/or peptides or proteins with regard to treating diseases, as described above. In one exemplary aspect, the first coding region "CR1" may be linked operatively to the first expression control element "ECE1" (e.g. 5'-UTR1), and the second coding region "CR2" may be linked to operatively to the second expression control element "ECE2" (e.g. 5'-UTR2).

Each of the first target sequence "TS1" as ORF1 in the first coding region "CR1" and the second target sequence "T52" as ORF2 in the second coding region "CR2" may have ORFs encoding different peptides or proteins. In this case, different proteins or peptides can be expressed from single nucleic acid molecule. In one exemplary aspect, each of the first coding region "CR1" and the second coding region "CR2" may include ORFs encoding different antigens or fragment thereof. In this case, the nucleic acid molecule in accordance with the present disclosure or the recombinant vector comprising the molecule can express different antigens and can be utilized genetic vaccines for preventing multiple diseases. In another exemplary aspect, when each of the first and second coding regions "CR1" and "CR2" comprises ORFs encoding different therapeutic peptides or proteins, the nucleic acid molecule or the recombinant vector comprising the molecule can be utilized for treating or curing multiple diseases.

Similar to the nucleic acid molecule illustrated in FIG. 1, the nucleic acid molecule illustrated in FIG. 2 including multiple expression control elements "ECE1" and "ECE2" and multiple coding regions "CR1" and "CR2", may further include nucleotides that can enhance the expression of ORF1 and/or ORF2. As an example, the nucleic acid molecule may further comprise 3'-UTR when the first and/or second expression control elements "ECE1" and "ECE2" includes 5'-UTR having IRES element such as a viral IRES element. In this case, 3'-UTR may be preferably located downstream of the second coding region "CR2". The 3'-UTR may comprise the viral 3'-UTR as described referring to FIG. 1.

For example, the 3'-UTR may be derived from the same sources at least one of the 5'-UTR1 in the first expression control element "ECE1" or the 5'-UTR2 in the second expression control element "ECE2". In an exemplary aspect, the 3'-UTR may be derived from, but is not limited to, the same source of the 5'-UTR1.

In addition, the nucleic acid molecule illustrated in FIG. 2 may further comprise a transcription control element "TCE" located adjacently to the expression control elements "ECE1" and "ECE2", for example, upstream of the first expression control element "ECE1", and Kozak sequence between each of the expression control elements "ECE1" and "ECE2" and each of the coding sequences "CR1" and "CR2". Besides, if necessary, the nucleic acid molecule may further comprise start codon sequences and/or recognition sequences for enhancing expression of "ORF1" and "ORF2" downstream of each of the expression control elements "ECE1" and "ECE2". Also, in one exemplary aspect, the nucleic acid molecule may further comprise polyadenylation signal sequence or poly adenosine sequences "PA" downstream of the second coding region "CR2", or 3'-UTR if the 3' UTR is inserted.

While FIG. 2 shows two expression control elements "ECE1" and "ECE2" and two coding regions "CR1" and "CR2", the nucleic acid molecule may have three or more expression control sequences and/or coding regions.

The nucleic acid molecules illustrated in FIGS. 1 and 2 may be inserted into a vector. For example, the vector may include viral vectors, DNA or RNA expression vectors, plasmid, cosmid, or phage vectors, DNA or RAN expression vectors linked to CCA (cationic condensing agents), DNA or RNA expression vectors packaged with liposomes, specific eukaryotic cells such as producer cells and the likes. In accordance with an exemplary aspect, the nucleic acid molecule is inserted into an appropriate vector and then is modified to RNA transcript via in vitro transcription (IVT). Vector components generally comprises, but is not limited to, replication origins (especially if the vector is inserted into prokaryotes), selection marker genes, signal sequences, and a transcription termination sequence.

The nucleic acid molecule as an adjuvant of the present disclosure can induce non-antigen specific immune responses. With regard to the immune response, T lymphocytes are differentiated into T-helper 1 ($Th_1$) cells and T-helper 2 ($Th_2$) cells and immune system can destroy intra-cellular pathogens (e.g. antigens) by $Th_1$ cells and extra-cellular pathogens by $Th_2$ cells. $Th_1$ cells helps cell-mediated immune response by activating macrophages and cytotoxic T-cells, while $Th_2$ cells facilitates humoral immune responses by enhancing B-cell for transformation into cytoplasmic cells and by forming antibodies against the antigens. Accordingly, the ratio of $Th_1$ cells/$Th_2$ cells in immune response is very significant. The nucleic acid molecule of the present disclosure can enhance and induce $Th_1$ immune response, i.e. cell-mediated immune responses. Accordingly, when the nucleic acid molecule is injected into body together with a pharmaceutically active ingredient, e.g. immunity enhancing components, the nucleic acid molecule may act as adjuvant that enhances specific immune responses induced by the pharmaceutically active ingredients.

The composition includes a metal complex stabilizing the nucleic acid molecule of an adjuvant or a pharmaceutically acceptable salt thereof. The metal complex may include zinc ion that coordinates with nitrogen atom in dipicolylamine including amino groups substituted with two picolyl groups. The nitrogen atom linked to the picolyl group forms an amide bond through an aryloxyl group, and aliphatic linker (bridging group) may be linked to both sides of the amide bond. As an example, the metal complex stabilizing the nucleic acid molecule of an adjuvant of the present disclosure may have the following structure of Formula 1:

[Formula 1]

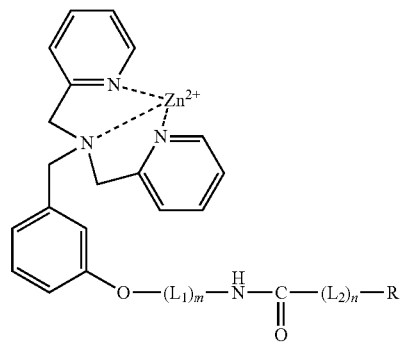

wherein each of $L_1$ and $L_2$ is independently a $C_1$-$C_{20}$ aliphatic bridging group; each of m and n is independently 0 or 1; R is a $C_1$-$C_{20}$ alkyl group or

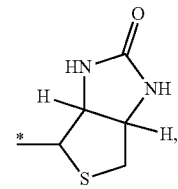

wherein asterisk indicate a linking site.

For example, each of $L_1$ and $L_2$ in Formula 1 may be independently a $C_1$-$C_{20}$ alkylene group or a $C_1$-$C_{20}$ alkenylene group consisting of only a single bond or at least one double bond in the chain. As an example, $L_1$ may be a $C_1$-$C_{10}$ alkylene group, preferably a $C_1$-$C_5$ alkylene group consisting only of single bonds, and $L_2$ may be a $C_2$-$C_{20}$ alkylene group, preferably a $C_{11}$-$C_{20}$ alkylene group including 1 or 2 double bonds. In an alternative aspect, each of $L_1$ and $L_2$ may be independently a $C_1$-$C_{10}$ alkylene group, preferably a $C_1$-$C_5$ alkylene group consisting of single bonds.

For example, the metal complex may be, but is not limited to, any metal complex having the following structure of Formula 2:

[Formula 2]

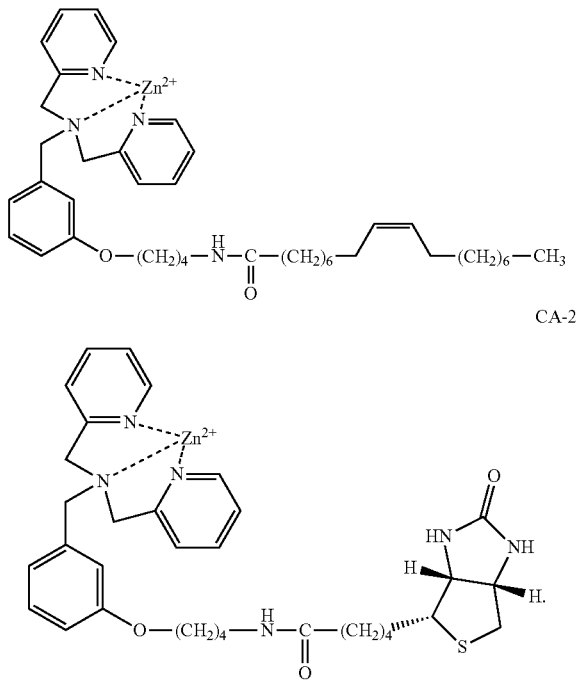

The pharmaceutically acceptable salt of the metal complex having the structure of Formula 1 or 2 may include an acid added salt formed by pharmaceutically acceptable free acid. The free acid includes an organic acid and an inorganic acid. The inorganic acid may include, but is not limited to, hydrochloric acid, phosphoric acid, sulfuric acid, nitric acid and stannic acid. The organic acid may include, but is not limited to, methane sulfonic acid, p-toluene sulfonic acid, acetic acid, trifluoro acetic acid, maleic acid, succinic acid, oxalic acid benzoic acid, tartaric acid, fumaric acid, mandelic acid, propionic acid, citric acid, lactic acid, glycolic acid, gluconic acid, galacturonic acid, glutamic acid, glutaric acid, glucuronic acid, aspartic acid, ascorbic acid, carbonic acid, vanillic acid and hydroiodic acid.

The metal complex having the structure of Formula 1 or 2 includes cationic metal component. Accordingly, the metal complex interacts with the nucleic acid molecule of an adjuvant having anions to stabilize the nucleic acid molecule. The nucleic acid molecule of an adjuvant having RNA platform is degraded by RNase in body so it cannot maintain its activity. When the metal complex having the structure of Formula 1 or 2 interacts with the nucleic acid molecule to form a complex, the degradation of the nucleic acid molecule by the RNase is prevented or minimized. In addition, the metal complex having the structure of Formula 1 or 2 may interact with an immunogen of a pharmaceutically active ingredient, which may be proteins or peptides, to stabilize the immunogen.

On the other hand, in an exemplary aspect, the composition may further include a pharmaceutically active ingredient in addition to the nucleic acid molecule of an adjuvant and the metal complex as a stabilizer. The pharmaceutically active ingredient is an immunity enhancing component such as an immunogen. Other antigenic components, for example, non-activated or attenuated pathogens may also be used.

As an example, the pharmaceutically active ingredient may be a compound having a curing and/or prevention effect against cancer, infectious diseases, auto-immune diseases and/or allergies. For example, the pharmaceutically active ingredient may comprise a compound treating and/or preventing cancers, infectious diseases, autoimmune diseases and/or allergies. For example, the pharmaceutically active ingredient may comprise peptides, proteins, nucleic acids, therapeutically active low-molecular organic or inorganic compounds, sugars, antigens or antibodies, therapeutics known to the art, antigen cells, fragments of antigen cells, cell debris, pathogens (including viruses or bacteria) modified chemically or light irradiations such as attenuated or inactivated pathogens.

As an example, the antigens as one of the pharmaceutically active ingredient may be peptides, polypeptides, proteins, cells, cell extracts, polysaccharides, complex polysaccharides, lipids, glycolipids and carbohydrates. More particularly, the antigens as one of the pharmaceutically active ingredients may comprise tumor antigens, animal antigens, vegetation antigens, viral antigens, bacterial antigens, fungal antigens, protozoan antigens, autoimmune antigens and/or allergic antigens each of which may be expressed from the coding regions "CR", "CR1" and "CR2".

For example, the antigens may have secreted forms of surface antigens of tumor cells, viral pathogens, bacterial pathogens, fungal pathogens and/or protozoan pathogens. If necessary, the antigens may be in the nucleic acid molecule in accordance with the present disclosure, or as heptene bound to an appropriate carrier. Other antigenic components, for example, inactivated or attenuated pathogens may be used.

In another alternative embodiment, antibodies, preferably therapeutically effective antigens may be used as the pharmaceutically active ingredient. In accordance with the present disclosure, antibodies against the cancers or infectious diseases such as cell-surface proteins, peptides or proteins expressed from tumor-suppressor genes or inhibitor genes, growth factors or elongation factors, apoptosis-associated proteins, tumor antigens, and above-mentioned antigens, proteins or nucleic acids may be preferably used as the pharmaceutically active ingredient.

For example, the pharmaceutical composition may be utilized as a vaccine in case of using the antigens as the pharmaceutically active ingredient or as disease therapeutics in case of using the antibodies as the pharmaceutically active ingredient. In one exemplary aspect, when the coding regions "CR", "CR1" and "CR2" encodes antigens, antibodies and fragments thereof in the nucleic acid molecules used as the adjuvant, the pharmaceutically active ingredient may be the antigens, antibodies and fragments thereof.

The composition in accordance with the present disclosure may include an additional adjuvant in addition to the nucleic acid molecule of an adjuvant. The additional adjuvant can reinforce of immune activities of the pharmaceutically active ingredient and/or the nucleic acid molecule of an adjuvant. the additional adjuvant that can be contained in the pharmaceutical composition may comprise protamine, nucleoline, spermine or spermidine, stabilizing cationic peptides or polypeptides, cationic polysaccharides, alum solution, aluminum hydroxide, aluminum phosphate gel, glucans from algae, squalene and its emulsion, Toll-like receptors; components known to enhance immunity based upon the biding affinity (as ligands) to TLR1, TLR2, TLR3, TLR4, TLR5, TLR6, TLR7, TLR8, TLR9, TLR10, TLR11, TLR12 or TLR13, a nucleic acid having CpG motif, particularly, CpG-RNA or CpG-DNA.

When the nucleic acid molecule in accordance with the present disclosure is mixed with the additional adjuvant, the mixing ratio is not specifically limited. As an example, the nucleic acid molecule in accordance with the present disclosure may be mixed with the additional adjuvant with a ratio of 100:1 to 1:100, preferably 10:1 to 1:10, more preferably 5:1 to 1:5, most preferably 3:1 to 1:3 by weight.

The contents or the concentration of the nucleic acid molecule as the adjuvant is not specifically limited. Particularly, when the nucleic acid molecule of RNA platform is used, it can be degraded rapidly in bodies so as to obtain improved safety and stability. In one exemplary aspect, the nucleic acid molecule may be contained with a concentration of 1~1000 μg/mL, and preferably, 10~1000 μg/mL in the pharmaceutical composition such as vaccines.

In one exemplary aspect, when the composition is formulated as liquid, the pharmaceutically acceptable carrier may comprise pyrogen-free water; isotonic saline or buffered (water) solution such as phosphate or citrate; plant oil such as peanut oil, cotton seed oil, sesame oil, olive oil, corn oil and cacao fruit oil; glycols such as propylene glycol, glycerol, sorbitol, mannitol and polyethylene glycol; and polyol such as alginic acid. In this case, aqueous buffer including sodium salts, calcium salts, and optionally potassium salts can be used for injecting liquid pharmaceutical composition into bodies. Sodium salts, calcium salts and potassium salts may have halogenized type such as iodine or bromine, hydroxide, carbonate salt, hydrogen-carbonate salt or sulfonate salts.

When the composition is formulated as solid, the pharmaceutically acceptable carrier may comprise solid carrier such as solid filter, liquid filter or diluents, and encapsulating compound may be used as the carrier for administering the composition. For example, the pharmaceutically acceptable carrier may comprise, but are not limited to, sugar such as lactose, glucose and sucrose; starch such as corn starch of potato starch; cellulose or its derivative such as sodium carboxyl methyl cellulose, ethyl cellulose and cellulose acetate; powdered tragacanth; malt; gelatins; tallow; solid lubricants such as stearic acid and magnesium stearate; and calcium sulfate. The pharmaceutically acceptable carrier suitable for injection may comprise hydrogel, adjusted release devices, delayed release devices, polylactic acid and collagen matrix. The pharmaceutically acceptable carrier appropriate for local uses may comprises lotion, cream, gel and similar thereof. If the composition is orally administered, tablet, capsule is preferred unit dosage form. The pharmaceutically acceptable salt for preparing unit dosage from for administering orally has been well known to the art.

The pharmaceutically acceptable carrier may be selected as the administering types of the composition. In one embodiment, the composition may be administered systemically. The administering route may comprise in oral, intracutaneous, intravenous, intra muscular, intra-articular, intrsynovial, intrathecal, intrhepatic, intralesional, intracranial, transdermal, intradermal, intrapumonal, intraperitoneal, intracardial, intraarterial, sublingual topical and/or intranasal.

The composition may be administered with any convenient type, for example, tablet, powder, capsule, solution, dispersion, suspension, syrup, spray, suppository, gel, emulsion, and patch. The composition may further include common additives such as buffer agent, stabilizing agent, surfactant, wetting agent, lubricant, emulsifier, suspendered agent, conservative, anti-oxidant, opacifying agent, slip modifier, processing aids, coloring agent, sweetener, perfume, flavoring agent, diluents and other additives that provides beautiful appearance of medicines (that is, the nucleic acid molecule, gene carrier or pharmaceutical composition of the active ingredient) or assists in manufacturing drugs.

Alternatively or additionally, the composition may comprise any enhancing agent such as cytotoxic agent, cytokine, chemo-therapeutics, growth-inhibitor or growth-enhancer. Such molecules are combined in an amount of intended purposes and exited appropriate An amount of the composition may be determined by common experiments using animal models. Such an animal model may comprise, but are not limited to, rabbit, sheep, mouse, dog and non-human primates. The pharmaceutical composition for injection may have a dosage form of sterilized aqueous solution, physiological saline solution and/or mixture thereof. The solution may have adjusted pH of about 7.4.

If necessary, the pharmaceutical composition may further include at least one auxiliary substance so as to further increase immunogenicity induced by the pharmaceutically active ingredient and/or the nucleic acid molecule as the adjuvant. For example, substances that allow maturation of dendiric cells (DCs), for example, lipopolysaccharides, TNF-alpha or CD40 ligand, form such auxiliary substances. Particularly preferred auxiliary substances are cytokines, such as monokines, lymphokines, interleukins or chemokines, that promote the immune response, such as various interleukins, interferons, GM-CSF, G-CSF, M-CSF, LT-beta or TNF-alpha, growth factors, such as hGH.

The composition of the present disclosure may further include common additives such as buffer agent, stabilizing agent, surfactant, wetting agent, lubricant, emulsifier, suspendered agent, conservative, anti-oxidant, opacifying agent, slip modifier, processing aids, coloring agent, sweetener, perfume, flavoring agent, diluents and other additives. Besides, the pharmaceutical composition may comprise any enhancing agent such as cytotoxic agent, cytokine, chemo-therapeutics, growth-inhibitor or growth-enhancer. For example, the pharmaceutical composition may contain emulsifier such as Tween; wetting agent such as sodium lauryl sulfate; coloring agent; taste-imparting agent; tablet-forming agents, stabilizing agent; anti-oxidant; and conservatives.

Particularly, the nucleic acid molecule in accordance with the present disclosure reinforces $Th_1$ immune response. As an example, the composition of the present disclosure may be used for inducing tumor-specific or pathogen-specific immune response. Such compositions or vaccines in accordance with the present disclosure can be used particularly preferably for increasing immune responses of antigen-presenting cells (APCs). Likewise particularly preferably, the compositions or vaccines in accordance with to the present disclosure can be used for the treatment of cancer or tumor diseases.

Also, the composition including the nucleic acid molecule in accordance with the present disclosure can be used for the treatment of infectious diseases, such infectious diseases are preferably selected from influenza, malaria. SARS, yellow fever, AIDS, Lyme borreliosis, Leishmaniasis, anthrax, meningitis, viral infectious diseases such as AIDS, Condyloma acuminata, hollow warts, Dengue fever, three-day fever, Ebola virus, cold, early summer meningoencephalitis (FSME), flu, shingles, hepatitis, herpes simplex type I, herpes simplex type II, Herpes zoster, influenza, Japanese encephalitis. Lassa fever, Marburg virus, measles, foot-and-mouth disease, mononucleosis, mumps, Norwalk virus infection, Pfeiffer's glandular fever, smallpox, polio (childhood lameness), pseudo-croup, fifth disease, rabies, warts, West Nile fever, chickenpox, cytomegalic virus (CMV), from bacterial infectious diseases such as miscarriage (prostate inflammation), anthrax, appendicitis, borreliosis, botulism. Camphylobacter, Chlamydia trachomatis (inflammation of the urethra, conjunctivitis), cholera, diphtheria, donavanosis, epiglottitis, typhus fever, gas gangrene, gonorrhoea, rabbit fever, Heliobacter pylori, whooping cough, climatic bubo, osteomyelitis, Legionnaire's disease, leprosy, listeriosis, pneumonia, meningitis, bacterial meningitis, anthrax, otitis media, Mycoplasma hominis, neonatal sepsis (Chorioamnionitis), noma, paratyphus, plague, Reiter's syndrome, Rocky Mountain spotted fever, Salmonella paratyphus, Salmonella typhus, scarlet fever, syphilis, tetanus, tripper, tsutsugamushi disease, tuberculosis, typhus, vaginitis (colpitis), soft chancre, and from infectious diseases caused by parasites, protozoa or fungi, such as amoebiasis, bilharziosis, Chagas disease, athlete's foot, yeast fungus spots, scabies, malaria, onchocercosis (river blindness), or fungal diseases, toxoplasmosis, trichomoniasis, trypanosomiasis (sleeping sickness), visceral Leishmaniosis, nappy/diaper dermatitis, schistosomiasis, fish poisoning (Ciguatera), candidosis, cutaneous Leishmaniosis, lambliasis (giardiasis), or sleeping sickness, or from infectious diseases caused by Echinococcus, fish tapeworm, fox tapeworm, canine tapeworm, lice, bovine tapeworm, porcine tapeworm, miniature tapeworm.

In addition, the composition including the nucleic acid molecule in accordance with the present disclosure can be used for the preparation of a medicament for the treatment of an allergic disorder or disease. Allergy is a condition that typically involves an abnormal, acquired immunological hypersensitivity to certain foreign antigens or allergens. Allergies normally result in a local or systemic inflammatory response to these antigens or allergens and leading to immunity in the body against these allergens. Allergens in this context include e.g. grasses, pollens, molds, drugs, or numerous environmental triggers, and the likes. Well known types of allergies include, without being limited thereto, allergic asthma (leading to swelling of the nasal mucosa), allergic conjunctivitis (leading to redness and itching of the conjunctiva), allergic rhinitis ("hay fever"), anaphylaxis, angioderm, atopic dermatitis (eczema), urticaria (hives), eosinophilia, respiratory, allergies to insect stings, skin allergies (leading to and including various rashes, such as eczema, hives (urticaria) and (contact) dermatitis), food allergies, allergies to medicine, and the likes.

For example, the composition of the present disclosure may treat and/or prevent allergic disorders or diseases derived from an allergen (e.g. from a cat allergen, a dust allergen, a mite antigen, a plant antigen (e.g. a birch antigen) and the likes) either as a protein. The composition may shift the exceeding immune response to a stronger $Th_1$ response, thereby suppressing or attenuating the undesired IgE response.

Moreover, the composition including the nucleic acid molecule and the metal complex may be used for the preparation of a medicament for the treatment of autoimmune diseases. Autoimmune diseases can be broadly divided into systemic and organ-specific or localized autoimmune disorders, depending on the principal clinico-pathologic features of each disease. Autoimmune disease, can be treated or prevented by the pharmaceutical composition, may be divided into the categories of systemic syndromes, including SLE, Sjögren's syndrome, Scleroderma, Rheumatoid Arthritis, polymyositis or local syndromes which may be endocrinologic (DM Type 1, Hashimoto's thyroiditis, Addison's disease and the likes), dermatologic (pemphigus vulgaris), haematologic (autoimmune haemolytic anaemia), neural (multiple sclerosis) or can involve virtually any circumscribed mass of body tissue. The autoimmune diseases to be treated may be selected from the group consisting of type 1 autoimmune diseases or type II autoimmune diseases or type III autoimmune diseases or type IV autoimmune diseases, such as, for example, multiple sclerosis (MS), rheumatoid arthritis, diabetes, type I diabetes (Diabetes mellitus), systemic lupus erythematosus (SLE), chronic polyarthritis, Basedow's disease, autoimmune forms of chronic hepatitis, colitis ulcerosa, type I allergy diseases, type II allergy diseases, type III allergy diseases, type IV allergy diseases, fibromyalgia, hair loss, Bechterew's disease, Crohn's disease, Myasthenia gravis, neurodermitis, Polymyalgia rheumatica, progressive systemic sclerosis (PSS), psoriasis, Reiter's syndrome, rheumatic arthritis, psoriasis, vasculitis, etc, or type II diabetes.

Hereinafter, while the present disclosure will be described via exemplary embodiments, the present disclosure is not limited to technical ideas illustrated in the following Examples.

Preparation Example 1: Fabrication of Nucleic Acid Molecule of RNA Platform

An artificial nucleic acid molecule of RNA platform including a IRES element derived from Coxsackie virus B3 (CVB3) was fabricated. A template DNA having the following ordered sequence was designed:

5'-BamH I recognition site-T7 promoter (SEQ ID NO: 6)-multiple adenosine (MA50)-5' UTR of CVB3 (SEQ ID NO: 1)-expression enhancing sequence (ATGGCAGCT-CAA (SEQ ID NO: 56))-MCS (EcoR I-Cla I-Pac I-Sac I recognition sites)-3' UTR of CVB3 (SEQ ID NO: 4)-poly A 50-Not I recognition site-3'.

The template DNA was cloned into pGH vector and linearized using restriction endonuclease. In vitro transcription (IVT) was performed using the Ribomax Large-scale RNA Production System T7 (Promega, USA).

For in vitro transcription, all RNA platforms were linearized with Not I. Transcription reactions contained 3 μg of Not I-cut plasmid DNA, T7 transcription buffer (5×), 25 mM rNTP, nuclease-free water, and T7 enzyme mix and were incubated for 4 h at 37° C. The transcripts were incubated with 1 μl of RNase-free DNase I (Promega) per 1 μg of plasmid DNA for 15 min at 37° C., followed by termination of the reaction by incubation at 65° C. for 10 min. DNase I treatment (Promega) was always performed to remove any DNA contamination during RNA purification using high yield RNA ultra-purification kits (RBC, Taiwan), according to the manufacturer's instructions. DNA and RNA purity and concentration were evaluated using a NanoDrop-2000 spectrophotometer (Thermo Fisher-Scientific, USA). The nucleic acid molecule of RNA platform fabricated in this Preparation Example will be referred as "pMA-CVB3-MCS".

Preparation Example 2: Fabrication of Nucleic Acid Molecule of RNA Platform

An artificial nucleic acid molecule of RNA platform was fabricated by repeating the same process as Preparation Example 1 except designing the following ordered template DNA having an IRES element derived from encephalomyocarditis virus (EMCV). The nucleic acid molecule of RNA platform fabricated in this Preparation Example will be referred as "pMA-EMCV-MCS".

5'-EcoR I recognition site-T7 promoter (SEQ ID NO: 6)-Multiple adenosines (MA50)-5' UTR of EMCV (SEQ ID NO: 2)-MCS (Cla I-Pac I-Sac I recognition sites)-3' UTR of EMCV (SEQ ID NO: 5)-poly A 50-Not I recognition site-3'.

Preparation Example 3: Fabrication of Nucleic Acid Molecule of RNA Platform

An artificial nucleic acid molecule of RNA platform was fabricated by repeating the same process as Preparation Example 1 except designing the following ordered template DNA having an IRES element derived from cricket paralysis virus (CrPV). The nucleic acid molecule of RNA platform fabricated in this Preparation Example will be referred as "pMA-CrPV-MCS".

5'-BamH I recognition site-T7 promoter (SEQ ID NO: 6)-Multiple adenosines (MA-50)-CrPV IGR IRES (SEQ ID NO: 3)-MCS (BamH I-EcoR I-Pac I-Sac I recognition sites)-SV40 late polyadenylation signal sequence (SEQ ID NO: 7)-Not I recognition site-3'.

Preparation Example 4: Fabrication of Nucleic Acid Molecule of RNA Platform

An artificial nucleic acid molecule of RNA platform was fabricated by repeating the same process as Preparation Example 1 except inserting 50 thymidines (MT-50) between T7 promoter and CVB3 5-UTR instead of 50 adenosines (MA-50). The nucleic acid molecule of RNA platform fabricated in this Preparation Example will be referred as "pMT-CVB3-MCS".

Preparation Example 5: Fabrication of Nucleic Acid Molecule of RNA Platform

An artificial nucleic acid molecule of RNA platform was fabricated by repeating the same process as Preparation Example 2 except inserting 50 thymidines (MT-50) between T7 promoter and EMCV 5-UTR instead of 50 adenosines (MA-50). The nucleic acid molecule of RNA platform fabricated in this Preparation Example will be referred as "pMT-EMCV-MCS".

Preparation Example 6: Fabrication of Nucleic Acid Molecule of RNA Platform

An artificial nucleic acid molecule of RNA platform was fabricated by repeating the same process as Preparation Example 3 except inserting 50 thymidines (MT-50) between T7 promoter and CrPV IGR IRES instead of 50 adenosines (MA-50. The nucleic acid molecule of RNA platform fabricated in this Preparation Example will be referred as "pMT-CrPV-MCS".

Preparation Example 7: Fabrication of Nucleic Acid Molecule of RNA Platform

An artificial nucleic acid molecule of RNA platform was fabricated by repeating the same process as Preparation Example 1 except not inserting 50 adenosines (MA-50) between T7 promoter and CVB3 5-UTR. The nucleic acid molecule of RNA platform fabricated in this Preparation Example will be referred as "pCVB3-MCS".

Preparation Example 8: Fabrication of Nucleic Acid Molecule of RNA Platform

An artificial nucleic acid molecule of RNA platform was fabricated by repeating the same process as Preparation Example 2 except not inserting 50 adenosines (MA-50) between T7 promoter and EMCV 5-UTR. The nucleic acid molecule of RNA platform fabricated in this Preparation Example will be referred as "pEMCV-MCS".

Preparation Example 9: Fabrication of Nucleic Acid Molecule of RNA Platform

An artificial nucleic acid molecule of RNA platform was fabricated by repeating the same process as Preparation Example 3 except not inserting 50 adenosines (MA-50) between T7 promoter and CrPV IGR IRES. The nucleic acid molecule of RNA platform fabricated in this Preparation Example will be referred as "pCrPV-MCS".

Example 1: Immunoassay

Immunoassay using each of the nucleic acid molecules of RNA platform fabricated in Preparation Examples 1 to 9 was performed to investigate the molecule of RNA platform as an adjuvant. C57BL/6 mice (Dae-Han Bio-Link, Republic of Korea) aged 6 weeks were inoculated by intramuscular injection, 2 times at 1 week interval with 5 μg of vaccine (SK Bioscience, Republic of Korea) having a MERS-CoV soluble spike protein (SEQ ID NO: 15; MERS S protein) as an antigen, 20 μg of nucleic acid molecule prepared in Preparation Examples 1-9 and 120 μg of alum. The Immunized group was divided to total 12 Groups as indicated by the following Table 1.

TABLE 1

| Nucleic Acid Molecule and MERS protein | |
|---|---|
| Group | Immune Substance |
| G1 | PBS (60 $\mu\ell$) |
| G2 | MERS S protein |
| G2 | MERS S protein + Alum |
| G4 | MERS S protein + Alum + pMA-pCVB3-MCS |
| G5 | MERS S protein + Alum + pMA-EMCV-MCS |
| G6 | MERS S protein + Alum + pMA-CrPV-MCS |
| G7 | MERS S protein + Alum + pMT-CVB3-MCS |
| G8 | MERS S protein + Alum + pMT-EMCV-MCS |
| G9 | MERS S protein + Alum + pMT-CrPV-MCS |
| G10 | MERS S protein + Alum + pCVB3-MCS |
| G11 | MERS S protein + Alum + pEMCV-MCS |
| G12 | MERS S protein + Alum + pCrPV-MCS |

Blood samples from all immunized mice were taken at two weeks after second immunization, and measured IgG1 and IgG2c immunoglobulins, each of which is specific for the injected MERS-CoV spike protein as an antigen, within the collected mouse serum using ELISA. The 96-well plates (Corning®) were coated with 50 ng/well MERS spike soluble protein vaccine overnight at 4° C. After incubation, the wells were blocked with 200 μl blocking buffer (PBS-1% BSA) for 1 hour at room temperature. Diluted serum samples were added to the plates and incubated for 1 hour at room temperature. After incubation, the wells were washed three times with 200 μl PBS-T (PBS-0.05% tween 20). The anti-mouse IgG1 and IgG2c-HRP (Bethyl, Invitrogen, and Novus, respectively) conjugated antibody and IgG1-biotin antibody and anti-IgG2c-HRP diluted 1/1000-1/10000 in PBS were added to the plate and incubated for 1 hour at room temperature. After washing the plate three times with PBS-T, 3,3'-5,5'-tetramethylbenzidine (TMB) substrate was added, the plate was incubated for 15 min and then 2N H2504 was used to stop the reaction. The O.D. values were measured at 450 nm using a GloMax explorer 817 microplate reader (Promega). Assay results are illustrated in FIGS. 3 and 4. As illustrated in FIG. 3, compared to G2 inoculating only MERS-CoV antigen, G3 formulated with alum and G4-G12 formulated with the nucleic acid molecule showed high IgG1 level which is related to $Th_2$ immune response. This means that the nucleic acid molecule including viral IRES elements without any coding region acts as immune stimulating agent inducing $Th_2$ immune response, that is, humoral immunity. In addition, as illustrated in FIG. 4, compared to Group G3 formulated with alum, Groups G6, G7, G8, G10 and G12, each of which is formulated with the nucleic acid molecule of RNA platform, showed high IgG2c level of immunoglobulin indicating mainly $Th_1$ immune response. It can be seen that the nucleic acid molecule including only viral IRES elements can function as an immune stimulating factor inducing T cell activation through $Th_1$ immune response and $Th_2$ immune response.

Preparation Example 10: Fabrication of Nucleic Acid Molecule of RNA Platform

An artificial nucleic acid molecule of RNA platform as multiple expression cassettes including multiple viral IRES elements derived from CrPV and EMCV. The process in Preparation Example 1 was repeated except that the designed template DNA has the following ordered sequences. The nucleic acid molecule of RNA platform fabricated in this Preparation Example will be referred as "pCrPV-HA-EMCV-HA.

5'-BamH I recognition site-$T_7$ promoter (SEQ ID NO: 6)-CrPV IGR IRES (SEQ ID NO: 3)-EcoR I recognition site-coding sequence of hemagglutin (HA) of influenza virus as a first coding region (SEQ ID NO: 9; add ATG at 5' end and TGA at 3' end)-MCS (Cla I-Mlu I-Sac I recognition sites)-5' UTR of EMCV (SEQ ID NO: 2)-MCS (EcoRV-Sal I-Pac I recognition sites)-Kozak sequence (GACC)-coding sequence of HA of influenza virus as a second coding region (SEQ ID NO: 10; add TGA at 3' end)-MCS (Pac I-SacII-recognition sites)-SV40 polyadenylation signal sequence (SEQ ID NO: 7)-Not I recognition site-3'.

Preparation Example 11: Fabrication of Nucleic Acid Molecule of RNA Platform

An artificial nucleic acid molecule of RNA platform as multiple expression cassettes including multiple viral IRES elements derived from CVB3 and EMCV. The process in Preparation Example 1 was repeated except that the designed template DNA has the following ordered sequences. The nucleic acid molecule of RNA platform fabricated in this Preparation Example will be referred as "pMA-CVB3-HA-EMCV-HA".

5'-BamH I recognition site-T7 promoter (SEQ ID NO: 6)-Hpa I recognition site-50 adenosines (MA)-Hpa I recognition site-5' UTR of CVB3 (SEQ ID NO: 1)-EcoR I recognition site-Kozak sequence-coding sequence of hemagglutin (HA) of influenza virus as a first coding region (SEQ ID NO: 9; add ATG at 5' end and TGA at 3' end)-MCS (Cla I-Mlu I-Sac I recognition sites)-5' UTR of EMCV (SEQ ID NO: 2)-MCS (EcoRV-Sal I-Pac I recognition sites)-Kozak sequence (GACC)-coding sequence of HA of influenza virus as a second coding region (SEQ ID NO: 10; add TGA at 3' end)-MCS (Pac I-SacII-recognition sites)-3' UTR of CVB3 (SEQ ID NO: 4)-50 adenosines (poly A tail)-Not I recognition site-3'.

Example 2: Immunoassay

Each of the nucleic acid molecules of RNA platform prepared in Preparation Examples 10-11 were injected into C57BL/6 mice (Dae-Han Bio-Link) aged 6 weeks 3 times at 2 week interval by repeating the same process as Example 1. For comparison, PBS, inactivated PR8 influenza virus (iPR8; SEQ ID NO: 16), alum (aluminum hydroxide), protamine and/or LNP (lipid nano particle) were injected into mice in accordance with the same immunization schedule.

Each of the coding regions was amplified using forward and reverse primers that covered the restriction site for the insertion of the MCS into each RNA platform. The target sequences in each condign region were inserted into the MCS of the RNA platform using restriction endonucleases (New England Biolabs, USA). *Escherichia coli* DH5α-competent cells were used for plasmid preparation, and all plasmid clones were checked by restriction mapping and direct DNA sequencing (Cosmo Genetech, Korea). Transfection-grade plasmid was obtained using LaboPass Plasmid Mini Purification Kits, according to the manufacturer's instructions (Cosmo Genetech).

Immunization Groups are divided into total 11 groups as indicated below Table 2. The iPR8 virus as an antigen was treated with $2.5 \times 10^5$ pfu/50 μl/mice, and alum was formulated 120 μg/mice per 5 μg of the antigen and then immunized into mice. While some of the nucleic acid molecule of RNA platform for the immunization was inoculated in a level of 50 μg/mice, but other nucleic acid molecule formulated with 25 μg of protamine (RNA: protamine=2:1) was inoculated to mice. The volume of whole immune substance in intramuscular injection was 100 μl/mice with exception 120 μl/mice in case of injecting LNP, and the volume of whole immune substance in electroporation injection was 45 μl/mice.

TABLE 2

| | Formulation of Nucleic Acid Molecule and Influenza Protein | | | | | | | | | | |
|---|---|---|---|---|---|---|---|---|---|---|---|
| | | I.M | | | | EP | | | | I.M. | |
| Group | PBS | HA1 | HA2 | HA3 | HA4 | HA5 | HA6 | HA7 | HA8 | HA9 | HA10 |
| iPR8 | − | + | + | + | + | − | − | − | − | − | − |
| Alum | − | − | + | − | − | − | − | − | − | − | − |
| NA1 | − | − | − | + | − | + | + | − | − | + | − |

TABLE 2-continued

Formulation of Nucleic Acid Molecule and Influenza Protein

| Group | I.M. | | | | EP | | | | I.M. | |
|---|---|---|---|---|---|---|---|---|---|---|
| | PBS | HA1 | HA2 | HA3 | HA4 | HA5 | HA6 | HA7 | HA8 | HA9 | HA10 |
| NA2 | – | – | – | – | + | – | – | + | + | – | + |
| Protamine | – | – | – | – | – | – | + | – | + | – | – |
| LNP | – | – | – | – | – | – | – | – | – | + | + |

I.M: Intramuscular Injection;
EP: Electroporation;
NA1: pCrPV-HA-EMCV-HA;
NA2: pMA-CVB3-HA-EMCV-HA After eight days from the third immunization, the influenza virus was challenged into the immunized mice. After four days from the challenge, i.e., when the body weight of mice was expressly reduced, splenocytes ($1\times10^6$ cells/100 μg/well; 96 well plate) obtained from sacrificed mice were treated with MHC I peptide and 2 μg (per well) of the recombinant iPR8 protein to stimulate them. After two days, HA specific $Th_1$ cells (IFN-γ secretion; IL-4) were assayed using ELISPOT (Mabtech). After three days from stimulation, cytokines in cultured supernatant were assayed using ELISA kit (eBioscience). FIG. 5 shows ELISPOT assay result, and FIGS. 6 and 7 show ELISA assay result.

As illustrated in FIG. 5, in case of stimulating with MHC I peptide, compared to Group HA2 formulated with alum against iPR8 as an antigen, T cell population secreting higher level of IL-4 was increased in Groups HA3 and HA4 each of which formulated with the nucleic acid molecule against iPR8 virus. As illustrated in FIGS. 6 and 7, in case of stimulating with the peptide, while Group HA2, formulated with alum against iPR8 virus as a positive control group, showed not high expression level of IL-6 and IFN-γ, Groups HA3 and HA4, formulated with the nucleic acid molecule against iPR8 virus, showed highly increased expression level of IL-6 and IFN-γ.

Preparation Example 12: Fabrication of Nucleic Acid Molecule of RNA Platform

An artificial nucleic acid molecule of RNA platform was fabricated by repeating the same process as Preparation Example 10 except designing the following ordered template DNA having an IRES element derived from CrPV. The nucleic acid molecule of RNA platform fabricated in the Preparation Example will be referred as "pCrPV-JEV".

5'-Kpn I recognition site-$T_7$ promoter (SEQ ID NO: 6)-CrPV IGR IRES (SEQ ID NO: 3)-BamH I recognition site-coding sequence of JEV envelope protein (SEQ ID NO: 11)-MCS (Pac I-Sac I recognition sites)-SV40 late polyadenylation signal sequence (SEQ ID NO: 7)-Not I recognition site-3'.

Example 3: Immunoassay

C57BL/6 mice (Dae-Han Bio Link) aged 6 weeks were inoculated by intramuscular injection, 2 times at 2 weeks interval with a pharmaceutical composition including the nucleic acid molecule fabricated in Preparation Example 12 formulated with CA-1 or CA-2 of Formula 2 as a stabilizer to immunize mice. 5 μg/mice of a subunit vaccine including JEV envelope protein (Nakayama strain; GenBank: AF272392.1) as an antigen was injected into mice. For each group, 20 μg of pCrPV-JEV nucleic acid molecule, 22.3 μg of CA-1 as a stabilizer, 22.3 μg of CA-2 as a stabilizer and/or 120 μg of human alum were injected. For comparison, 16 μg of protamine (Sigma Aldrich) or 9.6 μg of LP (cationic peptide having a lipid chain) was injected into each mouse. The immunization group was divided into total 9 groups as shown in Table 3.

TABLE 3

Formulation of Nucleic Acid Molecule and JEV Protein

| Group | G1 | G2 | G3 | G4 | G5 | G6 | G7 | G8 | G9 |
|---|---|---|---|---|---|---|---|---|---|
| JEV Envelope | – | + | + | + | + | + | + | + | + |
| Alum | – | – | + | – | + | + | + | + | + |
| pCrPV-JEV | – | – | – | + | + | + | + | + | + |
| Stabilizer | – | – | – | – | – | P | LP | CA-1 | CA-2 |

P: protamine

A level of immunoglobulin was assayed from the immunized mice sera in accordance with the same process as Example 1 with ELISA technology. Compared to group G5 without using the stabilizer after the $1^{st}$ immunization, groups G8 and G9, formulating the nucleic acid molecule with a stabilizer CA-1 or CA-2 of metal complex form, showed increasing IgG1 production (FIG. 8). Group 8, adding a composition formulated with the stabilizer CA-1 two weeks after the $2^{nd}$ immunization, showed highly increased production of IgG2a, which is an immunoglobulin related to $Th_1$ immune response.

Preparation Example 13: Fabrication of Nucleic Acid Molecule of RNA Platform

An artificial nucleic acid molecule of RNA platform was fabricated by repeating the same process as Preparation Example 1 except using a nucleic acid sequence encoding MERS-CoV soluble spike protein (SEQ ID NO: 8; add ATG at 5' end) as a target sequence of the coding region instead of the nucleic acid sequence encoding JEV envelope protein. The nucleic acid molecule of RNA platform fabricated in this Preparation Example will be referred as "pCrPV-MERS".

Example 4: Evaluation of Physical Properties of Pharmaceutical Composition (1) Measurement of Zeta Potential by N/P Ratio Compositions as complex formulated with CA-1 or CA-2 of Formula 2 as a stabilizer with the nucleic acid molecule "pCrPV-MERS" fabricated in Preparation Example 13 were prepared at different N/P ratios in ultra-pure water. Zeta potential was determined using a Zetasizer Nano ZS (Malvern Instruments). The measurement result is shown in FIG. 10. The pharmaceutical composition with large absolute value 1.8 or 2.0 of N/P ratio was treated in cultured Human peripheral blood mononuclear cells (hPBMC; Zen Bio) to examine cytokine inductions. The −ve and +ve charges of N/P ratios did not affect to induction of cytokines, and the stabilizers themselves did not induce cytokines (data not shown). We used 1.8 (−ve charge) and 2.0 (+ve charge) N/P ratios between the stabilizer and the RNA nucleic acid molecules to immunize the mice.

In addition, atomic force microscopy (AFM) analysis was conducted to verify the successful complexation between RNA nucleic acid molecule and the stabilizer. The RNA-stabilizer was diluted in RNase-free water and deposited onto freshly cleaved mica substrate (Pelco Mica sheets, Ted Pella Corp) and incubated overnight. After incubation, the surface of mica was rinsed with RNase-free water and immediately dried using nitrogen gas. The resultant samples were scanned in non-contact mode on a Park NX-10 ADM (Park Systems Corp. Korea) with AC-240TS tips 752 (Olympus Micro-Cantilevers). Assay result is shown in FIG. 11. Stabilizer CA-1 formulated RNA adjuvant showed large spherical structures with a diameter of approximately 100 nm, and the LP-formulated RNA adjuvant showed spherical structures of about 50 nm diameter, stabilizer free RNA adjuvant showed about 25 nm. This means that the metal complex CA-1 used as a stabilizer was successfully complexed with the RNA adjuvant via charge interaction, which suggested that profession antigen presenting cells may easily uptake that complex.

Example 5: Immunoassay

C57BL/6 mice (Dae-Han Bio Link) aged 6 weeks were inoculated by intramuscular injection with a pharmaceutical composition including the nucleic acid molecule fabricated in Preparation Example 13 formulated with CA-1 as a stabilizer to immunize mice. 1 μg of vaccine including MERS-CoV Soluble spike protein (SEQ ID NO: 15; MERS S protein; MERS-CoV EMC/2012 strain; GenBank: AF88936.1) as an antigen was injected into mice. For each group, 20 μg of pCrPV-MERS nucleic acid molecule, 46 μg of CA-1 as a stabilizer, and/or 500 μg of alum (Thermo Scientific) were injected. For comparison, 19 μg of LP (cationic peptide having a lipid chain) was injected into each mouse. The immunization group was divided into total 8 groups as shown in Table 4.

TABLE 4

Formulation of Nucleic Acid Molecule and MERS Soluble spike Protein

| Group | G1 | G2 | G3 | G4 | G5 | G6 | G7 | G8 |
|---|---|---|---|---|---|---|---|---|
| MESR S protein | − | + | + | + | + | + | + | + |
| Alum | − | − | + | − | − | − | − | − |
| pCrPV-MERS | − | − | − | + | + | + | + | + |
| Stabilizer | − | − | − | − | LP | LP | CA-1 | CA-1 |
| N/P Ratio | | | | | 1.8 | 2.0 | 1.8 | 2.0 |

A level of immunoglobulin IgG1 and IgG2c specific to the MERS soluble spike protein injected as antigen was assayed from the immunized mice sera after two weeks later form the immunization in accordance with the same process as Example 12 with ELISA technology. Assay result is shown in FIG. 12. The levels of IgG1, an immunoglobulin related to $Th_2$ immune response, were not significantly different among groups G3-G8. On the other hand, the levels of IgG2c, an immunoglobulin related to $Th_1$ immune response, were highly increased in groups G5-G8, groups injecting the RNA adjuvant formulated with the stabilizer CA-1. Also, N/P ratios were not significantly different in inducing IgG1 and IgG2c. Therefore, all subsequent immunizations were performed using the −ve N/P ratio 1.8 in formulating RNA adjuvant with the stabilizer.

Example 6: Immunoassay hDPP4-transgenic mice (provided by Dr. Sungkyun Park, Korean Research Institute of Bioscience & Biotechnology) aged 6 weeks were inoculated by intramuscular injection with a pharmaceutical composition including the nucleic acid molecule fabricated in Preparation Example 13 formulated with CA-1 of Formula 2 as a stabilizer to immunize mice. 1 μg of vaccine including MERS-CoV Soluble spike protein (SEQ ID NO: 15; MERS S protein) as an antigen was injected into mice. For each group, 20 μg of pCrPV-MERS nucleic acid molecule, 46 μg of CA-1 as a stabilizer, and/or 24 μg alum (Brentanne)) were injected. For comparison, 19 μg of LP (cationic peptide having a lipid chain) was injected into each mouse. The immunization group was divided into total 7 groups as shown in Table 5.

TABLE 5

Formulation of Nucleic Acid Molecule and MERS Soluble spike Protein

| Group | G1 | G2 | G3 | G4 | G5 | G6 | G7 |
|---|---|---|---|---|---|---|---|
| MESR S Protein | − | + | + | + | + | + | + |
| Alum | − | − | + | − | + | + | + |
| pCrPV-MERS | − | − | − | + | + | + | + |
| Stabilizer | − | − | − | − | − | LP | CA-1 |
| N/P Ratio | | | | | | 1.8 | 1.8 |

(1) Plaque Reduction Neutralization Test

Serum of MERS-CoV spike protein infected hDPP4 Tg mice were serially diluted from 1:10 to 1:5120 with serum-free media. The virus-serum mixture was prepared by mixing 100 PFU MERS-CoV with the diluted serum samples and incubated at 37° C. for 1 hour. The virus-serum mixture was inoculated onto Vero cells. The plates were incubated for 1 hour at 37° C. in 5% $CO_2$. After virus adsorption, agar overlay media was added and the plates were incubated at 37° C. in 5% $CO_2$ for 3 days. The cells were stained with 0.1% crystal violet solution (Sigma). Plaques were counted with the naked eye. The percentage neutralization represented the reduction value, which was calculated as 100×the number of plaques in the 100 PFU virus infected well/the number of plaques in the virus-serum mixture infected well. Assay result is illustrated in FIG. 13. Group 7 using the pharmaceutical composition formulated with CA-1 showed the highest neutralizing antibody level related to Th2 immune response.

(2) Evaluation of Mice Survival Rate

At 3 week after the immunization, the immunized mice were challenged with MERS virus (5000 PFU/mouse), and then the survival rate of mice in each group was evaluated. Evaluation result is illustrated in FIG. 14. Group G7 immunized a pharmaceutical composition formulated with CA-1 showed 100% survival. Group G5 immunized together with alum and Group G6 immunized with a pharmaceutical composition formulated with LP showed about 90% survival, and Groups G3 and G4 immunized with alum or the nucleic acid molecule showed about 70% survival.

Example 7: Immunoassay

Cynomolgus macaques aged 5-6 years were intramuscularly immunized with a pharmaceutical composition as a complex between the nucleic acid molecule pCrPV-MERS fabricated in Preparation Example 1 and CA-1 of Formula 1 and the like. Nine macaques were randomly divided into three groups and were immunized with 100 μg MERS soluble protein vaccine (G1), 100 μg of MERS soluble protein vaccine with 2.4 mg of alum (G2), and 100 μg MERS soluble protein vaccine together with 200 μg of RNA nucleic acid (pCrPV-MERS) formulated with the CA-1 of Formula 2 as a stabilizer and 2.4 mg of alum (G3). At two weeks after the immunization, blood samples were drawn through the femoral vein of leg not inoculated with the formulations. Ketamine (10 mg/kg) was administered by intramuscular injection for blood sampling and immunization.

(1) ELISA Assay

At two weeks after the immunization, antigen-specific total IgG and IgM in the plasma from cynomolgus macaques were measured by ELISA. The 96-well plate membrane (Thermo Scientific) was coated with 50 ng/well of MERS spike protein overnight at 4° C. After incubation, the wells were blocked with 200 μl blocking buffer (PBS-0.05% Tween 20-10% FBS) for 1 hour at room temperature. Diluted plasma was added to the plates and incubated for 2 hours at room temperature. After incubation, the wells were washed six times with 200 μl PBS-T. The Anti-Monkey IgG and IgM-HRP conjugated antibodies diluted 1/10000 in blocking buffer were added and the plates were incubated for 1 hour at room temperature. After six washes with PBS-T, TMB substrate was 956 added, incubated for 15 minutes, and then 2N H2504 was added to stop the reaction. The O.D. values were determined at 450 nm using an ELISA plate reader (Epoch, Bio-Tek Instruments, Inc.). Group G3 immunized with the pharmaceutical composition including the nucleic acid as the adjuvant stabilized with CA-1 showed highly increased immunoglobulin level (FIG. 15).

(2) Double Color Enzymatic ELISPOT

PMBC was isolated as following process. Ethylene diamine tetra acetic acid (EDTA) tubes were used to collect blood at 0, 2 and 4 weeks after immunization. PBMCs were isolated by centrifugation at 4000 rpm for 20 minutes with slow acceleration using Ficoll-925 Hypaque (Lymphoprep; Axis-Shield, 1114545). Existing red blood cells (RBCs) in PBMCs were lysed using ACK lysis buffer (Gibco) for 5 minutes at room temperature and washed once with FACS buffer (1×PBS with 2% FBS). Cells were resuspended in RPMI supplemented with 10% FBS and Penicillin/Streptomycin (1×).

The high protein binding PVDF filter membrane in the 96-well plates (Millipore) was coated with 10 μg/ml anti-monkey IgG, IgA, IgM (H&L) goat antibody (Rockland) and MERS spike protein overnight at 4° C. After the incubation, wells were washed once with PBS. Suspended PBMCs were plated in 200 μl CTL-Test™ B Medium and then were incubated at 37° C. in 5% $CO_2$ for 4 hours. After incubation, the wells were washed two times with 200 μl PBS and two times with 200 μl PBS-0.05% Tween 20 (PBS-T). The Anti-Monkey IgG-FITC conjugated antibodies and IgM-Biotin conjugated antibodies (Rockland), diluted 1/1000 in PBS-0.05% Tween 20-1 FBS (PBS-T-F), was added to each well and incubated for 2 hours at room temperature. Wells were washed two times with 200 μl PBS-T and FITC-HRP and Strep-AP (CTL) diluted 1/1000 in PBS-T-F were added. After 1 hour incubation at room temperature, wells were washed two times with 200 μl PBS-T and two times with DW. After the incubation, the developer solution (CTL) was added to each well and incubated for 15 minutes at room temperature. To stop the reaction, wells were washed with tap water. Once the membranes were completely dry, spots were scanned and counted using an immunospot CTL 945 reader (S6 Universal analyzer). As illustrated in FIG. 16, shows an assay result of measuring the number of splenocytes secreting the specific immunoglobulin indicating protein-specific antibody secreting cells (ASCs) using ELISPOT after immunizing apes, group G3 showed a higher number of ASCs (68±303 47.9/million), while relatively low numbers were observed in G2 (27±24.2/million). Further, a very weak protein-specific IgM secreting cell response was observed in all groups (G1: not detectable, G2: 2.7±2.9 and G3: 0.7±0.6).

(3) Assay of Neutralizing Antibody Titer

Neutralizing Antibody titer assay was performed using the plaque reduction neutralizing test (PRNT) by repeating the same process as Example 5. Assay result is shown in FIG. 17. Group G3 showed a little bit high neutralizing antibody titer.

Preparation Example 14: Fabrication of Nucleic Acid Molecule of RNA Platform An artificial nucleic acid molecule of RNA platform was fabricated by repeating the process in Preparation Example 1 and using the following ordered template DNA with single expression cassette. The nucleic acid molecule of RNA platform fabricated in this Preparation Example will be referred as "pCrPV-VZV".

5'-Kpn I recognition site-T7 promoter (SEQ ID NO: 6)-CrPV IGR IRES (SEQ ID NO: 3)-MCS (BamH I-EcoR I-Pac I recognition sites)-coding sequence of VZV (Varicella-Zoster-virus) gE as a coding region (SEQ ID NO: 12; add TTAATTAA at 3' end)-Sac I recognition site-SV40 late polyadenylation signal sequence (SEQ ID NO: 7)-Not I recognition site-3'.

Example 8: Immunoassay

C57BL/6 mice (Dae-Han Bio Link) aged 6 weeks were inoculated by intramuscular injection with a pharmaceutical composition including the nucleic acid molecule fabricated in Preparation Example 14 formulated with CA-1 of Formula 2 as a stabilizer to immunize mice. First, C57BL/6 mice were primed with 2000 PFU of live-attenuated VZV vaccine (Oka/SK strain, SkyZoster, SK Bioscience) including recombinant VZV gE protein (260-927 nucleotides of Oka/SK strain, GenBank: 702 AF272392.1; expressed using an expression vector in Chinese hamster ovary (CHO) cells, SK Bioscience) for mimicking the immune system of VZV seropositive individuals. The primed mice are referred as "LAV priming". At 5 weeks after priming all groups except G1, were immunized by intramuscular injection, 2 times at 4 week interval. For each group, 10 μg of vaccine including VZV gE protein as an antigen, 20 μg of RNA nucleic acid molecule (pCrPV-VZV) and 46 μg of CA-1. The immunization group was divided into total 5 groups as shown in Table 6.

TABLE 6

Formulation of Nucleic Acid Molecule and VZV gE Protein

| Group | G1 | G2 | G3 | G4 | G5 |
|---|---|---|---|---|---|
| LAV priming | − | + | + | + | + |
| VZV gE Protein | − | − | + | + | + |
| pCrPV-VZV | − | − | − | + | + |
| Stabilizer | − | | | | CA-1 |

(1) ELISA Assay

ELISA assay was performed using the immunized mice sera at 4 weeks after the second immunization. Compared to group G3 immunized only with the antigen, IgG1 and IgG2a levels were significantly increased in groups G4 and G5 immunized together with the nucleic acid molecule (FIG. 18).

(2) ELISPOT Assay

The numbers of cells secreting IFN-γ and IL-2, cytokine related to $Th_1$ immune response, as a specific VZV gE protein from the mice splenocytes after 4 weeks from the $2^{nd}$ immunization. Compared to group G1 immunized with only the antigen, the frequency of both IFN-γ and IL-2 secreting cells in the cultured splenocytes increased about 2- to 3-fold in groups G4 and G5 immunized together with the nucleic acid molecule (FIG. 19). In particular, increase in the IL-2 secreting immune cells indicated the increases in T cell activation, expansion, development, and maintenance and the differentiation of CD8 T cells into terminal effector cells and memory cells. This induction of VZV-specific T cell activation is essential for successful VZV immunization in the aged people. These results suggested that the RNA adjuvant-VZV can be an ideal adjuvant for VZV to increase the gE subunit vaccine efficacy by inducing T cell activation and cellular immune response.

(3) FMMA Evaluation

Guinea pigs (Dunkin-Harley strain, KOSA Bio) aged 6 weeks were primed with about 5000 PFU/mouse live-attenuated VZV vaccine (SK Bioscience). At 5 weeks after priming, primed guinea pigs were immunized by intramuscular injection, 2 times at 2 week interval. For each group, 0.5 ml of vaccine including the VZV gE protein, 50 μg of RNA nucleic acid molecule (pCrPV-VZV) and 115 μg of CA-1.

Fluorescent Antibody to Membrane Antigen (FAMA) was performed using the following process. To determine anti-VZV IgG, 30 μl DPBS was added into U-bottom 96-well plates. Serum from the Guinea Pigs was serially diluted from ½ to ¹⁄₁₀₂₄. Cell-associated virus (30 μl) from infected cells was added to wells and incubated for 30 minutes at 37° C. After centrifugation at 2000 rpm for 5 minutes, the supernatant was removed, and the cells were washed with 1% gelatin-DPBS (2:1) buffer and 30 μl ¹⁄₂₀₀ dilution of anti-human IgG-FITC conjugate was added to all wells and the plate was incubated for 30 minutes at 37° C. After washing with 1% gelatin-DPBS buffer, 4 μl glycerol-DPBS (2:1) was added to each well and visualized by confocal microscopy. Compared to group immunized only with antigen, neutralizing antibody was increased about two times in a group immunized together with the nucleic acid molecule of an adjuvant and CA-1 of a stabilizer. Accordingly, it was confirmed that the nucleic acid molecule of an adjuvant can activate further humoral immune response in the live-attenuated vaccine.

Preparation Example 15: Fabrication of Nucleic Acid Molecule of RNA Platform

An artificial nucleic acid molecule of RNA platform was fabricated by repeating the process in Preparation Example 3 and using the following ordered template DNA with single expression cassette. The nucleic acid molecule of RNA platform fabricated in this Preparation Example will be referred as "pCrPV-Flu-HA2 A".

5'-Kpn I recognition site-T7 promoter (SEQ ID NO: 6)-CrPV IGR IRES (SEQ ID NO: 3)-BamH I recognition site-coding sequence of influenza HA2 A type as a coding region (SEQ ID NO: 13)-MCS (Pac I-Sac I recognition sites)-SV40 late polyadenylation signal sequence (SEQ ID NO: 7)-Not I recognition site-3'.

Preparation Example 16: Fabrication of Nucleic Acid Molecule of RNA Platform

An artificial nucleic acid molecule of RNA platform was fabricated by repeating the process in Preparation Example 15 except using a nucleic acid sequence encoding influenza HA2 B type (SEQ ID NO: 14) instead of the nucleic acid sequence encoding the influenza HA2 A type as a coding region. The nucleic acid molecule of RNA platform fabricated in this Preparation Example will be referred as "pCrPV-Flu-HA2 B".

Example 9: Immunoassay

C57BL/6 mice (Dae-Han Bio Link) aged 6 weeks were inoculated by intramuscular injection, 2 times at 2 weeks interval with a pharmaceutical composition including the nucleic acid molecule fabricated in Preparation Example 15 or 16 formulated with CA-1 of Formula 2 as a stabilizer to immunize mice. For each group, 0.6 g/mouse of live-attenuated influenza virus vaccine (HA antigen) as an antigen, 20 μg of RNA nucleic acid (mixed pCrPV-Flu-HA2 A with pCrPV-Flu-HA2 B in 50:50; hereinafter "pCrPV-Flu"), 46 μg of CA-1 as a stabilizer. For comparison, the pCrPV-Flu was formulated with 19 μg of LP and/or 19.4 μg of protamine (P). The live-attenuated influenza vaccine (SKY-Cellflu, SK Bioscience) was the seasonal vaccine for 2018-2019, which was a cell culture-based quadrivalent vaccine which mixed with 697 A/Michigan/45/2015(NYMC X-275) for A/H1N1, A/Singapore/INFIMH-16-0019/2016 (IVR-186) for A/H3N2, B/Phuket/3073/2013 for B/Yamagata, and B/Maryland/15/2016 for B/Victoria. The immunization group was divided into total 6 groups as shown in Table 7.

TABLE 7

Formulation of Nucleic Acid Molecule and Influenza Protein

| Group | G1 | G2 | G3 | G4 | G5 | G6 |
|---|---|---|---|---|---|---|
| Attenuated Vaccine | − | + | + | + | + | + |
| pCrPV-Flu | − | − | + | + | + | + |
| Stabilizer | | | | CA-1 | LP | P |

P: Protamine (1) Immunoglobulin ELISA Assay

The immunized mice sera at 2 weeks after the $1^{st}$ immunization and at 2 weeks after the $2^{nd}$ immunization were collected, and then levels of IgG1 and IgG2a were assayed by repeating the same process as Example 1. At 2 weeks after the $1^{st}$ immunization, compared to group G2 immunized without the nucleic acid molecule, the levels of antigen-specific IgG1 and IgG2a was raised in groups G3-G6 immunized together with the nucleic acid molecule (FIG. 21). On the other hand, at 2 weeks after the $2^{nd}$ immunization, IgG1 levels in group G2 were induced similar to those in groups G3-G6, whereas IgG2a levels in G2 were still low. In contrast, all groups G3-G6 immunized with the nucleic acid molecule induced high levels of both IgG1 and IgG2a levels and showed strong boosting effects (FIG. 22).

(2) Evaluation of Mucosal Immune Response

To evaluate the mucosal immune response, which is key for protection from influenza virus infection, antigen-specific secretory IgA levels in the bronchoalveolar lavage fluid (BALF) were measured by ELISA. Bronchoalveolar lavage (BAL) was performed on euthanized mice by flushing the airway compartment with 0.8 ml PBS with 1 FBS (PBS/FBS) by inserting a 22-gauge catheter into the trachea of the mice. The fluids obtained from BAL were centrifuged at 800×g for 10 800 min at 4° C. The collected serum, BALF, and spleen were used for ELISA. While IgA level was induced in all groups G3-G6 immunized together with the nucleic acid molecule, IgA production was not induced in group G2 immunized only with antigen (FIG. 23). This indicated that the nucleic acid molecule an trigger mucosal immune response even when administered intramuscularly.

(2) Hemagglutination Inhibition (HI) Titer Assay

The HI assay was performed according to the "Manual for the laboratory diagnosis and virological surveillance of influenza." The immunized mouse sera were treated with receptor-destroying enzyme (RDE) for 18 hours at 37° C. and heat-inactivated for 30 minutes at 56° C. followed by adsorption with chicken RBCs to remove nonspecific responses. All sera were then diluted serially in 25 µl PBS in V-bottom 96-well microtiter plates and incubated with standardized viral antigen (4 HA units/25 µl) at room temperature for 1 hour, after which 50 µl 0.5% chicken RBCs was added and the plates were incubated for 45 minutes at room temperature. The antibody titers (Geometric mean titers) were expressed as the reciprocal highest serum dilution that showed complete inhibition of agglutination in duplicate experiments. As the starting dilution was $\frac{1}{10}$, the lower limit of the detectable antibody titer was 10. Titers <10 were assigned a value of 5 for calculation purposes.

At 2 weeks after 1st vaccination, all mice in G2 were seronegative for the influenza strains (HI geometric mean titer of <10). However, HI titers against A/H1N1 and A/H3N2 were in the range of 405 1:10~1:80 in groups G3-G6. With respect to the B-type, HI titers for B/Yamagata lineage were measured at low levels at about 1:10 and HI titers for B/Victoria lineage were measured at 1:5 even in the groups that received the nucleic acid molecule (FIG. 24)

After the $2^{nd}$ immunization, the HI titers of groups G3-G6 were 9-14 fold higher for A/H1N1, 3-11 fold higher for A/H3N2, 3 fold higher for B/Yamagata, and 4-9 fold higher for B/Victoria than those of group G2 (FIG. 25).

(2) ELISPOT Assay

The numbers of cells secreting IFN-γ, cytokine related to $Th_1$ immune response, and IL-4, cytokine related to $Th_2$ immune response, from the mice splenocytes after the immunization using ELISPOT. Compared to group G2 immunized with only the antigen, the frequency of cells secreting IFN-γ increased 2-to-3-fold in groups G3-G6 immunized together with the nucleic acid, but the frequency of cells secreting IL-4 was similar in all immunized groups G2-G6 (FIG. 26). Summing up all the results, all the groups immunized together with the nucleic acid molecule exhibits a mucosal immune response, which is important to endow the protective effect for respiratory viruses, and $Th_1$ immune response of cellular immune response) and $Th_2$ response of humoral immune response).

Example 10: RNA Degradation Inhibition Assay

A pharmaceutical composition including each of RNA platform nucleic acid molecule fabricated in each of Preparation Examples 1-9 and CA-1 of Formula 2 was injected into mice intramuscularly, the mice muscles were extracted at predetermined time, and then real-time PCR was performed using primers corresponding to a length of RNA adjuvant fabricated in each of Preparation Examples 1-9. It can be seen that the muscle of mice inoculated together with CA-1 of a stabilizer preserves RNA better up to 6 hours than the muscle of mice inoculated with only the RNA adjuvant (FIG. 27).

In addition, a pharmaceutical composition including each of RNA platform nucleic acid molecule fabricated in each of Preparation Examples 1-9 and CA-1 of Formula 1 with various N/P ratios were prepared, and then gel electrophoresis was performed. The decrease in mobility on the gel confirmed that the complex between the nucleic acid molecule and CA-1 was well formed at 1.4 or higher N/P ratio, and the complex appeared above the gel electrophoresis with low mobility. Moreover, after reacting by exposing the identically formed complex of CA-1 and the RNA nucleic acid molecule to RNase, residual RNA was confirmed through gel electrophoresis. It was confirmed that the degradation of RNA by RNase was inhibited in all formulation with CA-1.

It was confirmed that the complex was formed and that the complex appeared on the top of gel electrophoresis, and that all of those formulated with CA-1 inhibited RNA degradation by RNase.

While the present disclosure is described based upon exemplary embodiments and examples, the present disclosure is not limited to technical ideas described in the above embodiments and examples. Rather, a person having an ordinary skill in the art relating to the present disclosure may adopt various variations and modifications based upon the above embodiments and examples. However, it is apparent that those variations and modifications are within the scope of the present disclosure from the appended claims.

The invention claimed is:

1. A pharmaceutical composition including:

a nucleic acid molecule of an adjuvant; and a metal complex stabilizing the nucleic acid molecule and having the following structure of Formula 1 or a pharmaceutically acceptable salt thereof:

[Formula 1]

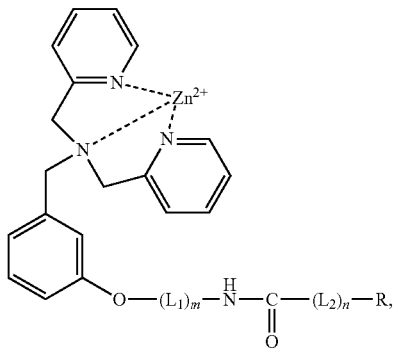

wherein each of $L_1$ and $L_2$ is independently a $C_1$-$C_{20}$ aliphatic bridging group; each of m and n is independently 0 or 1; R is a $C_1$-$C_{20}$ alkyl group or

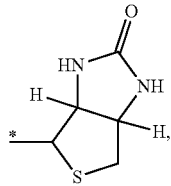

wherein asterisk indicate a linking site, wherein the nucleic acid molecule includes at least one IRES (Internal ribosome entry site) element of an expression control sequence, and wherein the nucleic acid molecule further includes multiple thymidines inserted to an upstream of the at least one IRES element, wherein the multiple thymidines include 20 to 400 thymidines.

2. The pharmaceutical composition of claim 1, the pharmaceutical composition further includes an immunogen that is at least one of a peptide and a protein.

3. The pharmaceutical composition of claim 2, wherein the immunogen includes an antigen that is at least one of a viral antigen and a pathogenic antigen.

4. The pharmaceutical composition of claim 1, wherein the IRES element includes a viral IRES element.

5. The pharmaceutical composition of claim 4, wherein the viral IRES element is derived from a virus selected from Picornaviridae family virus, Togaviridae family virus, Dicistoviridae family virus, Flaviridae family virus, Retroviridae family virus, Herpseviridae family virus and combination thereof.

6. The pharmaceutical composition of claim 4, wherein the viral IRES element is derived from a virus selected from a Coxsackie virus, a cricket paralysis virus, an encephalomyocarditis virus and combination thereof.

7. The pharmaceutical composition of claim 1, the nucleic acid molecule further includes a coding region operatively linked to the at least one IRES element.

8. The pharmaceutical composition of claim 7, the pharmaceutical composition further includes an immunogen that is at least one of a peptide and a protein, and wherein the coding region includes a nucleic acid sequence encoding the immunogen.

9. The pharmaceutical composition of claim 7, wherein the at least one IRES element includes a first IRES element and a second IRES element, and wherein the coding region includes a first coding region operatively linked to the first IRES element and a second coding region operatively linked to the second IRES element.

10. The pharmaceutical composition of claim 1, wherein the metal complex includes any one of a metal complex having the following structure of Formula 2:

[Formula 2]

CA-1

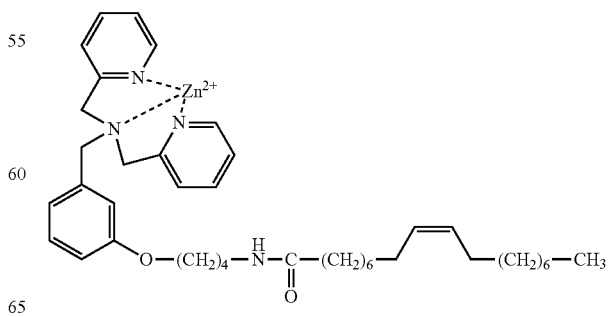

-continued

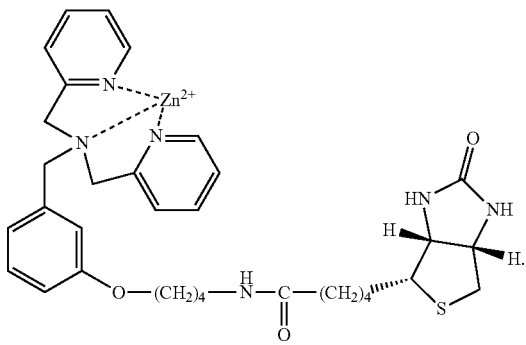

CA-2

11. A composition for stabilizing a nucleic acid molecule of an adjuvant, the composition including a metal complex having the following structure of Formula 1 or a pharmaceutically acceptable salt thereof:

[Formula 1]

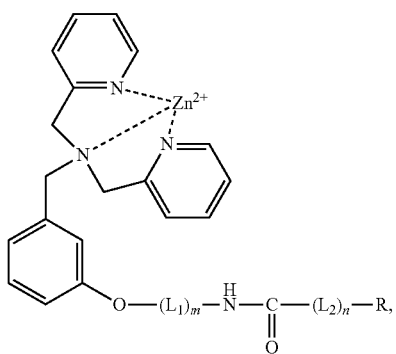

wherein each of $L_1$ and $L_2$ is independently a $C_1$-$C_{20}$ aliphatic bridging group; each of m and n is independently 0 or 1; R is a $C_1$-$C_{20}$ alkyl group or

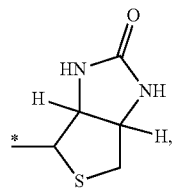

wherein asterisk indicate a linking site,
wherein the nucleic acid molecule includes at least one IRES (Internal ribosome entry site) element of an expression control sequence, and
wherein the nucleic acid molecule further includes multiple thymidines inserted to an upstream of the at least one IRES element, wherein the multiple thymidines include 20 to 400 thymidines.

12. The composition of claim 11, the composition further includes an immunogen that is at least one of a peptide and a protein.

13. The composition of claim 11, wherein the IRES element includes a viral IRES element.

14. The composition of claim 11, the nucleic acid molecule further includes a coding region operatively linked to the at least one IRES element.

15. The composition of claim 14, the composition further includes an immunogen that is at least one of a peptide and a protein, and wherein the coding region includes a nucleic acid sequence encoding the immunogen.

16. The composition of claim 14, wherein the at least one IRES element includes a first IRES element and a second IRES element, and
wherein the coding region includes a first coding region operatively linked to the first IRES element and a second coding region operatively linked to the second IRES element.

17. The composition of claim 11, wherein the metal complex includes any one of a metal complex having the following structure of Formula 2:

[Formula 2]

CA-1

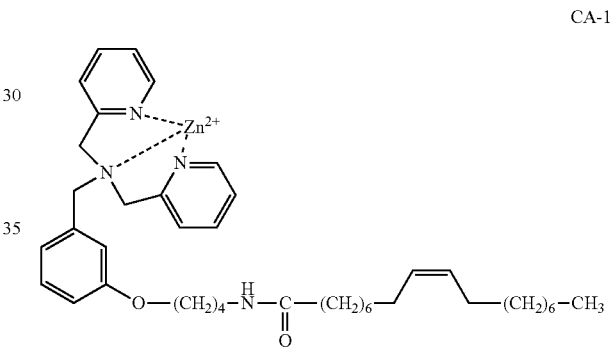

CA-2

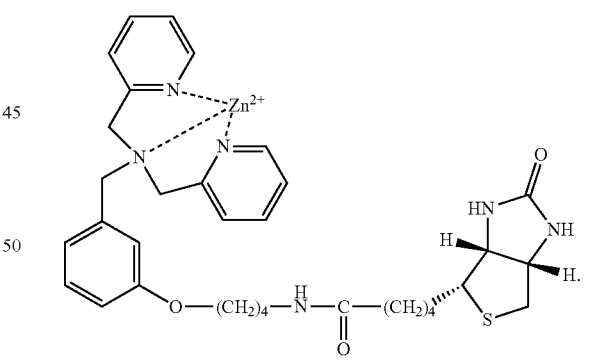

18. The composition of claim 11, wherein the immunogen includes an antigen that is at least one of a viral antigen and a pathogenic antigen.

* * * * *